United States Patent [19]
Small et al.

[11] Patent Number: 5,898,434
[45] Date of Patent: *Apr. 27, 1999

[54] USER INTERFACE SYSTEM HAVING PROGRAMMABLE USER INTERFACE ELEMENTS

[75] Inventors: Ian S. Small, Cupertino; Michael Chen, Palo Alto; Eric L. Zarakov, Los Gatos; Richard L. Mander, Menlo Park; Laurie J. Vertelney, Palo Alto; Amanda R. Mander, Menlo Park; Michael A. Arent, Albany; James P. Faris, Santa Cruz; Jeffrey E. Tycz, Santa Cruz; Lewis C. Knapp, Mountain View, all of Calif.

[73] Assignee: Apple Computer, Inc., Cupertino, Calif.

[*] Notice: This patent is subject to a terminal disclaimer.

[21] Appl. No.: 08/294,242

[22] Filed: Aug. 22, 1994

Related U.S. Application Data

[63] Continuation-in-part of application No. 07/940,237, Sep. 3, 1992, Pat. No. 5,341,293, which is a continuation of application No. 07/700,729, May 15, 1991, Pat. No. 5,202,828.

[51] Int. Cl.$^6$ ........................................................ G06F 3/14
[52] U.S. Cl. ............................................ 345/348; 345/326
[58] Field of Search ........................... 364/419.17, 419.1, 364/200 MS; 395/145–149, 155, 159, 161, 753, 754, 757, 790, 791; 340/710, 721, 747, 720, 749; 345/326, 327, 333, 334, 348, 349, 350; 707/512, 530; 705/9

[56] References Cited

U.S. PATENT DOCUMENTS

| | | | |
|---|---|---|---|
| 4,791,556 | 12/1988 | Vilkaitis | 364/200 |
| 4,931,783 | 6/1990 | Atkinson | 340/710 |
| 5,202,828 | 4/1993 | Vertelney et al. | 364/419.17 |
| 5,228,123 | 7/1993 | Heckel | 395/155 |
| 5,274,758 | 12/1993 | Beitel et al. | 395/154 |
| 5,341,293 | 8/1994 | Vertelney et al. | 364/419.17 |

FOREIGN PATENT DOCUMENTS

| | | |
|---|---|---|
| 0339220 | 11/1989 | European Pat. Off. . |
| 9208199 | 5/1992 | WIPO . |
| 9221091 | 11/1992 | WIPO . |

OTHER PUBLICATIONS

Electronic Engineering, vol. 66, No. 814, Oct. 1, 1994 London, GB, p. 22, "PCMCIA Video Camera For Mobile Computing".
International Search Report, PCT/95/10634, Jan. 3, 1996.

*Primary Examiner*—Frantzy Poinvil
*Attorney, Agent, or Firm*—Blakely, Sokoloff, Taylor & Zafman

[57] ABSTRACT

A user interface having a plurality of user interface elements for marking, finding, organizing, and processing data stored in a computer system. Each element typically has an appearance which is related to the data or function the element is designed to represent or perform. The elements may simply mark data within the document, or may be programmed to cause the computer to perform some function in association with the marked data. Methods of marking data and searching the memory for marked data by use of switches or buttons is disclosed. Further, useful elements for systems such as computerized camera systems, portable multimedia systems, and remote controls are also described. Some of the user interface elements of the present invention may have an appearance and/or functionality dependent upon the context in which the element is used, and/or dependent upon the user's identity. Methods for arranging the elements in stacks, and for providing for automatic application of elements to captured image data are also disclosed.

86 Claims, 48 Drawing Sheets

Gutters

All products outlined below are provided white (-0), (-04), green (-05) and yellow (-0 For custom color for pricing.

GV141-12  Galvanized 4" gutter supported b tied through steel cross member

GV662-13  Galvanized 4" gutter as GV1412 finishing includes horizontal strip matching features on downspout PL442-8  Plastic 4" gutter supported by na supports. Comes with 25-year gu AL619-62  Aluminum 3" gutter supported by aluminum supports. Guaranteed perforation, leakage.

STAMPS

ORDER — 2301
NOTE — 2302

Gutters

All products outlined below are provided white (-0), (-04), green (-05) and yellow (-0 For custom color for pricing.

GV141-12  Galvanized 4" gutter supported tied through steel members

GV___  Galv___ 4" gutter as GV1412 finishing includes horizontal strip matching features on downspout PL442-8  Plastic 4" gutter supported by na supports. Comes with 25-year gu AL619-62  Aluminum 3" gutter supported by aluminum supports. Guaranteed perforation, leakage.

STAMPS

NOTE 16

Figure 29b

Figure 29c (Rotated figure content:)

Gutters
All products outlined below are provided
white (-0), (-04), green (-05) and yellow (-0
For custom color for pricing.

GV141-12  Galvanized 4" gutter supported b
tied through steel cross member

GV[ORDER]  Galvanized 4" gutter as GV1412-
finishing includes horizontal strip
matching features on downspout PL442-8  Plastic 4" gutter supported by na
supports. Comes with 25-year gu AL619-62  Aluminum 3" gutter supported by
aluminum supports. Guaranteed
perforation, leakage.

STAMPS

[ORDER] — 2301
[NOTE]

Gutters

All products outlined below are provided in (-04), green (-05) and yellow (-06). For cus for pricing.

GV141-12  Galvanized 4" gutter sup tied through steel cross 662-13  Galvanized 4" gutter as finishing includes horizo matching features on do PL442-8  Plastic 4" gutter supporte supports. Comes with 25

AL619-62  Aluminum 3" gutter supp aluminum supports. Gua perforation, leakage.

STAMPS

USER INTERFACE SYSTEM HAVING PROGRAMMABLE USER INTERFACE ELEMENTS

This is a continuation-in-part of U.S. patent application Ser. No. 07/940,237, filed Sep. 3, 1992 now U.S. Pat No. 5,341,293, which is a continuation of U.S. patent application Ser. No. 07/700,729, filed May 15, 1991, now U.S. Pat. No. 5,202,828.

BACKGROUND OF THE INVENTION

1. Field of the Invention

The present invention relates generally to software techniques for marking, decorating and organizing data within a computer system, and more particularly, to a user interface system having a collection of different user interface elements, each having a unique identity and programmed functional characteristic that allows each element to be used to mark, find, organize, and process data in documents within a computer system.

2. Brief Description of the Prior Art

A user interface is something which bridges the gap between a user who seeks to control a device and the software and/or hardware that actually controls that device. A user interface for a phone may be a set of keys. The user interface for a computer is typically a software program running on the computers central processing unit (CPU) which responds to certain user-typed commands. As computers have increased in popularity and availability amongst less computer educated users, the quality of the user interlace has become an ever more important consideration in the development of a computer, since many of these users are not familiar with and/or comfortable with many of the typed commands that are required to operate the computer. One popular type of user interface, which simplifies the operation of a computer, is available on Macintosh computers sold by Apple Computer, Inc., of Cupertino, Calif.

The Macintosh computer user interface employs what is referred to as a desktop metaphor for the basis of its user interface. Through use of a mouse or trackball in communication with the computer, the user can select and/or move certain conic objects on the screen of the computer to control its operation. The desktop metaphor refers to the fact that: (1) the screen of the Macintosh computer often looks somewhat like the blotter of a desktop, with a menu bar across the top of the blotter from which the user can select various control features; (2) there is a trash can icon in the lower right hand corner of the blotter which can be used to remove items from the computer; and (3) programs and documents created with the programs are represented by iconic images of pages which can be placed in iconic images of folders and arranged on the blotter for easy access and organization, like the files of a filing cabinet in an office. These icons can be arranged- on the screen in a number of different manners, such as according to their type, size and color, and the user can search for files by searching for words listed in the title bar associated with each icon, but the user cannot search for a specific iconic image itself.

Another popular portion of the Macintosh user interface is the window feature. When a user selects an icon of a floppy disk or hard disk in a certain manner, a window (a rectangular shaped box which allows the user to "see" the information stored in the drive) appears on the screen of the computer. This window typically contains a number of folder, program and document icons and other images which represent the information stored in the drive. If a user selects a folder icon in a certain manner, the folder will "open" into another window representing the information within that folder. As previously stated, document and program icons can be placed in folder icons, but not vice versa, and no icon can be placed directly on a document. Iconic images have become an important feature of many user interfaces because they can be used to represent different types of data in a form which is readily understandable to the user. Icons, however, have had little functionality associated with them because they are typically only used to represent stored information that a user can access fairly directly, i.e., by selecting the icon. But some icon-like images have had some functionality associated with them, such as the button-like images that can be created with the HyperCard software application sold by Claris Corporation of Mountain View, Calif. The HyperCrad application allows users to create card-like images that can have various images and features associated with them.

One of these features is the button, which can, to a limited extent, be created by the user and given a specific function defined by the user. Each button has an image and a small program or script associated with it which is run each time the button is selected by a user. These scripts can be written by the user using a special language called HyperTalk, which can only be used with the HyperCard program. Buttons are typically only used for mundane tasks, i.e., an image of an arrow may be used to cause the application to flip from one card to another card in response to the arrow being selected by the user. Some buttons are also used to perform some action which is associated with the informational content of the card on which the button appears, i.e., a button on a card displaying a number of musical notes may cause the computer to make sounds representing those notes when the button is selected. A button is limited to representing a task which is to be performed while viewing an associated card in the HyperCard application, and not at some later point in time as directed by the user. For example, a user could not create a "To be printed" button and have the computer latter print every card which contained a "To be printed" button. In addition, buttons are not designed to be used to mark the cards or the data on the cards in any meaningful way to the user.

Another type of functional image is the "Post-it" note used in the FullWrite Professional word processing application by Ashton-Tate Corporation. By choosing the "note" option from the menu bar while writing a document, a small window can be created within which a small amount of text can be entered. When the user closes the window, the window is reduced to a small, generic, symbol which appears at the left-hand margin of the document. The position of the "note" symbol on the page is based on and corresponds to the position of an invisible command, which is entered into the text of the primary document when the user closes the note window. A "note" symbol cannot be moved to a different position along the left margin without moving the position of the invisible command in the text. "Note" symbols can be given names and dates like icons to identify the creator of the note so that notes can be passed to different users and still maintain some level of identity. The name attached to each note, however, cannot be easily customized because the name is taken from the registration information used when the FullWrite application is run the first time. This name can be changed by selecting the "preferences" menu and typing a new name in, but this would not be a desirable manner in which to separately identify each note.

The HyperCard application also allows users to decorate various cards and other documents with special graphic images that can be cut from a card in the HyperCard application and pasted to a different card or a document in a different application. These images, however, are only fanciful bit-mapped designs which have no functionality associated with them. A similar concept is utilized in the KidsPix drawing application for children by Broderbund Software, Inc. of San Rafael, Calif., which provides a palette of different colored "stamps" (bit-mapped graphic designs), which can be selected by a user and stamped (pasted) all over an open document to enhance a picture or drawing. When a stamp is a applied to a document, a noise is issued by the computer to help make the application more entertaining. The same noise is generated for each different stamp. In fact, noises are generally associated with every action performed in the KidsPix application, whether a stamp is selected or a line is drawn. The user cannot program the desired noise the stamp will make when utilized.

One final type of application image which is associated with the same type of function, is the macro program that is often attached to a spreadsheet cell (a bordered area within an electronic document). Spreadsheet applications, such as Microsoft's Excel application, allow the user to create rows and columns of cells within which information can be entered. Separate macro programs can be written to perform certain calculations using the spreadsheet's macro programming language and then associated with a cell so that a series of calculations will be performed and the result will be entered into the cell when that cell is selected. Neither icons, cells, stamps, buttons, nor other types of known graphic images can be used to mark, find, organize and process data in documents within a computer system.

3. Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

SUMMARY OF THE INVENTION

A preferred embodiment of the present invention comprises a user interface system having a plurality of user interface elements for marking, finding, organizing, and processing data within documents stored in an associated computer system. Each element typically has an appearance which is uniquely related to the data or the function the element is designed to represent or perform, respectively. In their simplest form, these elements are only used to mark data within a document. Each element, however, can also be programmed to cause the computer to perform some function in association with the marked data, such as printing the data or mailing the data to someone. A user can select particular data within a document using an element and have that data associated with the element in memory. Data marked with common elements can be found by searching for a particular representative element in memory. Users can create their own elements, program elements with their own desired functionality, and modify existing elements. Elements can also be compounded together so as to cause a combination of tasks to be performed by simply activating one element. Illustrative uses for and functionality of elements in specialized applications such as a computerized camera system, a remote control device and a portable multimedia player are also disclosed. Additionally, a method and apparatus for marking and searching for data, in systems having limited input/output capability, is also disclosed.

BRIEF DESCRIPTION OF THE DRAWINGS

The present invention is illustrated by way of example and not limitation in the accompanying figures and in which:

FIG. 7b illustrates the results of the find operation performed in accordance with FIG. 7a.

FIG. 8b illustrates the results of a list operation performed by one of the user interface elements illustrated in FIG. 8a.

FIG. 14b illustrates the operation of a cutter element as an alternative embodiment to the element maker illustrated in FIG. 14a.

FIG. 14c illustrates a modified version of the element maker dialog box of FIG. 14a.

FIG. 15c illustrates a compounded series of elements relating to the meeting element of FIG. 15a.

FIG. 15d illustrates the operation of a participants element.

FIGS. 29a, 29b, 29c, 29d and 29e illustrate regions where a user interface element of the present invention may be placed and regions where a user interface element of the present invention may not be placed.

FIGS. 30a, 30b, 30c and 30d illustrate predefined receiving areas for the user interface elements of the present invention.

DETAILED DESCRIPTION

A user interface is disclosed. In the following description, numerous specific details are set forth such as specific methods of entering and manipulating data and images, visual appearances, functions, methods of implementing various functions, exemplary flowcharts, etc. in order to provide a thorough understanding of the present invention. It will be obvious, however, to one skilled in the art that these specific details need not be employed to practice the present invention. In other instances, well known methods and apparatuses have not been described in detail in order to avoid unnecessarily obscuring the present invention.

Figure 1:
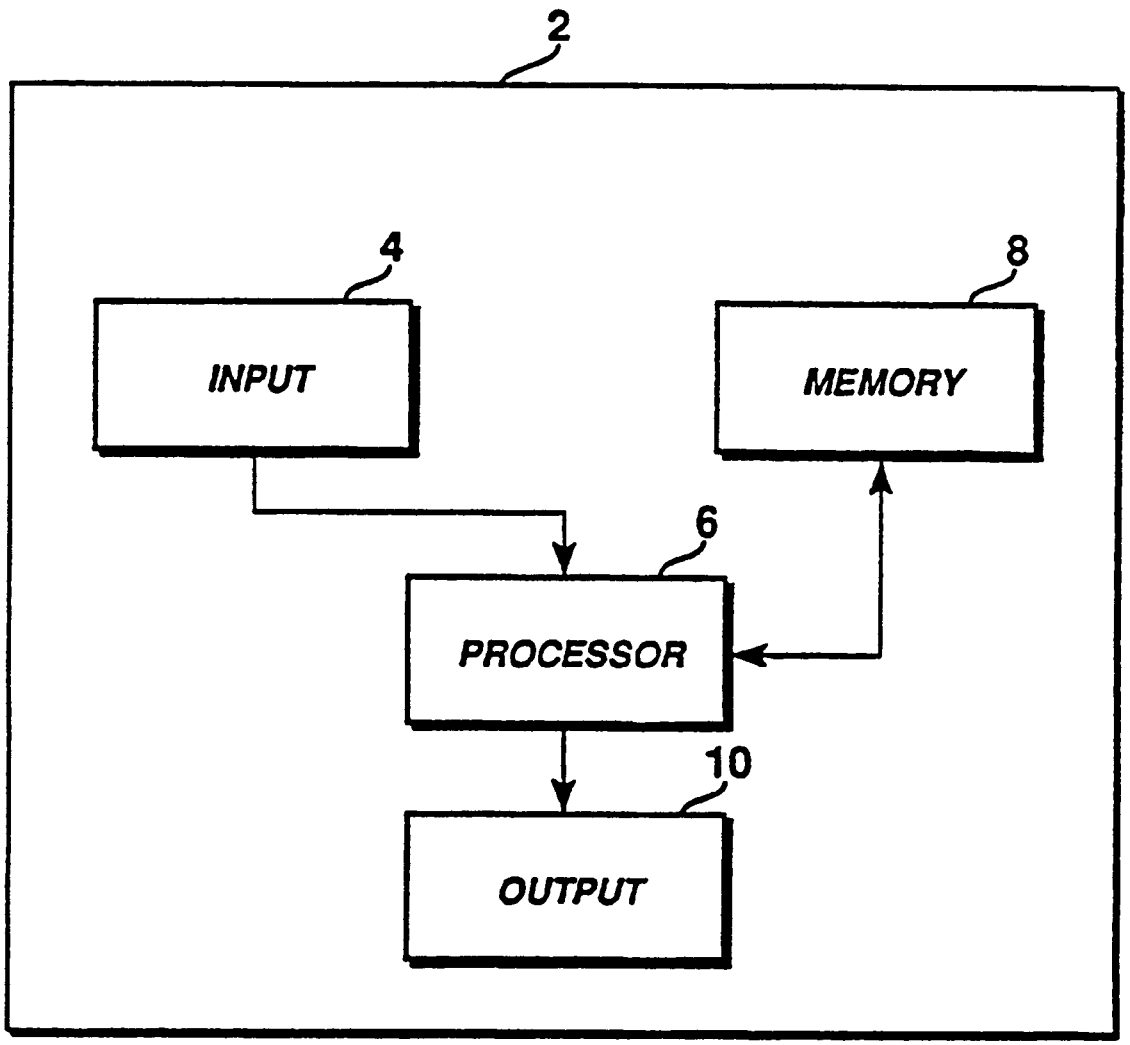
FIG. 1 is a block diagram of the functional elements of a notebook computer for use in connection with the user interface elements of the preferred embodiment of the present invention.

A physically small computer, such as the notebook-sized computer 2 illustrated in FIG. 1, is highly dependent on its user interface for its general operation. In computer 2, the input 4 is generally only a touch or stylus sensitive panel through which the user can enter information, although the computer 2 may be adapted to receive additional information through different peripheral devices or through connection to a larger computer. The processor can range from being very small and simple to extremely powerful and complex. The memory 8 is generally as small as is reasonable for the types of applications to be operated and the amount of information to be stored in order to save space and power. The output 10 is usually just a display screen coupled to the input panel 4.

Although the user interface is an important part of any computer system, the user interface takes on special import in small computers, like computer 2, which have input device limitations that prohibit entry of text, such as through a keyboard or through handwriting recognition. Nevertheless, an interface, and elements thereof, which has been designed for a small computer can also be readily used in larger computing environments, ranging from standard desktop to mainframe computers, which do not have input device limitations. The user interface elements of the preferred embodiment of the present invention are accordingly intended for use in both types of computer systems, small and large, even though these interface elements are primarily described herein in terms of their application to smaller systems.

Figure 2:
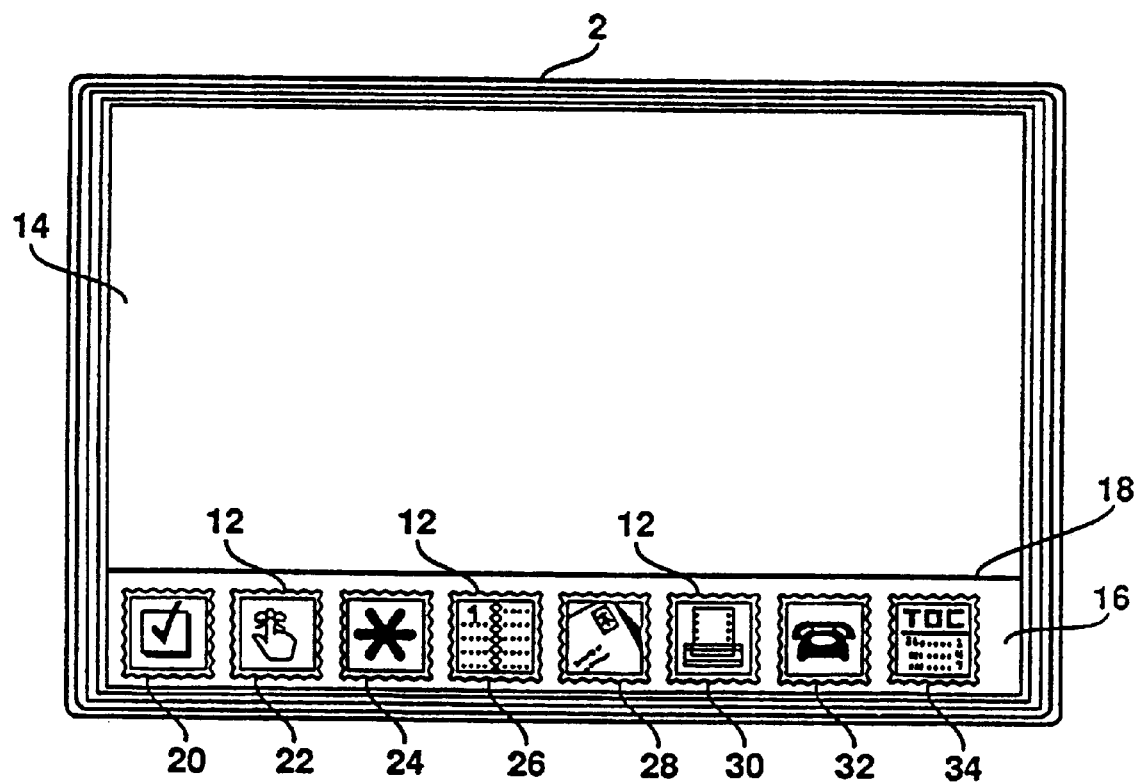
FIG. 2 is a top plan view of the notebook computer of FIG. 1 illustrating a collection of user interface elements on the display screen of the computer in accordance with the preferred embodiment of the present invention.

In the preferred embodiment of the present invention, these user interface elements, shown generally in FIG. 2 as elements 12 on the display screen 14 of computer 2, have a fanciful stamp-like appearance. Although many other appearances could be utilized, some of which are illustrated with reference to FIG. 3, the stamp-like appearance is preferred because this appearance can be readily associated by the user to part of the operation of the interface elements. For example, since a user will have most likely previously used an ink stamp to mark a document or a postage stamp to mail a letter, the user should have little trouble understanding that elements 12 are to be applied to documents displayed on the display screen 14 of the computer 2. Like the desktop metaphor described with reference to the prior art previously described, the user interface elements of the preferred embodiment of the present invention create a stamp metaphor which enhances the intuitiveness of the individual user interface elements to the user. Once the user understands that elements 12 are to be applied to displayed documents in order to perform some function, the user can readily move on to understanding and utilizing that function.

A collection of these elements is shown in FIG. 2. In the preferred embodiment of the present invention, each element has a fanciful appearance and a programmed functional characteristic that allows that element to be used to mark, find, organize and process data within documents stored within the computer 2 in a manner which is unique to the appearance of that element. It should noted, however, that the association between the unique appearance of an element and its programmed function is not necessary, and that the elements need not have any appearance at all, i.e., aural representations could be used instead of visual representations to communicate the different types of elements to a user who may not be able to see the display screen 14.

In FIG. 2, a sectioned off portion of the display screen 14 is designated as an element well 16, within which a number of elements are displayed and made available to the user when the user is creating, viewing or editing any type of document or image displayed in the remaining portion of the display screen 14. The element well 16 could be enlarged by the user to display additional elements by selecting the well definition line 18 and pulling the line 18 up toward the top of the display screen 14, thereby revealing additional elements hidden below the level of the first line of elements 12 shown. Likewise, the user could hide all of the elements 12 by selecting and moving the well definition line 18 down to the bottom of the display screen 14, thereby freeing up additional screen space on the display screen 14.

Because the system described herein is that of a notebook computer with a touch-sensitive display, the act of selecting objects and moving them on the display screen is presumed to be performed with the user's finger. The same acts could, however, be performed with a stylus or pointing device, such as a mouse or trackball. In addition, whenever the user is described as selecting an object, such as well definition line 18, on the display throughout this specification, it is to be understood that the selection act could be performed in numerous different manners, such as touching the object once, or twice, or three times, or touching the object once and then performing some gesture command, or touching the object once and pulling down a menu from a header bar and selecting a command.

To implement an element well 16 on a present computer system, such as the Macintosh computer system produced by Apple Computer, Inc., the user need only create a display window, a technique which is well known in the art, which has had its appearance modified through use of a custom WDEF defProc. The function of this custom window would be modified in two ways: (1) the title bar would look and work differently so that only the well definition line 18 was visible; and (2) when the window size is changed, it changes the size of the window directly rather than as an outline of the window as is normally done on the Macintosh computer. For more information about creating and modifying windows and the appearance of other computer generated objects, which are well known in the art and need not be described here for an enabling disclosure of the present invention, see, Apple Computer, Inc., *Inside Macintosh*, Vols. 1, II, III, and IV (1985), Addison-Wesley Publishing Company, Inc.

As described above, the appearance of each element is designed to impart some meaning about the particularly unique function of that element to the user. For example, with reference to FIG. 2, the To Do element 20 can be taken from the well 16 and applied to something on the display screen 14 that the user wants to remember to do herself, i.e., the handwritten sentence "Finish the application by Tuesday", or that the user wants the computer 10 to do at a later time, i.e., the handwritten instruction "Review my mail from today". Other elements, such as Remember element 22, Meeting element 24, Calendar element 26, Mail element 28, Print element 30, Phone element 32, and Table-of-Contents element 34, would likewise each have some special function which uniquely pertains to its particular appearance on the display screen 14.

Although the special functions of elements 22 through 34 will be explained in further detail below, it should be noted, however, that elements have a number of general functions which are common to all elements: (1) elements have a visible representation which enables them to serve as pictorial markers or labels; (2) elements may be applied to or associated with particular pieces of data and; (3) elements may be used as targets for a search. In addition, there are a number of functions which could be selectively applied to an element, such as: (1) elements could have and reflect states or actions; (2) elements could specify actions to be automatically done by the computer in the future; (3) elements could partially specify actions such that the user will have the choice, when either applying the element to a document or when the action is to be carried out, of completing the action specification at a later time; and (4) elements could be moved, reassociated with different objects, removed, and have their appearances and functions changed at any time, as desired by the user.

Figure 3:
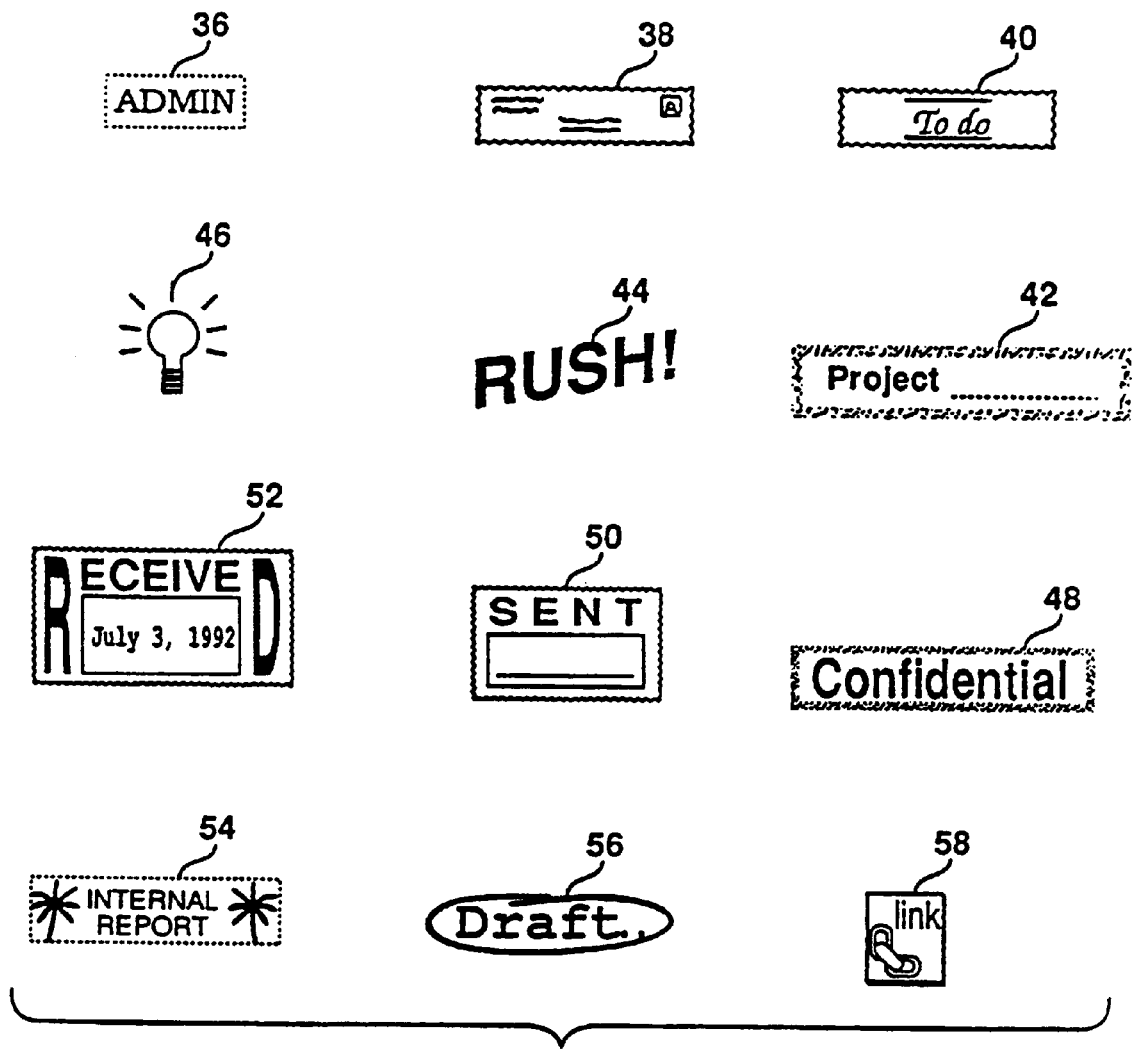
FIG. 3 illustrates a number of additional types of user interface elements, as they would appear on a display screen, in addition to those shown in FIG. 2.

As is illustrated in FIG. 3, the different types of elements and, in fact, the appearances of the same types of element, are unlimited. For example, an element could be very simple, both in terms of its appearance and its function, such as the Administration element 36, which could be used to mark items which are to be distributed to only a limited group of administrative people on a computer network. Likewise, the appearance of the Mail element 38 could be used in place of the appearance of the Mail element 28, and the appearance of the To Do element 40 could be used in place of the appearance of the To Do element 20. Alternatively, the user could use different appearing elements, such as both Mail element 28 and Mail element 38, to designate similar but different types of functions. For example, Mail element 28 could be programmed to cause mail to be sent to one group of people, while Mail element 38 could be programmed to cause mail to be sent to a different group of people.

Although all of the user interface elements referred to so far are generically described as elements, it should be noted that an element actually is comprised of two different parts. One part is the element base and the other part is the element instance. The element base resides in the well 16. When it is selected by a user, the element instance is created as a bit-mapped duplicate of the element base. The element instance, not the base, can then be taken from the well 16 by the user and dropped on a page of the display screen. Alternatively, the element base could be moved from the well 16 after being selected by the user, and the element instance could be created when the element base is applied to a document. Once the instance is created, the base would return to its former position in the well. Many other techniques for using the bases and instances could also be readily developed.

Element bases could be presupplied with software installed on a computer 2 when purchased by the user, supplied with subsequently purchased software run on the computer 2, supplied by vendors who specialize in creating the elements 12, and even created by the user, as will be further explained below. Some of these element bases would be cloneable, meaning they could be duplicated and modified slightly to create a new element base. For example, Project element 42 could be originally supplied or created to only say "Project_", and then be cloned by the user whenever desired to create a special element base, such as "Project Twin Peaks". In the same vein, an existing element base could be used as a template with which to create other element bases that look and act differently from the original.

With element bases being produced at a number of different sources, many uniquely pleasing and functional element bases and element instances could be created. For example, Project element 42 was designed to impart a leather-based, ink-stamped look, with its speckled rectangular boarder. Other interesting elements are the Rush element 44 and the Lightbulb element 46. The Rush element 44 could be singularly used to mark a computer generated document as a rush document, or it could be combined with another element, such as To Do element 40, to indicate that something that is to be done, is to be done immediately. The Lightbulb element 46 could likewise be used to decorate the appearance of a document, such as to indicate a good idea, or it could be used to indicate that something is to be remembered. It should be noted that within the context of the present invention, a "document" includes any electronically generated image for creating and editing data displayed therein, such as a page of text, a spreadsheet page, an electronic mail message screen, a video image or photo, and a folder of the type illustrated in FIG. 6c, but does not include a standard window within which typical iconic images are stored and organized, such as the program, folder and document icons mentioned in the discussion of the prior art above.

FIG. 3 also includes the Confidential element 48, which could be used to restrict access to documents. For example, when a document was marked with the confidential element, only users who entered a password would be able to read the document. Other examples of how the various elements of FIG. 3 could be utilized include: (1) documents marked with the Sent element 50 could cause the document to be automatically dated when sent to somebody; (2) documents marked with the Received element 52 could cause the document to be automatically dated when it was received by somebody; (3) documents marked with the Internal Report element 54 could be restricted to distribution only within a company or an office; (4) documents marked with the Draft element 56 would only print with the word "draft" written across each page; and (5) documents marked with the Link element 58 could be automatically linked to another document or another element located somewhere else in the memory of the computer 2.

An element instance, as briefly described above, is quite different from the element base from which its bit-mapped appearance is derived. Each element instance has one or more element attributes which help to identify the element instance to the system and which may be either system, element base, or user defined. Examples of system defined attributes are the name and type of the element instance and the date and time when the element instance was created. An example of an element base defined attribute is the message "Sent__" of element 50 depicted in FIG. 3 and the program which performs that function. Examples of user defined attributes would include the name "Priority" used to fill in the blank in "Sent__", or a telephone number, a name, or even some notation. By using these element attributes, the computer 2 can store the element instances in a database in its memory, which can then be queried to find and retrieve the elements as desired. Another type of element attribute of a element instance can be its association with other data stored in the computer 2. As will be further described below, an element instance can be associated with either a whole page of a document or a particular feature of a page displayed on the display screen 14. For example, an element instance could be associated with a piece of text in a mail message, or a scribbled phone number on a page.

Figure 9A:
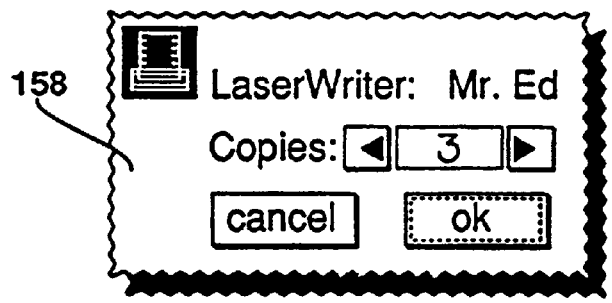
FIG. 9a illustrates the operation of a dialog box generated by activation of a print element.
Figure 9B:
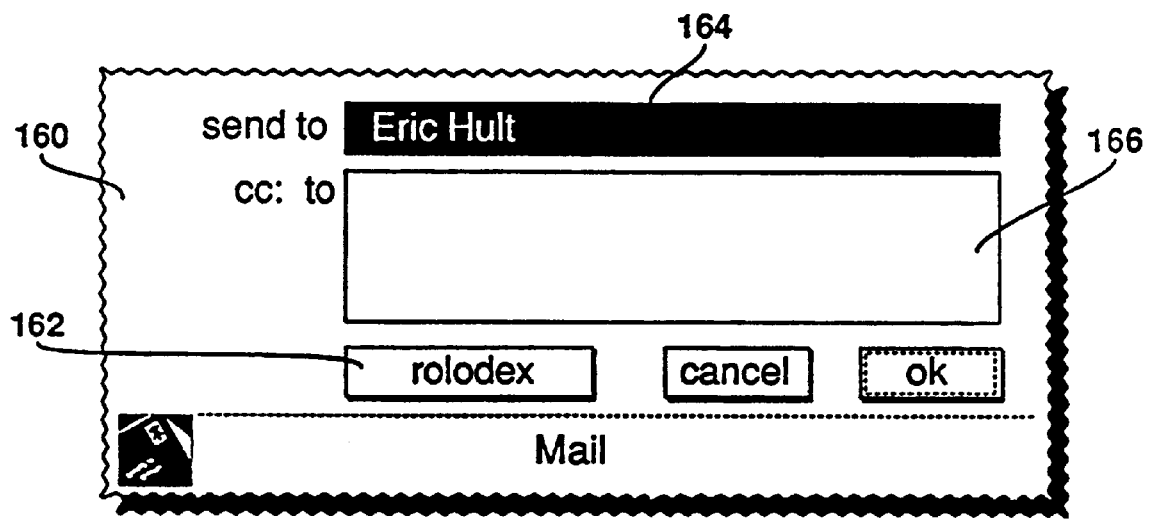
FIG. 9b illustrates the operation of a dialog box generated by activation of a mail element.

User defined element attributes are generally established through use of a dialog box or attribute sheet, which will be further explained below with reference to FIGS. 9a and FIGS. 9b. Each type of element could have its own dialog box which, if desired, would be particularly designed for use with that element. For example, the Phone element 32 could have a number of user definable attributes, such as the telephone number and the person's name. If the computer system with which the elements were being used did not have a keyboard or handwriting recognition capability, the dialog box for the Phone element 32 could be designed to include a keypad for entering numbers and names, or some other means for entering such data. Other element attributes for each type of element could also be developed as is appropriate for each type of element utilized in the computer 2. Additional features and element attributes of the various types of elements will be further explained below.

Figure 4A:
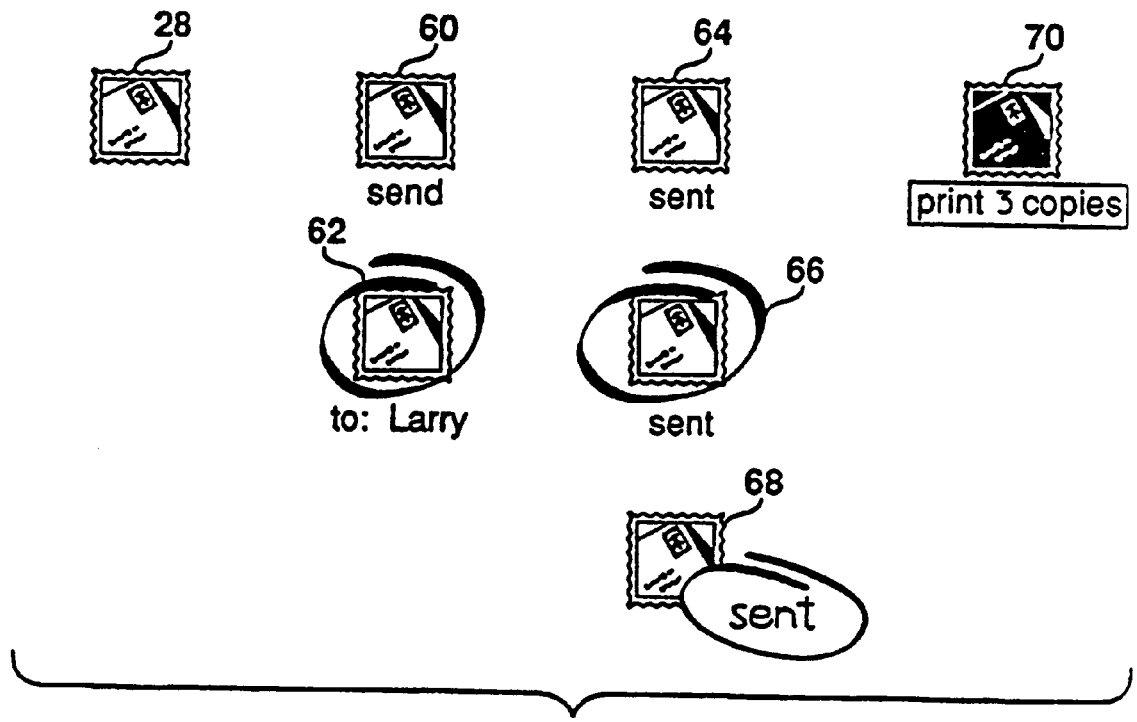
FIG. 4a illustrates the operation of a mail element and how this element would appear on a display screen during different levels of operation.

An additional feature of an element instance is that an instance can be modified internally by the computer 2, without disturbing any previously stored element attribute information, as the element passes through different levels of operation. FIG. 4a illustrates how Mail element 28 operates and how the appearance of the element instance for the Mail element 28 changes during its various levels of operation. When first pulled from the well 16 and marked on a document, the Mail element 28 appears the same as in FIG. 2. After the user has entered attribute information about the Mail instance, the appearance of the element instance may be modified accordingly. In addition, the Mail instance may change as the status of the operation which it is to perform changes. Mail element instance 60 has been modified to let the user know that the user has already commanded the document to which the instance 60 is attached to be sent to someone. Mail element instance 62 performs the same function, but also includes element attribute information about who will be mailed the document. After the document has been sent, the element instance could again be modified to indicate that the document has been sent as commanded through use of Mail element instance 64, instance 66, or instance 68. Element instances could also be modified to indicate other functions or operations of the element. For example, if the dialog box for Mail element 28 included a print element attribute and allowed the user to specify the number of printed copies, Mail element instance 70 might be displayed on display screen 14. Likewise, Mail element 28 could be combined with Print element 30, as will be explained below, so that attributes of the Print element 30 carried over the Mail element 28, resulting in the creation of Mail element instance 70.

Figure 4B:
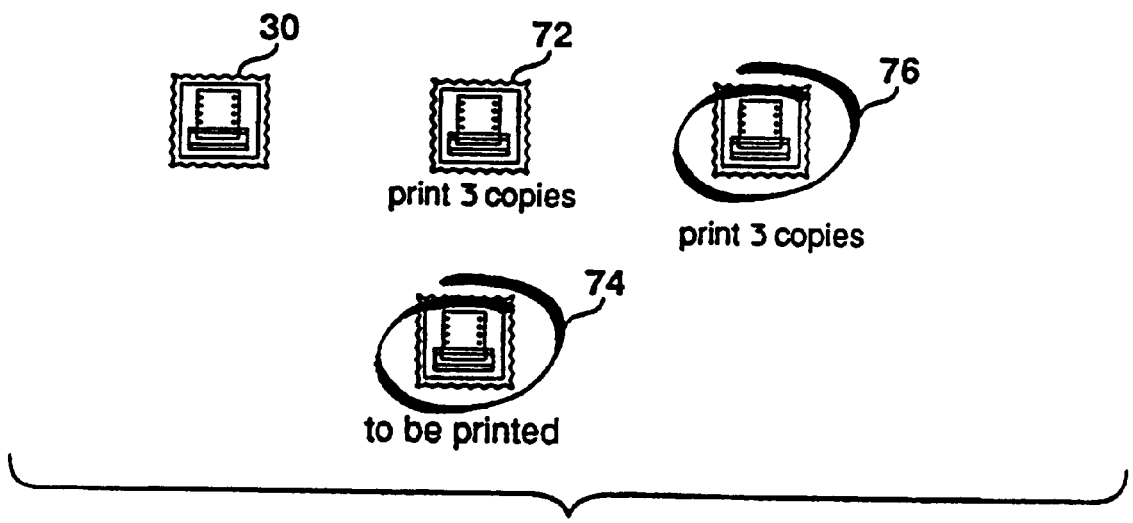
FIG. 4b illustrates the operation of the print element and how this element would appear on a display screen during different levels of operation.

FIG. 4b similarly illustrates how Print element 30 operates and how the appearance of the element instance for the Print element 30 changes during its various levels of operation. For example, after the user has entered attribute information about the Print instance, the appearance of the element instance would be modified to reflect this information if a user indicates that she desires to print three copies of the document, Print element instance 72 might be created. Alternatively, the modification could simply reflect that the document is to be printed, as is illustrated by Print element instance 74, rather than include information in the element instance about the number of copies to be printed. After the document has been printed, the Print element 30 could be modified like Print element instance 76, to indicate that the document, and perhaps a certain number of copies, had been printed.

Figure 5A:
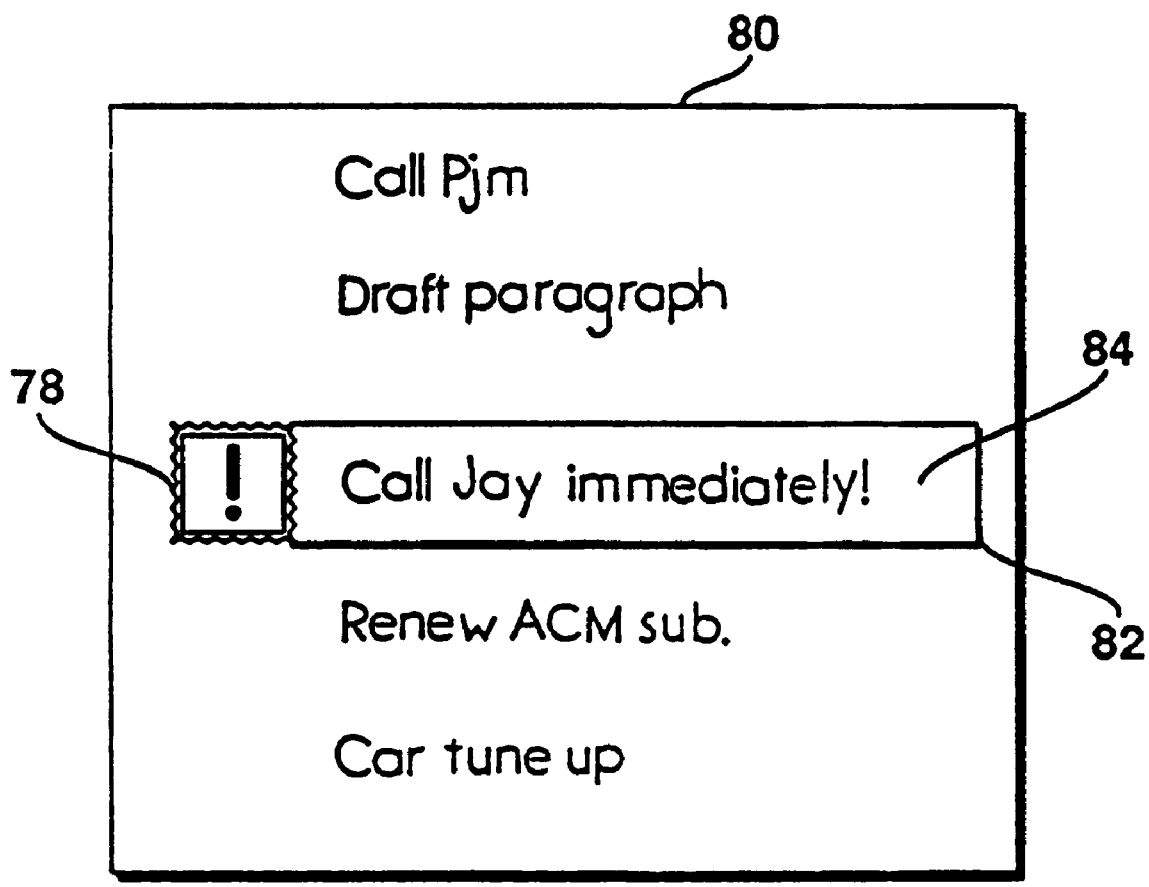
FIGS. 5a and 5b illustrate two different techniques for attaching data on a display screen to a user interface element for subsequent processing.
Figure 5B:
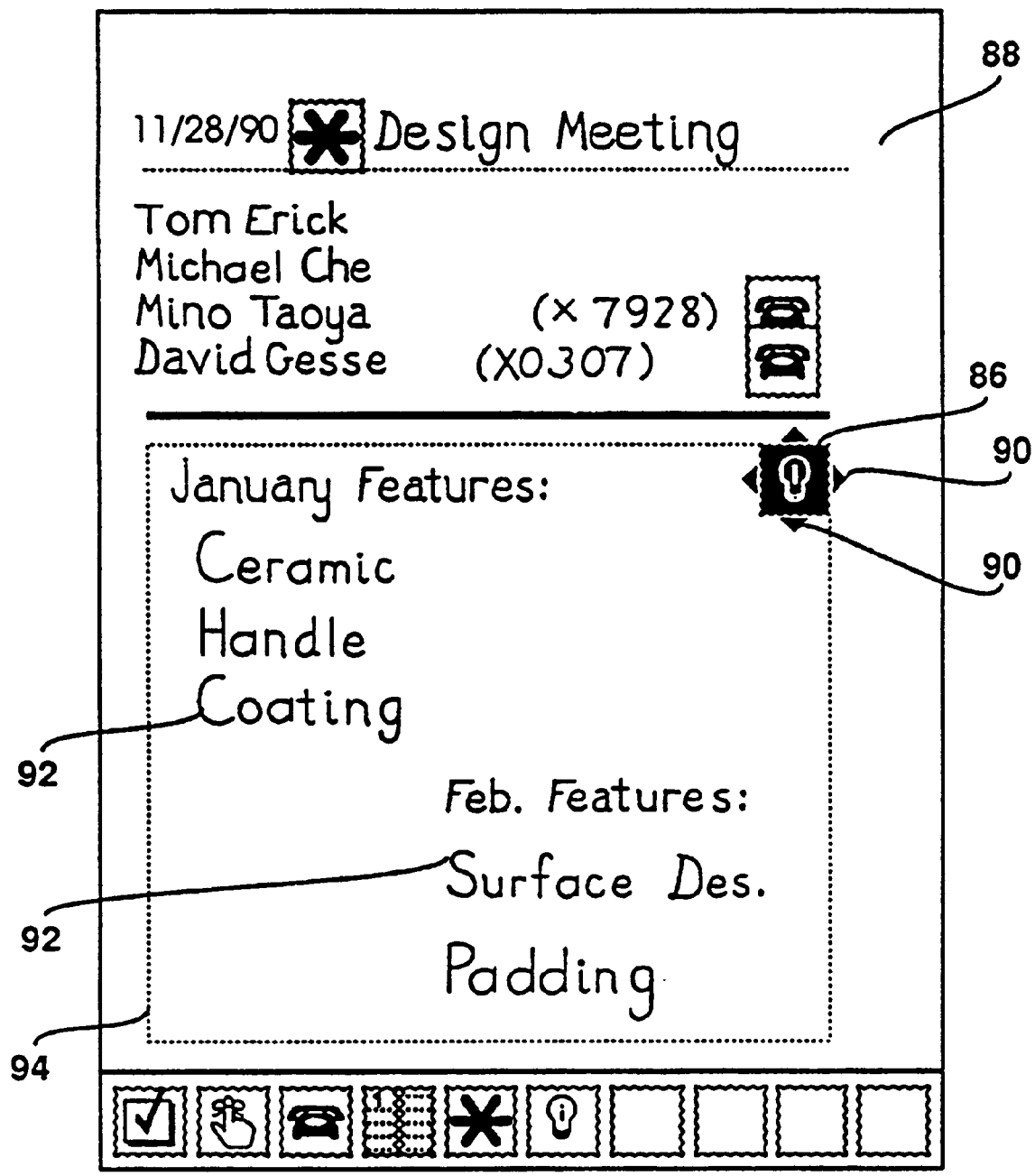

As previously discussed, the ability to associate data stored in the computer 2 with an element instance is an important element attribute of many elements. FIGS. 5a and 5b illustrate two different techniques for attaching data on a display screen to an element. A first technique is illustrated in FIG. 5a. Element instance, such as Notice element instance 78, is removed from the well 16 and marked on the document 80, which consists of a number of handwritten notes, and then dragged across the document 80 in such a manner that the data to be associated with the element instance is enclosed by a framing box 82 issued from instance 78. The action of enclosing data within a framing box 82 to select that data on a display screen 14 is essentially the same action which is performed by selection tools of many publicly available drawing and painting software programs. In FIG. 5a, the user has attached the note "call Joy immediately!" 84 to the Notice element instance 78, by placing instance 78 behind the word "immediately!" and then dragging instance 78 across note 84 to the front of the word "call". Had the user also wanted to enclose the notes above note 84, the user could have simply continued to drag instance 78 to the top of the document 80, thereby enclosing the additional data. When the user had enclosed all of the desired data, the user would release instance 84, which would in turn cause framing box 82 to disappear and cause instance 78 to stay at its last position on document 80. Although framing box 82 would disappear once instance 78 had been released, an element attribute defining the enclosed data would be entered in the database of computer 2 so that the attached data could be found and displayed when collected through use of the proper query at a later time.

FIG. 5b illustrates a second technique for associating data in a document with an element instance. In this technique, when Lightbulb element instance 86, the appearance of which is inversed to indicate that it is in its association mode, is marked on document 88, a set of pointers 90 appear, one on each side and one on each corner of instance 86, which indicate the direction instance 86 can be moved to enclose data. If instance 86 had been marked in the bottom left-hand corner of document 88, and then moved up and over to the right of document 88, it would end up where presently located on document 88, and enclose the notes 92 in framing box 94. Releasing instance 86 from its association mode would then cause the pointers 90 and framing box 94 to disappear from document 88, and instance 86 to revert to its standard appearance, a black element and lightbulb outline with a white background.

Figure 6A:
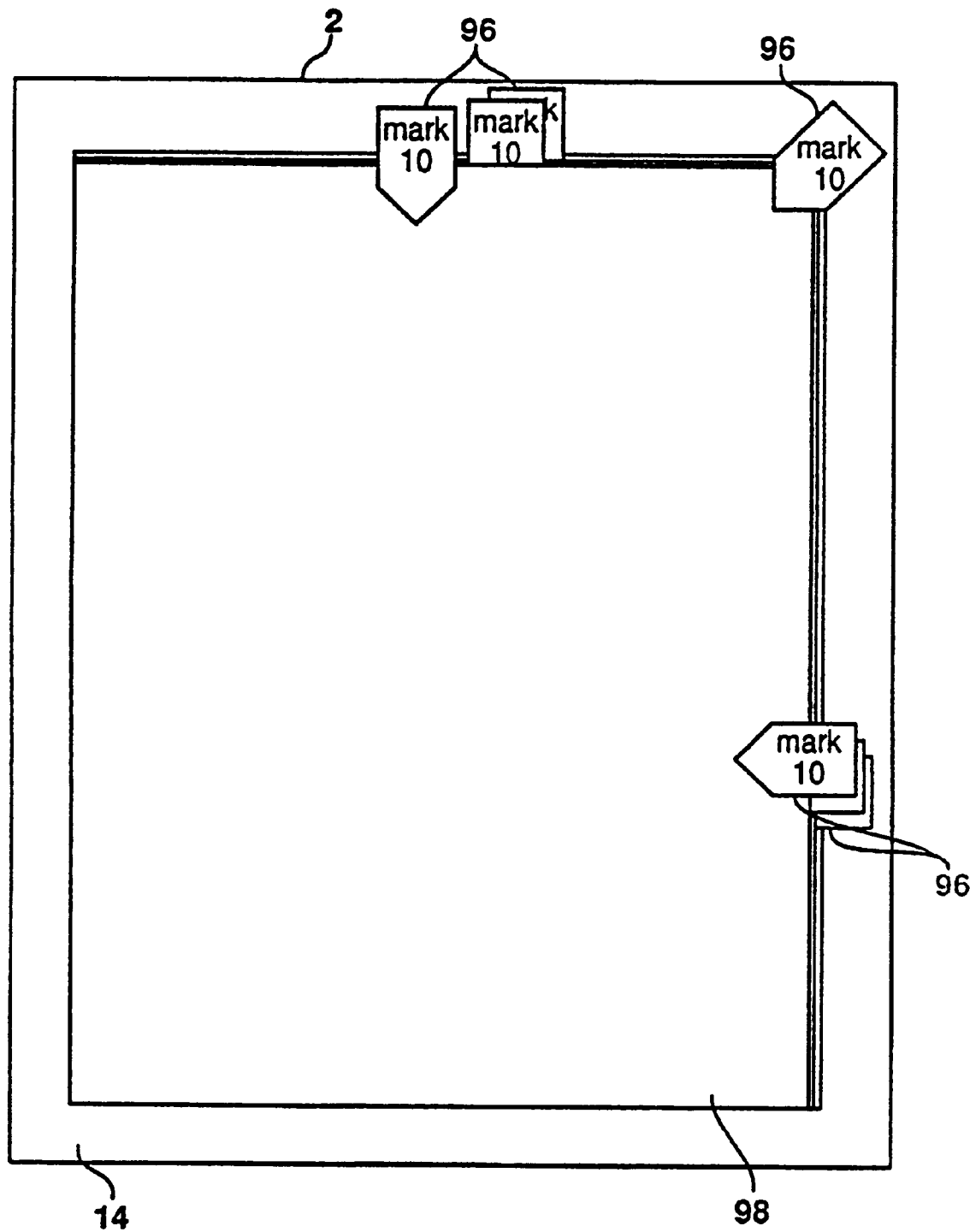
FIG. 6a illustrates a technique for marking a page of data on a display screen with one or more user interface elements.
Figure 6B:
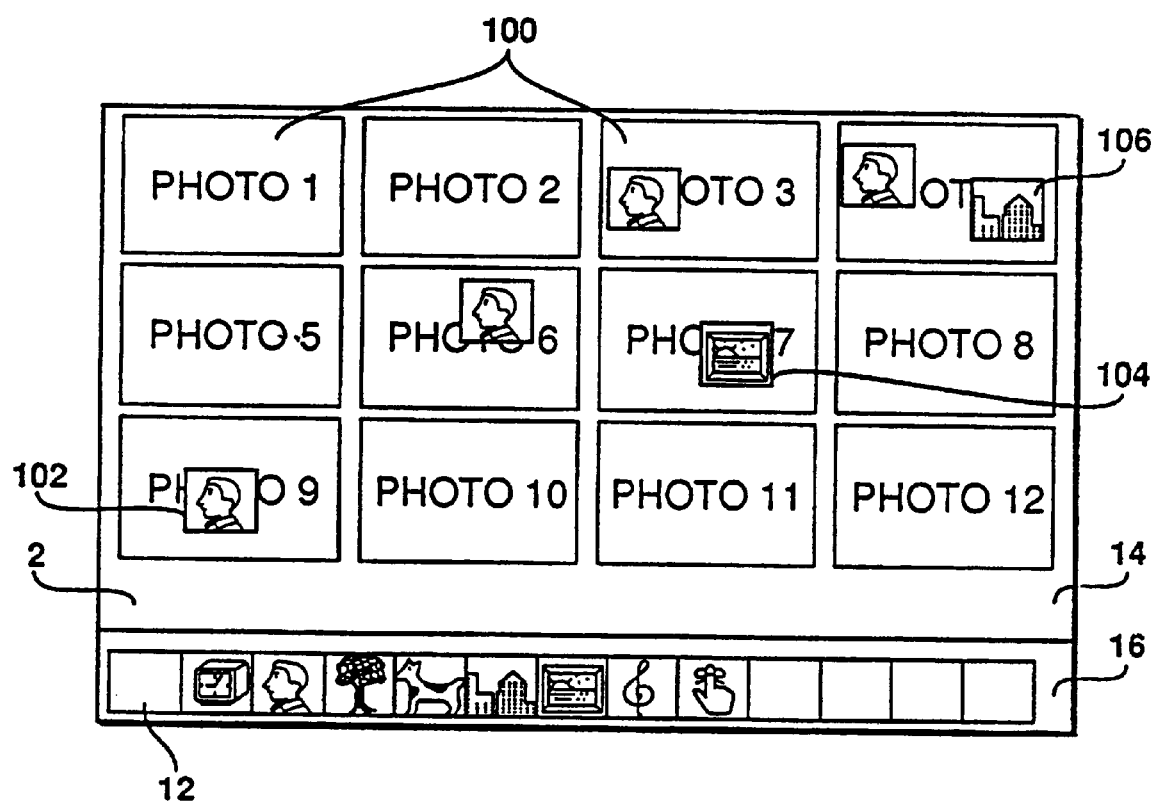
FIG. 6b illustrates a technique for marking portions of data on a display screen with one or more user interface elements.
Figure 6C:
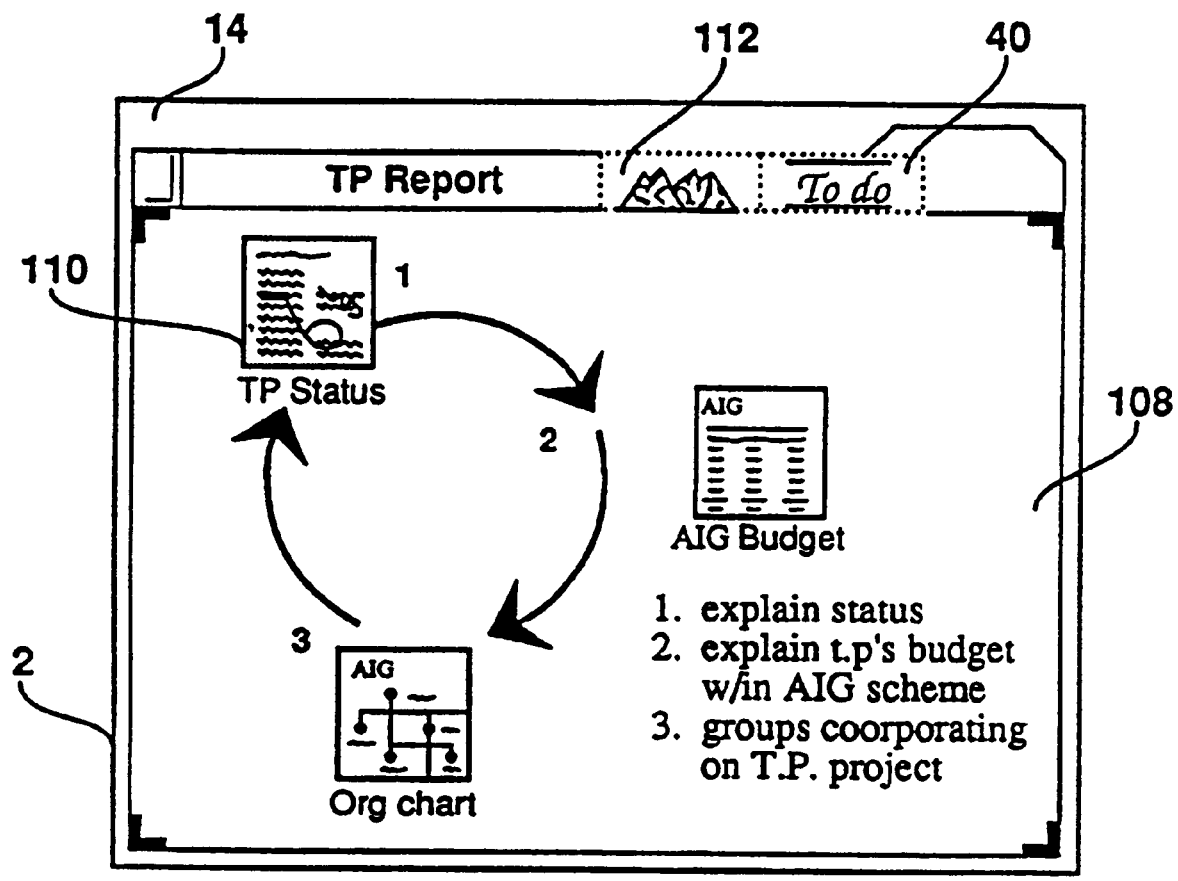
FIG. 6c illustrates a technique for labeling a folder of data on a display screen with one or more user interface elements.

Element instances can also be associated with entire pages of data in a computer, as is illustrated in FIG. 6a, distinguishable portions of data on a page of data, as is illustrated in FIG. 6b, or folders containing multiple pages of data and other types of information, as is illustrated in FIG. 6c. FIG. 6a illustrates a technique whereby different pages of data on display screen 14 are marked with elements, thereby associating each page with any element marking that page. Mark element instances 96 could be placed at any position desired on page 98, but would preferably be placed on page 98 so that they would still be somewhat visible if page 98 was covered by another page at a later time, as is demonstrated by the other visible portions of Mark element instance 96 on pages behind page 98. As shown in FIG. 6a, all of the Mark element instances 96 have identical element attributes, they are all numbered "10", but could also be assigned different numbers, as desired by the user, to further distinguish each element instance.

In FIG. 6b, the computer 2 is being utilized to run a software program which allows the user to view a number of photographs 100 labeled Photo 1 through Photo 12 pictured on display screen 14. In this scenario, the user would like to mark certain photographs 100 with different elements 12 from the element well 16 in order to remember certain things about each photograph and to aid the user in later sorting through the photographs 100. Since the software program which displays the photographs 100 is capable of distinguishing between the various photographs and the display screen space occupied by each of the photographs, the user need only mark a photograph with an instance to mark the photograph and thereby associate the information in the photograph with the element used to mark it. For example, photographs 100 labeled Photo 3, Photo 4, Photo 6 and Photo 9 all contain pictures of people the user wants to remember, so the user marks each of these photographs with the Participants element instance 102. Photo 7 contains information about the user's recent trip to Japan, so it is marked with the Rising Sun element instance 104. Photo 4 also contains information about a city the user visited while in Japan, so it is marked with the City element 106.

FIG. 6c illustrates that element instances can be used to mark folders of data on a display screen. Computer 2 has an image of a folder 108 displayed within display screen 14. Folder 108 could both display data, such as the notes 11 0 pictured on the front of folder 108, and act as a storage for other information which relates to the marks associated with the folder 108. In FIG. 6c, folder 108 is marked with two element instances, the Twin Peaks element instance 112, which relates to the project the user is working on, and the To Do element instance 40, which indicates that certain documents within the folder 108 are marked with the To Do element instance 40. This feature of marking folders with element instances is useful because by simply marking a folder with an element instance, such as Twin Peaks instance 112, all of the documents containing the Twin Peaks instance 112 would be collected within folder 108.

Other methods of marking data may be used. For example, similar to the embodiment described in FIG. 6b, in one embodiment the act of selecting an element 12 from the element well 16 and placing it on a page of data, marks the entire page of data with the instance. In general, whenever the software program may distinguish between different portions of data such as a page, or a photograph, marking of an entire such portion may be done by selecting the element 12 and placing it on the portion to be marked. In this embodiment, lesser portions of the data may be still be marked, for example, by the methods described in conjunction with FIGS. 5a and 5b. Alternatively, in one embodiment, the user may mark data by selecting an element 12 from the well 16 and placing it near the data of interest. Next, the data is marked by lassoing or circling the data to be marked, using, for example, the user's finger or a stylus on a touch sensitive screen. In alternative embodiments, data to be associated can be first lassoed, and then associated with an element 12 by selecting the element 12 from well 16 and placing it near or within the lassoed data.

Figure 7A:
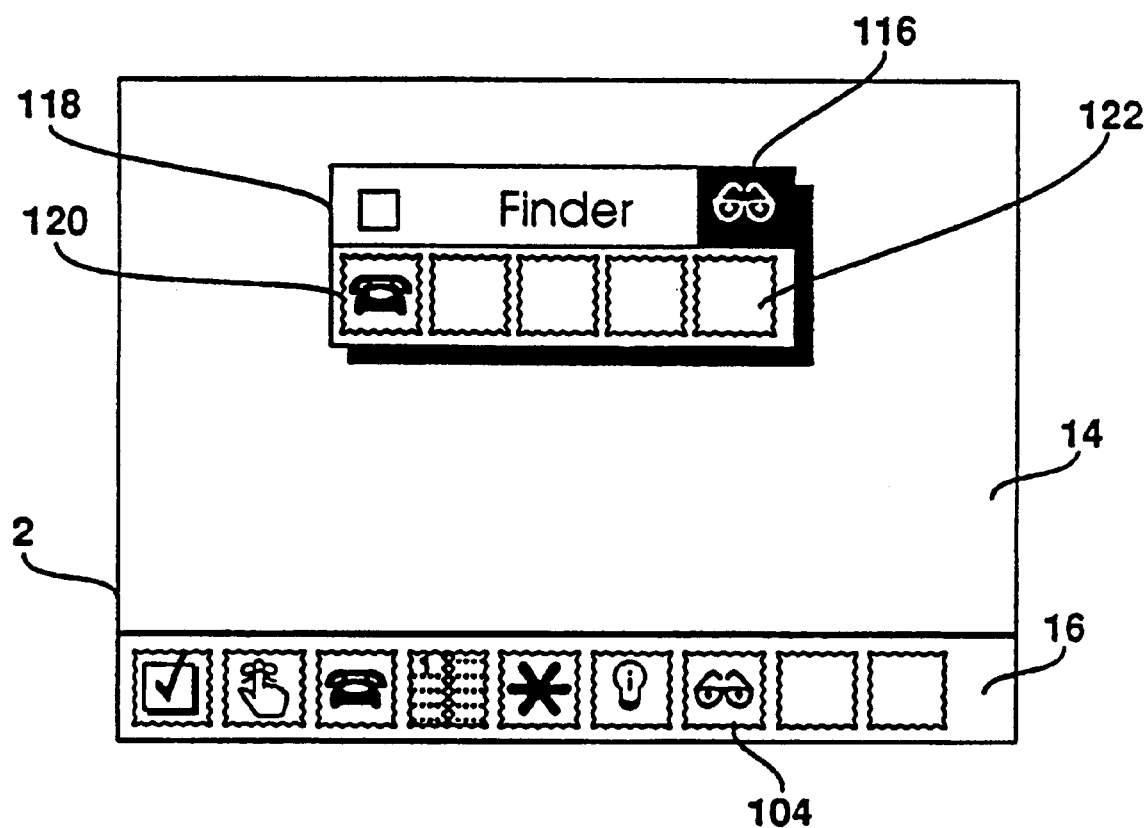
FIG. 7a illustrates a technique for finding user interface elements in a computer system.

As described above, the various attributes of an element can be used to find data stored in the computer 2. One technique for querying the element database of computer 2, is shown in FIG. 7a, which illustrates a folder tool for filtering through stored instances to find data that matches the query constructed by the user. By selecting the Find element 104 in the well 16 of display screen 14 and moving an instance 116 of element 104 into the display screen, the user causes a finder tool box 118 to be opened on the display screen. To find particular data, the user need only select an instance of that element from the well 16, such as Phone element instance 120, and drop the instance into one of the query boxes 122 of the finder tool box 118. The processor 6 of computer 2 would then proceed to filter through the database in its memory 8 until it had found all of the documents or pages containing the Phone instance 120, which acts as a proxy to the data stored in memory 8.

Depending on how the Phone instance was utilized, the user would then be shown a collection of documents or pages containing the queried element and data from documents that had been previously associated with that element.

Figure 7B:
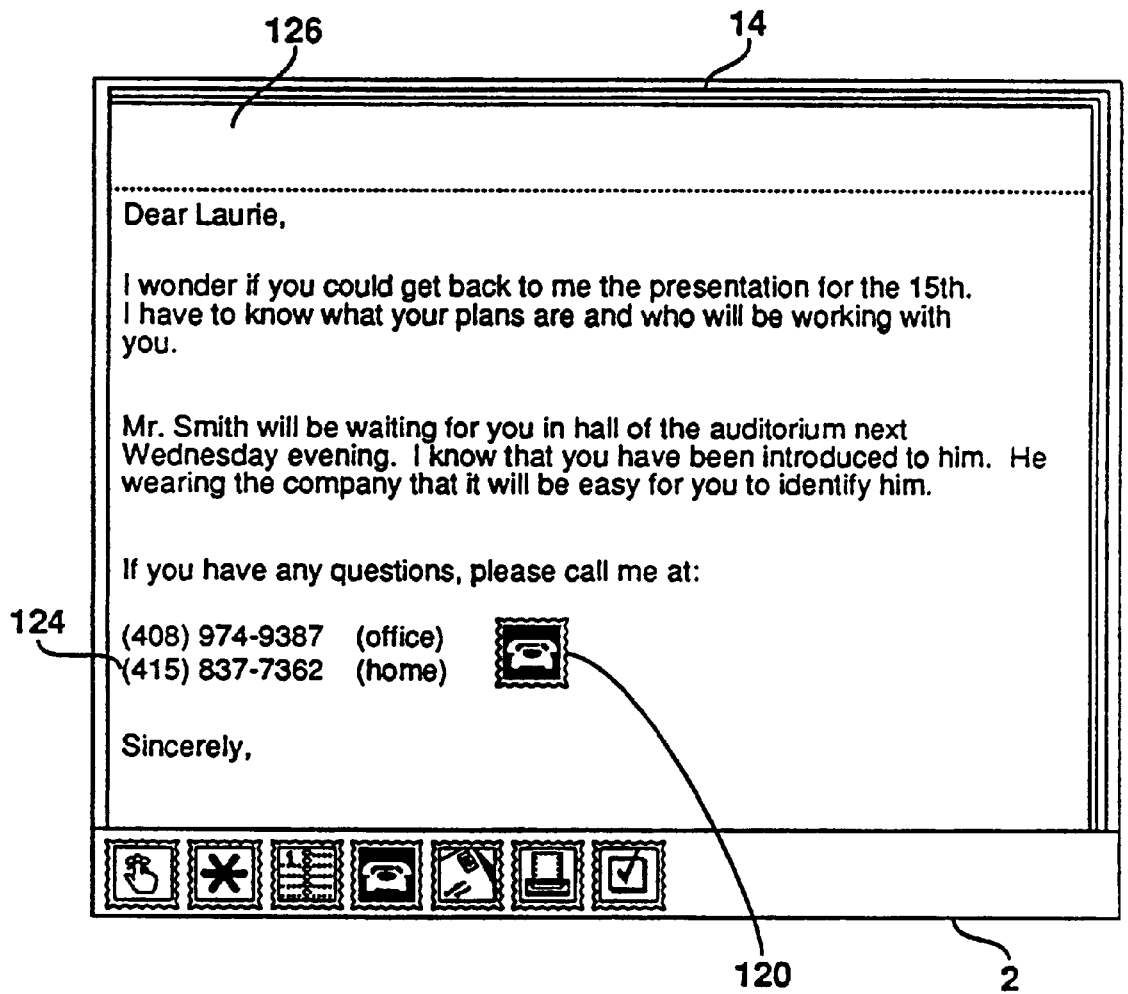

For example, FIG. 7b illustrates the results of the find operation performed in accordance with FIG. 7a, wherein a number of pages were found to contain the queried Phone element instance 120. In addition, the user has associated certain notes 124 on a number of the pages, such as page 126, so notes 124 are highlighted by the computer 2 to indicate that they are associated to Phone instance 120. In FIG. 7b, material which was not associated with Phone instance 120 is grayed-out, for example by removing alternating lines of pixels from the display screen 14, thereby causing the associated material to visually stand out to the user. Had the user not associated any particular data with the instance, the entire page, without any section highlighted, would have been displayed.

More sophisticated filter queries could also be performed by computer 2 if additional features were added to finder tool box 118, such as a term search section. The performance of this feature, however, would be highly dependent on whether the user had the ability to enter recognized text. If the computer 2 is capable of having text characters entered, such as through a keyboard, then the computer could easily search for matching sets of text characters within the data associated to each queried element. If the user could not enter text in this fashion, the user may still be able to copy text from the display screen 14 and paste the copied text into the term search section. Of course, this would only work if the text being searched for exactly matched the text stored in the term search section. In addition, it should also be noted that the user could perform hierarchical searches through use of the finder tool box 118 illustrated in FIG. 7a by simply placing additional element instances in the remaining query boxes 122. Hence, the computer 2 would first filter through all of the data to locate data associated with Phone element instance 120, and then filter through that data to find data associated with the next element instance, etc., until all of the queried boxes 122 had been processed.

Figure 8A:
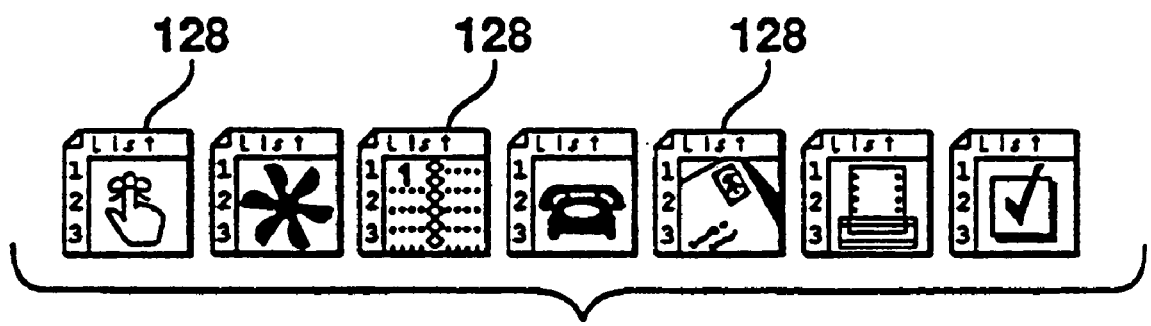
FIG. 8a illustrates a series of user interface elements which can be used to create lists of associated elements without performing a find operation.
Figure 8B:
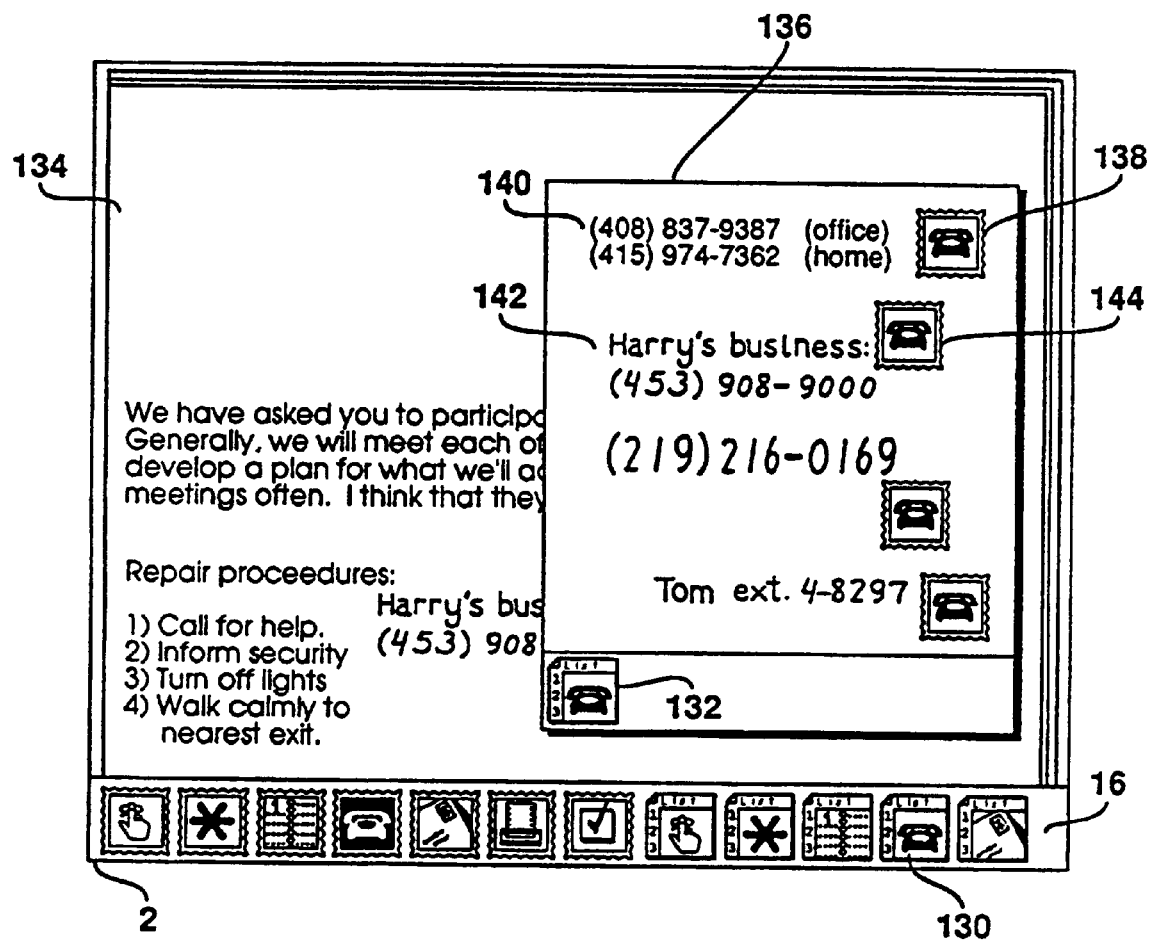

Another technique for collecting element instances is shown in FIG. 8a, which illustrates a series of list elements 128 which can be used to create lists of elements with common attributes without performing a find operation. List elements give the user a simple means of viewing all of a particular type of element stored in the database and also provides the user with an opportunity to go directly to the page that is marked with one of the elements listed, as will be described below. As shown in FIG. 8b, when the user selected the List Phone element 130 from well 16 of the display screen of computer 2 and moved its instance 132 onto page 134, a list 136 of phone element instances, such as instance 138, and the instances' associated notes, such as note 140, was created. If the user then selected one of the listed notes, such as note 142, consisting of the handwritten message "Harry's business (453) 908-9000", the computer 2 would then automatically proceed to display the page 134 on which the selected note 142 and instance 144 appeared. If an element instance is associated with the entire page as opposed to a portion of the page, the element's associated data to be shown in list 136 of FIG. 8b may be, for example, 1) a generic text or iconic representation indicating the data is the whole page, or 2) a miniature representation of the actual page (e.g., shrunk down bitmap).

As an alternative to the list elements 128 of FIG. 8a, in one embodiment the computer system displays list 136 by simply selecting and deselecting an element while it is in well 16. That is, the user may simply position a cursor over the element of interest, while pressing and releasing a signal generation device, or, on a touch sensitive screen, by momentarily touching the user interface element of interest in well 16. If the user desires to filter by more than one element, the user may sequentially perform the above described select and deselect operation in well 16 for each element of interest. As each element is chosen, the list 136 is updated to list only those items in the database having each of the chosen elements. Additionally, if desired, an instance of each chosen element may be displayed in the bottom portion of the list 136. Thus, this latter embodiment allows for the listing of instances and associated data, of data marked with one or more instances, without the need for separate list elements corresponding to each element.

In a currently preferred embodiment, the user interface system of the present invention uses each instance such as instance 138 and instance 144 of FIG. 8b as a proxy or pointer to the location in memory of the marked data. In creating a list such as list 136 of FIG. 8b, the system retrieves the data from the pointed to location in the memory, and causes the data to be displayed as a part of list 136 for each element instance. In a currently preferred embodiment, this process is continuously performed. Therefore, if a list is displayed on the display device while a change to the underlying marked data is carried out, the changed data will then be displayed in the list. For example, if the name of the business on page 134 of FIG. 8b were changed from "Harry's business:" to "Sam's business:", note 142 of list 136 thereafter would display "Sam's business:" in place of "Harry's business:".

Figure 8C:
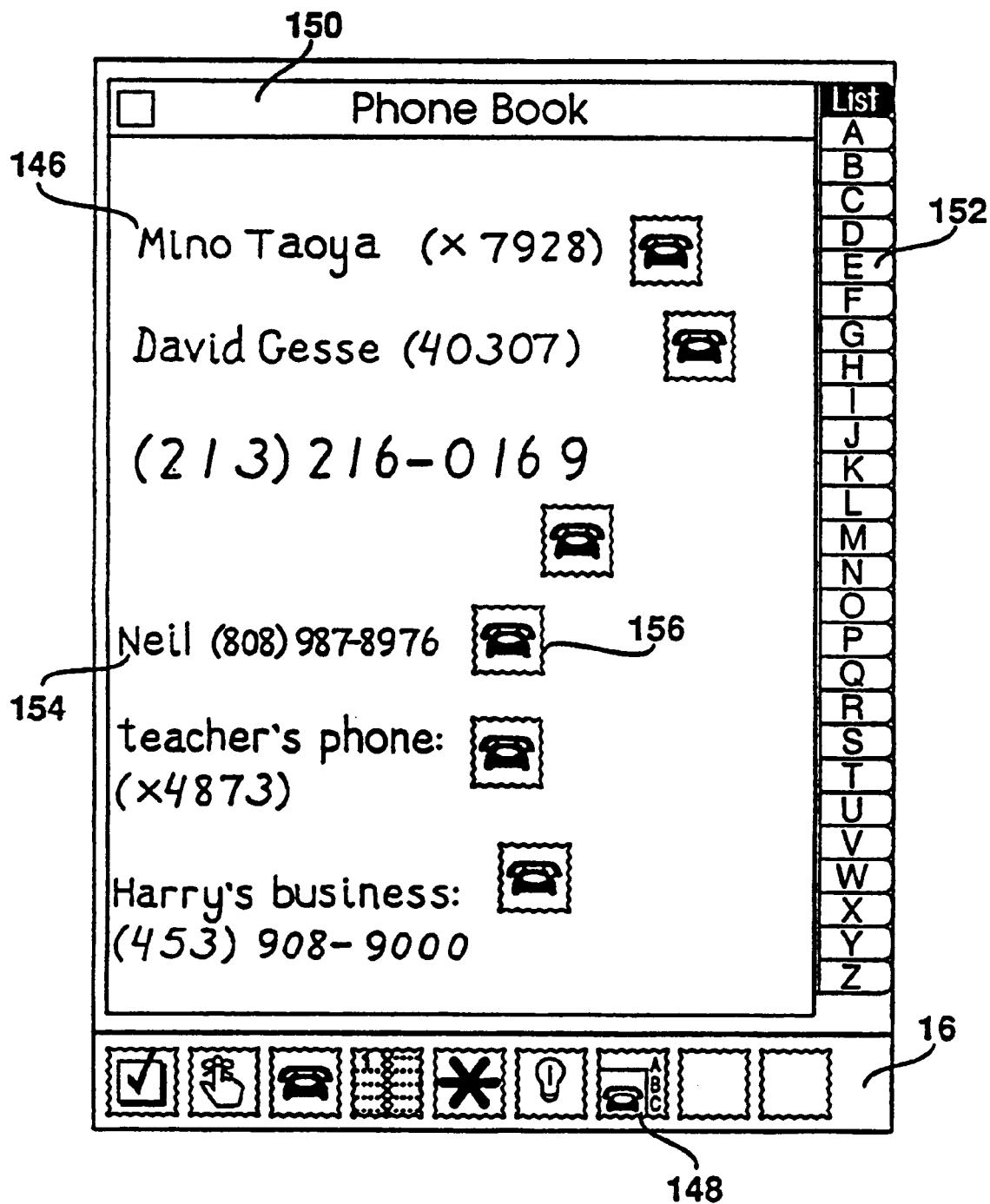
FIG. 8c illustrates a technique for cataloging a list of user interface elements and their attached data.

Since the list 136 of notes in FIG. 8b are not listed in any particular order, such as alphabetically, as might be possible with a computer that was capable of receiving text, some means of cataloging the notes from list 136 should be provided. FIG. 8c illustrates one such technique for cataloging a list of elements and their attached data. After creating a list 146 of instances and associated notes, the user would select the Phone Book element 148 from the well 16 and drag its instance onto the list 146. The computer 2 would then know to change the appearance of the list 146 so that the Phone Book header 150 appeared at the top of the list 146 and the alphabet catalog 152 appeared at the right of the list 146. To alphabetize the list using the Phone Book that has now been created, the user need only select and drag a note and the attached instance, such as note 154 ("Neil (808) 987-8976") and instance 156, and drop it into the appropriate letter, in this case the letter "n", of the alphabet catalog 152. The computer 2 would proceed to take note 154-and instance 156 and place them on a new list with any other notes and instances that had previously been placed into the letter "n". After placing the notes and instances into the appropriate letters, the user could access the notes stored under a particular letter by selecting that letter from the alphabet catalog 152.

As specified above, elements are noted as having two basically different parts, the element base and the element instance, one of which, the instance, is derived from the other, the base. But elements can also be specified as having two different functional characteristics as well, the active element and the passive element. Passive elements are generally only used to mark and associate data and to locate that marked or associated data at a later time, although some passive can also be used to perform very specific functions which require no user interaction to perform. Active elements have scripts or actions (programmed functions) associated with them, which may be as simple as "open dialog box when instance is created" or as complex as "perform these actions when the computer is re-connected . . . "

Active elements typically open their dialog box or attribute sheet immediately upon the creation of the element instance. An example of an active element is the Print element 30. When the user marks a page to be printed with an instance of the Print element 30, the attribute sheet, in this case the print dialog box 158 of FIG. 9a, appears on the page as well. The user then interacts with the dialog box 158, such as by specifying the printer that will print the marked page, setting the number of copies to be printed, and determining whether to approve the attributes or to cancel the dialog box 158.

Mail element 28 is also an active element. When an instance of Mail element 28 is marked on a page, mail dialog box 160 of FIG. 9b also appears on the page. The user can interact with this dialog box to determine whom the page will be sent to and to whom it will be carbon copied ("cc"). Since the user may not be able to write down the names of the addressees and have the computer understand what has been written, a number of precoded names and address information would be made available to the user through selection of the rolodex button 162. Selection of rolodex button 162 would cause a list of possible names to appear from which the user could chose, thereby causing the chosen name to appear in either the send to box 164 or the cc: to box 166, depending on which box was selected at the time the user selected the rolodex box 162.

Figure 10A:
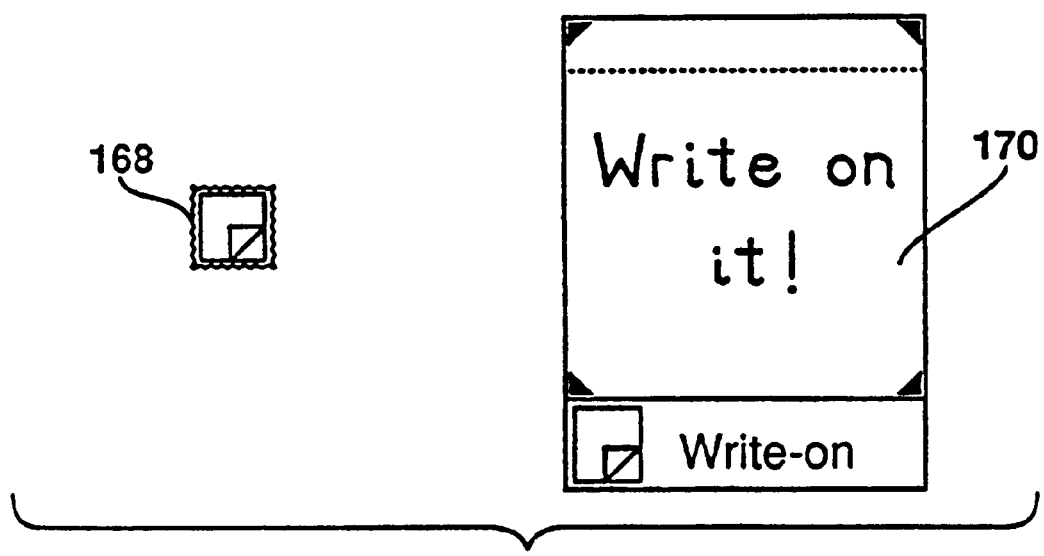
FIG. 10a illustrates the operation of a write-on it element and a dialog box generated by activation of the write-on it element.

Another type of active element is the write-on element 168 of FIG. 10a. When a user marks an instance of write-on it element 168 on a page, write-on it dialog box 170 appears on the page. The user can then scale the write-on it dialog box 170 to any size and write whatever note within the dialog box 170 that the user desires. Write-on it dialog box 170 can also be moved to any position on the page and can be left open by the user so that it can act as an extra writing area of the page, just like a 3M Corporation PostIt™ note can be attached to a piece of paper.

Figure 10B:
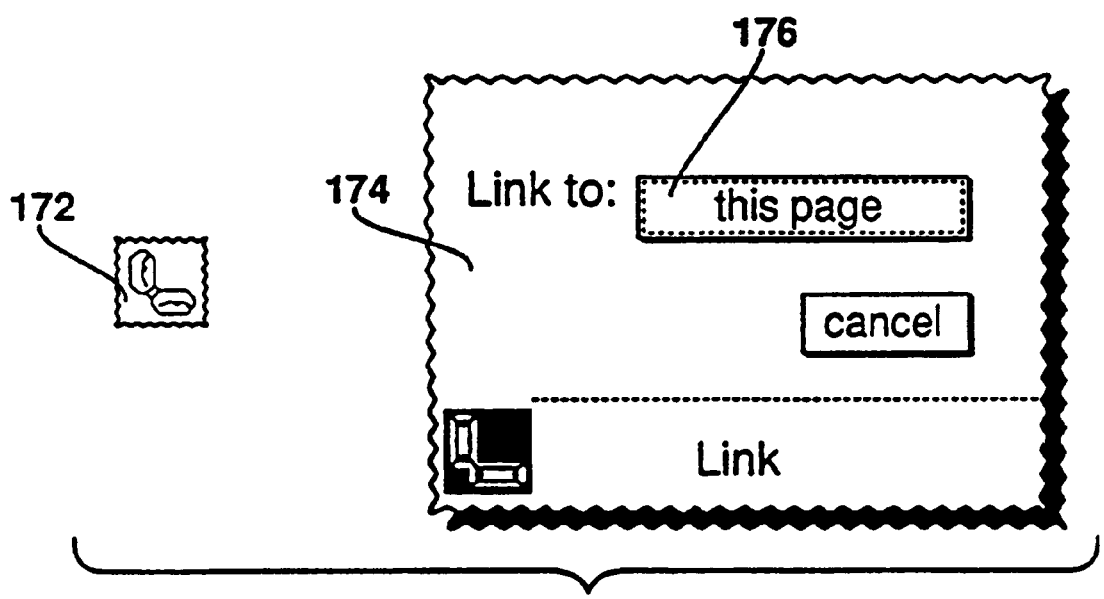
FIG. 10b illustrates the operation of a link element and a dialog box generated by activation of the link element.

Link element 172 of FIG. 10b, which is the functionally the same as link element 58 of FIG. 2, only different in appearance, is also an active element. When an instance of link element 172 is marked on a page, link dialog box 174 appears. Link dialog box 174 will then stay visible on the display screen 14 while the user pages through the various pages of information stored in computer 2. When a desired page is located, the user then selects the "this pages" button 176 causing an instance of the link element 174 to be marked on the desired page and causing the computer 2 bounce back and display the original page on which the instance of the link element 172 was originally attached. To jump between the linked pages in the future, the user would only need to select the instance of the link element 172.

Figure 11:
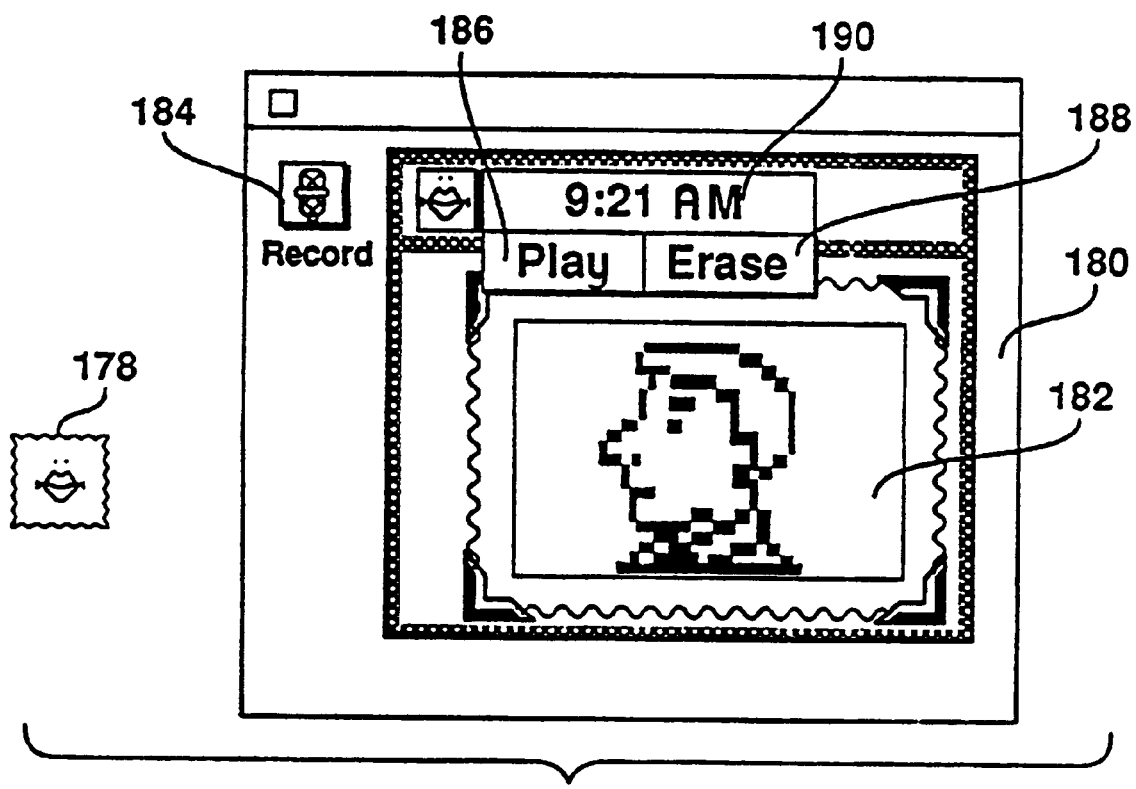
FIG. 11 illustrates the operation of a dialog box generated by activation of a sound element.

A more complicated active element is that of sound element 178 of FIG. 11. This element would typically be used to mark and associate a photograph or some other image with an instance of the element and then also associate sound to that photograph of image through use of the sound dialog box 180. For example, if the user associated the picture 182 to an instance of sound element 178, at least a portion of picture 182 would appear within sound dialog box 180. The user could then use the record button 184 to activate a recorder of the computer 2, which the user could speak into or record some other sound with for storage in memory 8, until the recorder button 184 was again selected or a maximum amount of record time had passed. The user could then playback the recorded sound by selecting play button 186 or erase the sound by selecting erase button 188. The time header 190 would indicate when the sound was recorded. After the sound had been recorded, the user could playback the sound without accessing the dialog box 180 by simply selecting the instance of the sound element 178 attached to the original picture 182. Of course, dialog box 180 could be reaccessed at anytime by selecting the instance of the sound element 178 in a different manner.

Figures 12A, 12B:
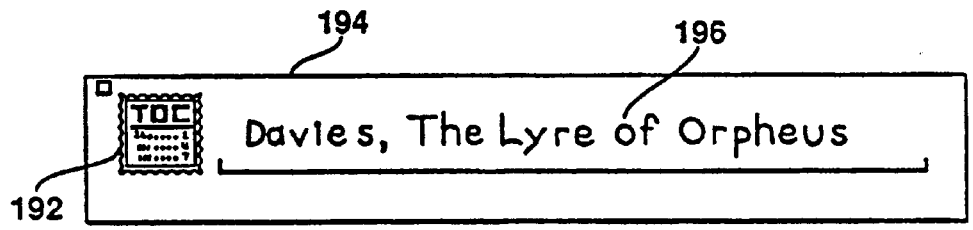
FIG. 12a illustrates the operation of a table-of-contents element and a dialog box generated by activation of the table-of-contents element.
FIG. 12b illustrates the results of a table-of-contents list operation as performed by a table-of-contents list element.

When instance of the table-of-contents element 192 of FIG. 12a is marked on a page, it causes the computer 2 to open the table box 194, within which the user can write a title or other note 196 concerning the information stored on the marked page. The note 196 is then associated with the instance, along with information about the page number of the page marked with the instance, and stored in memory 8. After marking numerous instances of table-of-contents element 192 on different pages of the same document or within a notebook of the computer 2, marking the instance for the list element version of Table-of-contents element 192 on a page will cause the table-of-contents list 198 to be displayed. List 198 includes each of the notes 200 that the user previously entered in each table box 194, as well as the corresponding page number that was associated by the computer 2 after entering a note 200. Page numbering may also be associated with other elements, such as, for example, phone element 32 of FIG. 2. Each instance, such as, referring to FIG. 8b, the instance 138 and its associated note 140, may have an associated page number displayed alongside when a list of that element's instances is created.

Having previously explained the basic principal features and operation of the various types of elements, FIGS. 13a through 13d go on to further illustrate, in general terms, how these elements operate within a computer system, such as computer 2 of FIG. 1. It should be noted that the process described in the flow chart of FIGS. 13a through 13d is only a small portion of a user interface system, and has been greatly generalized to reduce the level of confusion that would otherwise be caused by attempting to explain the detailed operation of every possible type of element in this flow chart. However, since many of the various possible types of elements have been described in detail with reference to the above figures, there should be nothing enabling missing from the disclosure made herein. It should also be noted that the images of the various elements, dialog boxes and other features of the user interface elements of the present invention, in addition to the software program needed to perform the process described in FIGS. 13a through 13d, as well as the details of the various processes described elsewhere in this specification, could be readily created by a person of ordinary skill in the art using a version of the C programming language, such as C++. In addition, many of the software programmed functions described herein could also be performed in hardware using specialized hardware integrated circuit devices, such as an ASIC.

Figure 13A:
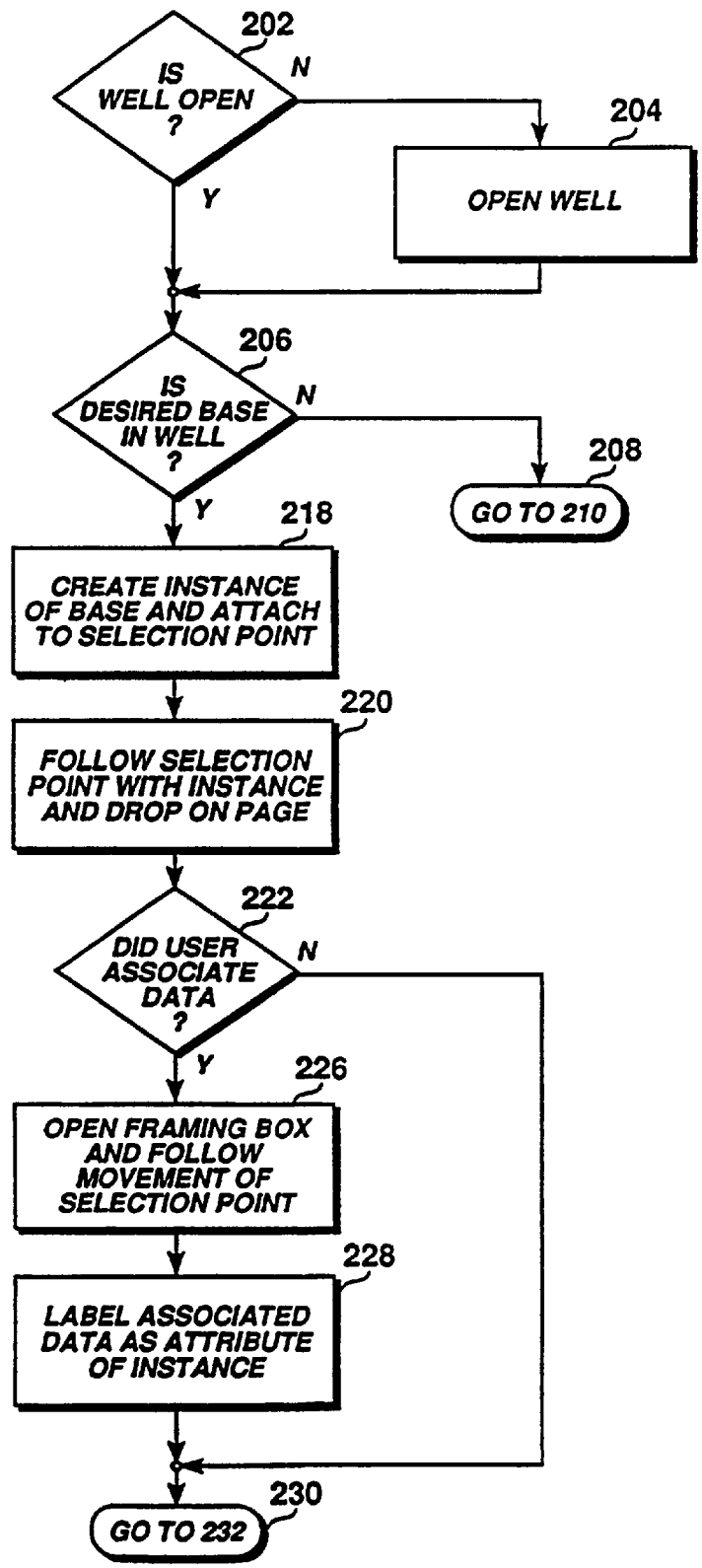
FIGS. 13a, 13b, 13c and 13d are flow charts illustrating the operation of the user interface elements of the preferred embodiment of the present invention.

Now, with respect to FIG. 13a, the process starts by looking to see if the element well 16 had already been opened as a result of a prior operation, block 202. If the well 16 had not been opened, it would be opened in block 204. In a notebook type computer with a touch sensitive display panel, the user would probably open the well by selecting the well definition line 18 and moving the line 18 upward until the desired or maximum height for the well 16 had been achieved.

Once the well 16 had been opened, the user would then search through the content of the well in search of the desired element base required to perform the desired function of the user, block 206. If the desired element base was not in the well, the user would go on, block 208, to either clone an existing base, block 210 of FIG. 13b, or create a new base using an element base maker tool, block 212. The operation of the element base maker tool is further explained below with reference to FIG. 14. If a base could be cloned, the user would proceed to make a clone of the base, for example by first selecting a base to clone and then selecting a clone command from a menu of available operations. The user would then proceed to modify the clone by adding any desired attributes, and perhaps changing the base's appearance as well, block 214. Regardless of how the new base is created, once it was created, it would then be placed in the well 16 by the computer 2 so that it could be utilized to create instances, blocks 212 and 214. The system would then return, block 216, to the flow chart illustrated in FIG. 13a to create an instance of the selected element base, block 218.

After creating the instance of the selected base in block 218, the computer 2 would then attach the instance to the selection point created by the user, for example by pressing a finger against the display screen 14. The instance would then follow the selection point created by the user out of the well 16 and drop-off (affix or mark) onto the page when the selection point was removed, block 220. Upon being marked on the page, the computer 2 would store identifying information about the instance in the element instance database of memory 8. If the user then selected the dropped off instance and selected the association command, block 222, from the menu of available operations, the user could then enclose associated data with a framing box, such as framing box 82 or framing box 94, or may lasso or circle the associated data as described earlier, block 226. The associated data would be labeled as an attribute of the instance and stored in the element instance database, block 228. Alternatively, in the embodiment where a portion of data such as a page of data is marked by applying an element to the page, after block 220, the computer 2 labels the portion as an attribute of the instance. At this point, or in the event that the user chose not to associate data with the instance, block 230, the computer 2 would proceed to see if the selected instance was active, block 232 of FIG. 13c.

If the selected instance was active, the computer 2 would open a dialog box on display screen 14, block 234, within which the user could enter various attributes. If the user does not okay these attributes, block 236, the dialog box is canceled, erased from the display screen, as are the attributes that the user may have just entered, block 238. On the other hand, if the selected instance was passive, or the user okayed the attributes entered in block 234, the authorized attributes, along with any system defined or element base defined attributes, are stored in the database of memory 8, block 240. After storing the instance attributes, the computer 2 looks to determine if the programmed function of the instance is immediate or delayed, block 242. If the function performance is to be delayed, block 244, the programmed function is stored in memory 8, block 246 of FIG. 13d, until a predetermined triggering event occurs, block 248, like the computer is connected to a printer. If the function performance is to be done immediately, block 250, or the trigger event of block 248 occurs, the programmed function is performed and any relevant resulting data is displayed on the display screen 14, block 252.

If the user then desires to perform any other operation with the instance, block 254, that function is performed in block 256 such as returning to block 248 to determine if the trigger event has occurred. In addition, if the user wants to move an instance's position on a page or remove an instance from a page, the user could now perform that operation. The user could also select the instance or any other instance in order to change the attributes of that instance, or the user could perform a find operation to locate an instance and its associated data, etc. When the user has finished performing all other operations with the instance, the process is ended, block 258, until the well 16 is again accessed for another instance.

Figure 13B:
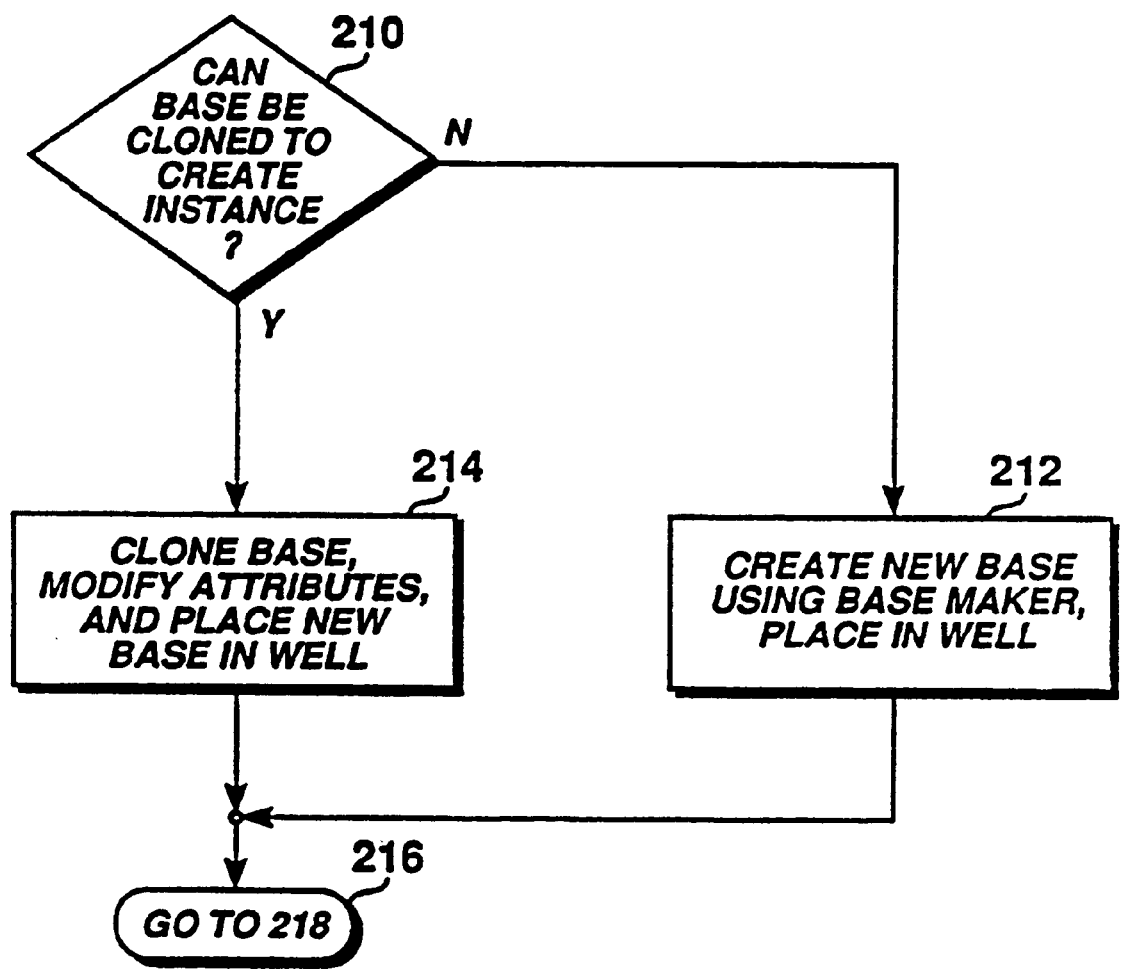
Figure 13C:
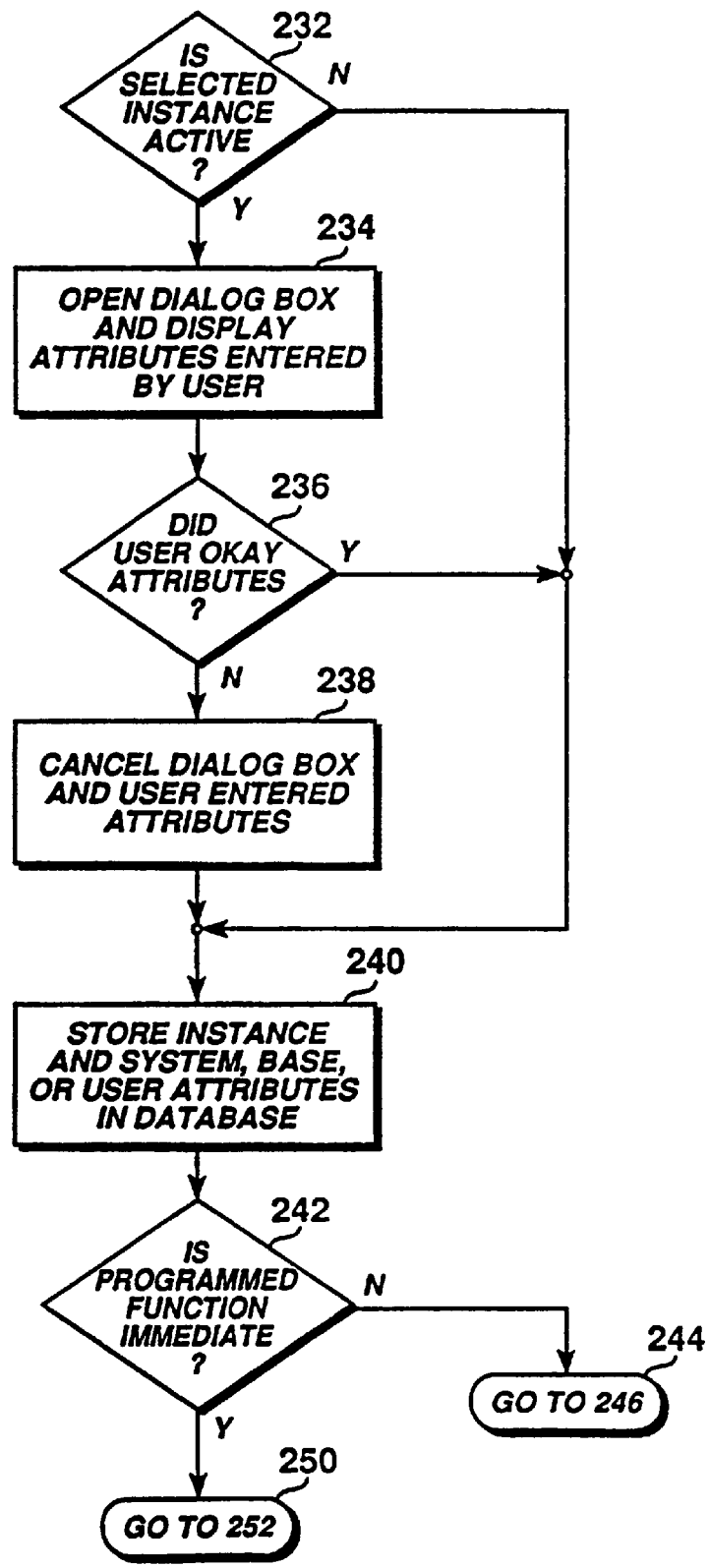
Figure 13D:
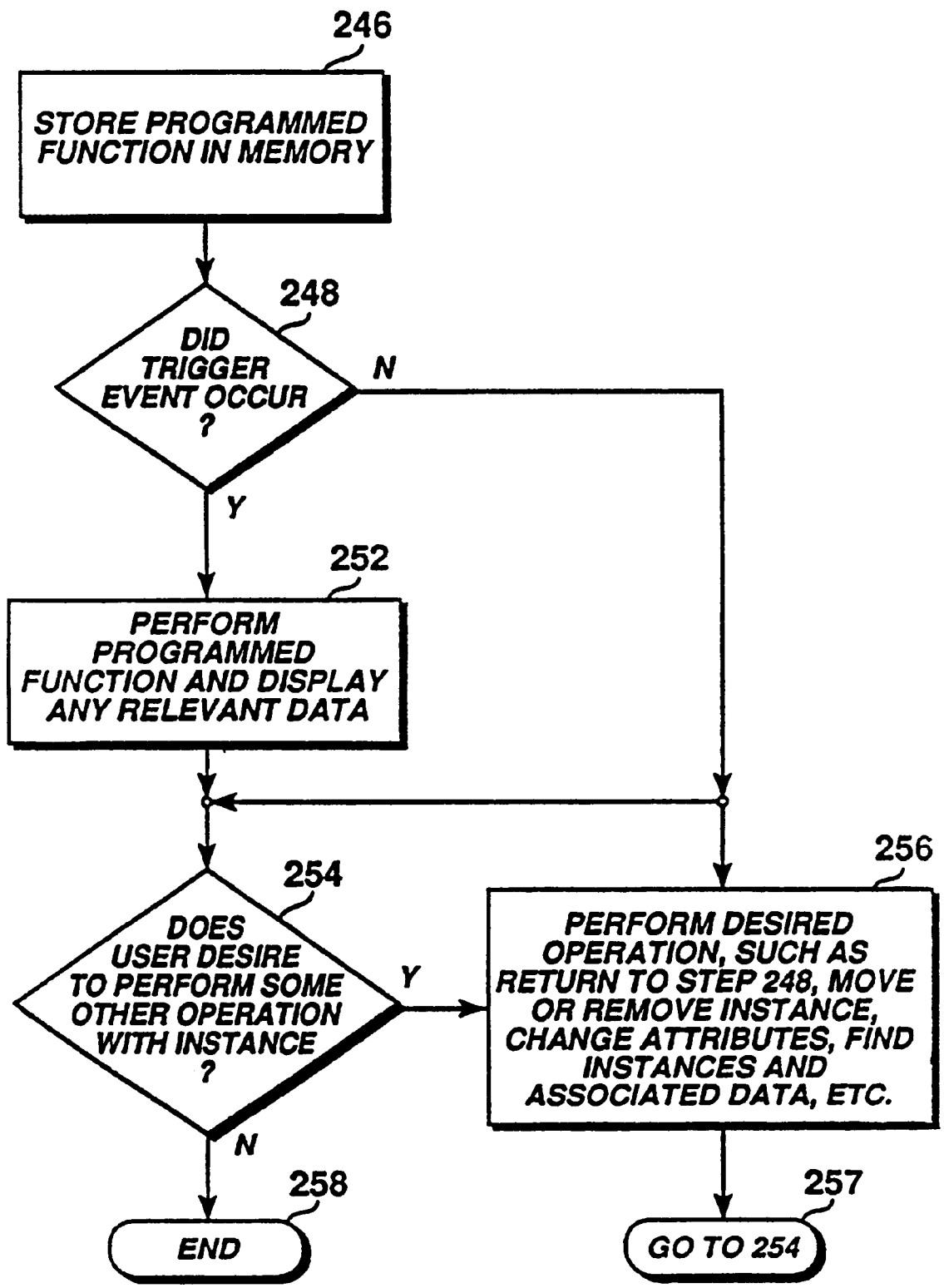
Figure 14A:
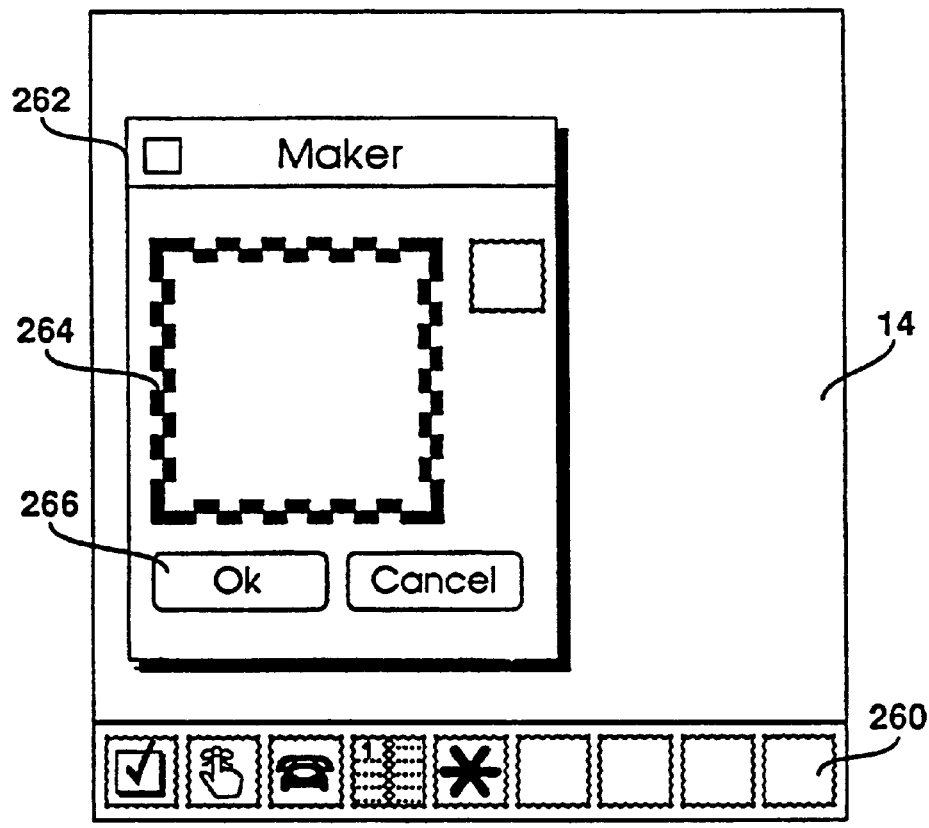
FIG. 14a illustrates the operation of a blank element and an element maker dialog box generated by activation of a blank element.

As described in FIG. 13b, the user can create a new base using the base maker element base 260 of FIG. 14a, which appears as a blank element base. When an instance of base 260 is marked on a page, dialog box 262 is opened on the display screen 14. The user could then draw an image within the base maker box 264 to create the desired appearance of the base 260 and its derived instances. Once the user has decided on the image to be displayed by the new base 260, the user would press the Ok button 266, which would then cause a blank script window, not shown, to be opened on the display screen 14, within which the user could write a program script for controlling the function of base 260. If the user didn't want to write an entirely new program or simply wanted to change the image used for another base, the user could simply copy the program from another base and paste it within the script window for base 260. Naturally, if computer 2 had no means for entering or editing text, it would be most difficult for the user to create new scripts without importing them from a preprogrammed floppy disk, memory card, or data connection with another computer. However, if the script lines that the user would want to use are fairly common ones, the user could open a list of premade possible script lines and copy and paste script lines from the list into the open script window. If the user could enter and/or edit text, the user could naturally write her own scripts in the open script window. Although a new scripting language which is totally appropriate for the type of computer with which the elements are being used would be preferred, the elements of the present invention can be programmed using a program language such as the HyperTalk language mentioned above.

Figure 14B:
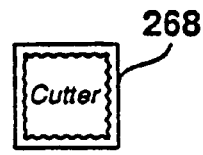

An alternative embodiment to the technique of using base 260 to enclose data within a framing box to create an image for display by the new base is shown in FIG. 14b, which illustrates the cutter element base 268. To use the cutter base 268, the user would select base 268 from the well 16 to create an instance of the base 268. The user would then move the instance around the page on the display screen until the instance was centered over an image from the page that the user wanted to use to create the image for the new base, at which point the user would drop the instance on the page, thereby causing the image over which it was centered to be copied and pasted into the new base and its instance for display. To make this process easier on the user, the user would be able to see through the empty instance of the element cutter base 268 to see the page underneath until the instance was dropped on the page.

Figure 14C:
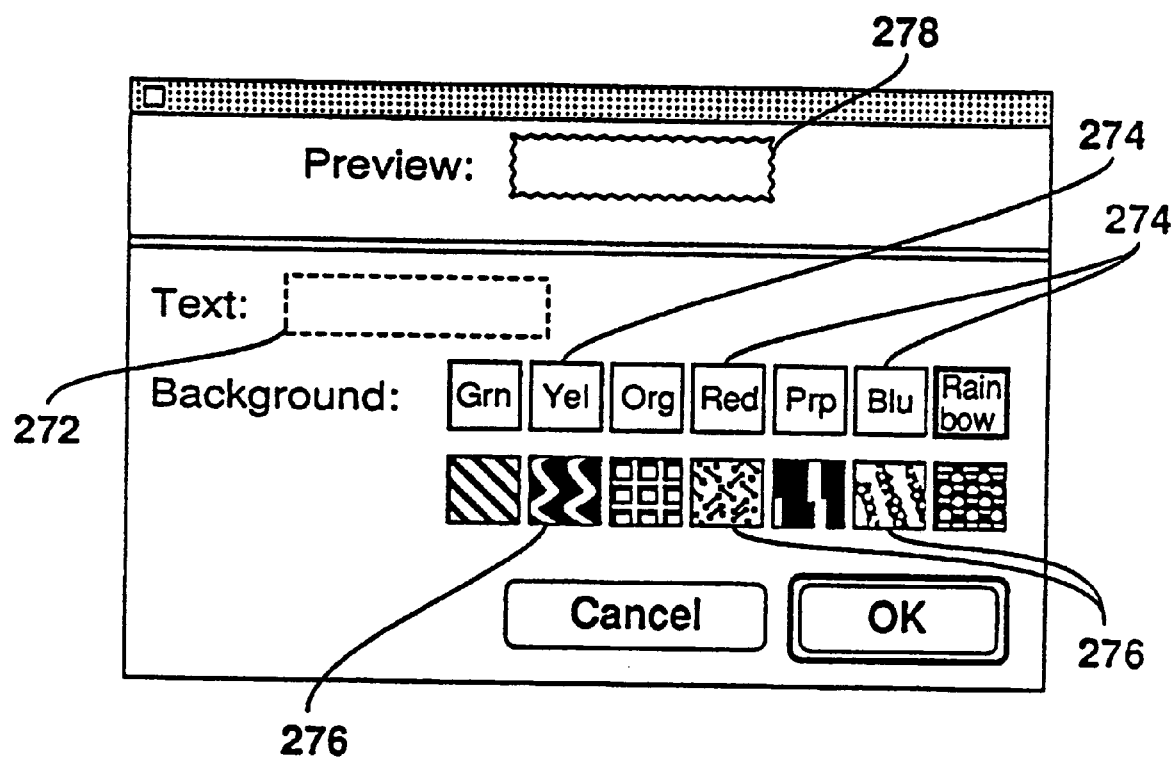

FIG. 14c illustrates a modified version of the base maker dialog box 264 of FIG. 14a. In base maker dialog box 270, the user has the option of writing her own text and selecting various background colors and/or patterns for display in the new base and its instance instead of an image from the page. The user would first write whatever message the user wanted to in the text box 272, and then select one of the background colors from amongst color buttons 274 and/or one of the patterns from amongst pattern buttons 276. The newly created image could then be previewed in preview box 278.

Figure 15A:
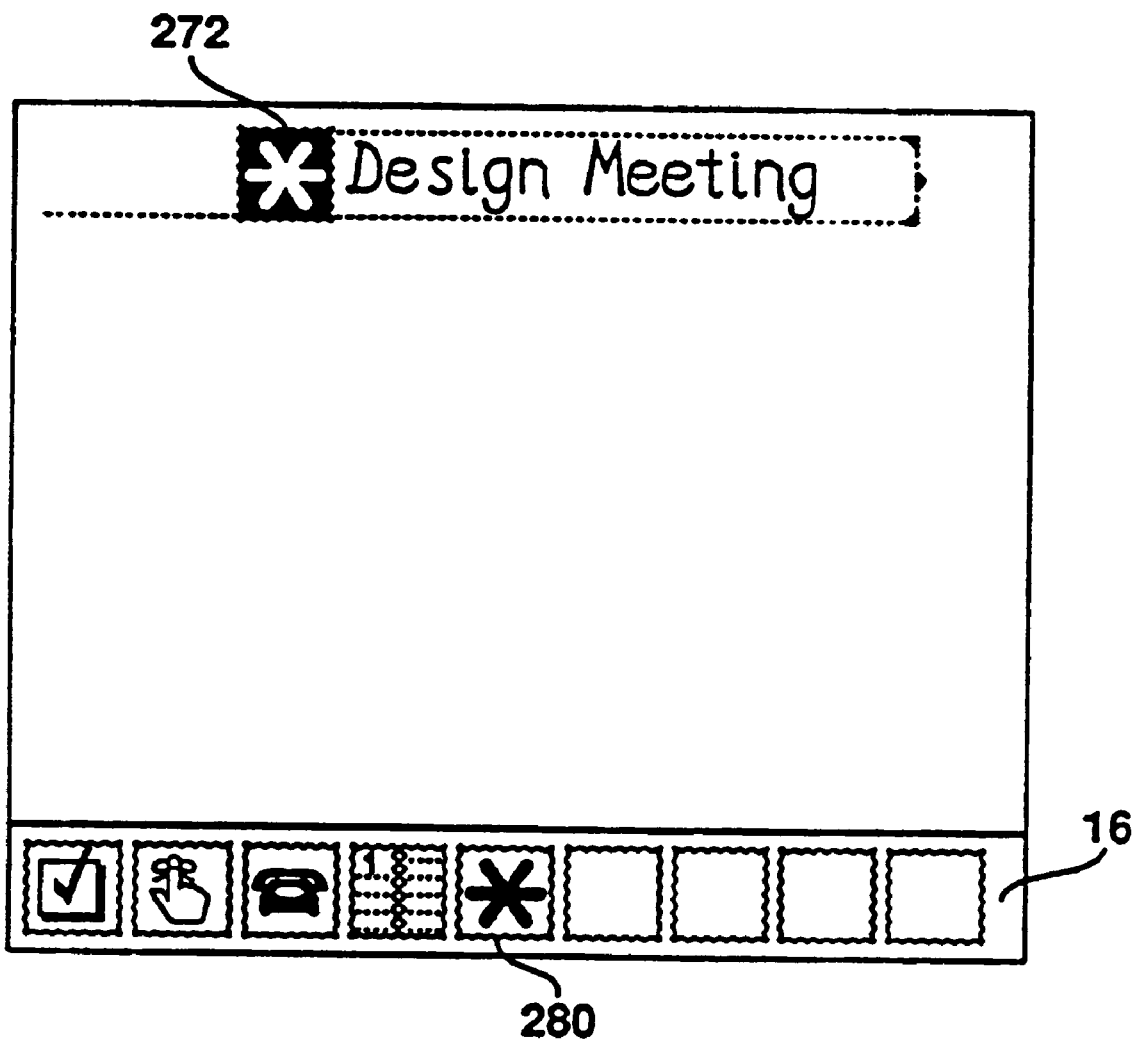
FIG. 15a illustrates the operation of a meeting element.
Figure 15B:
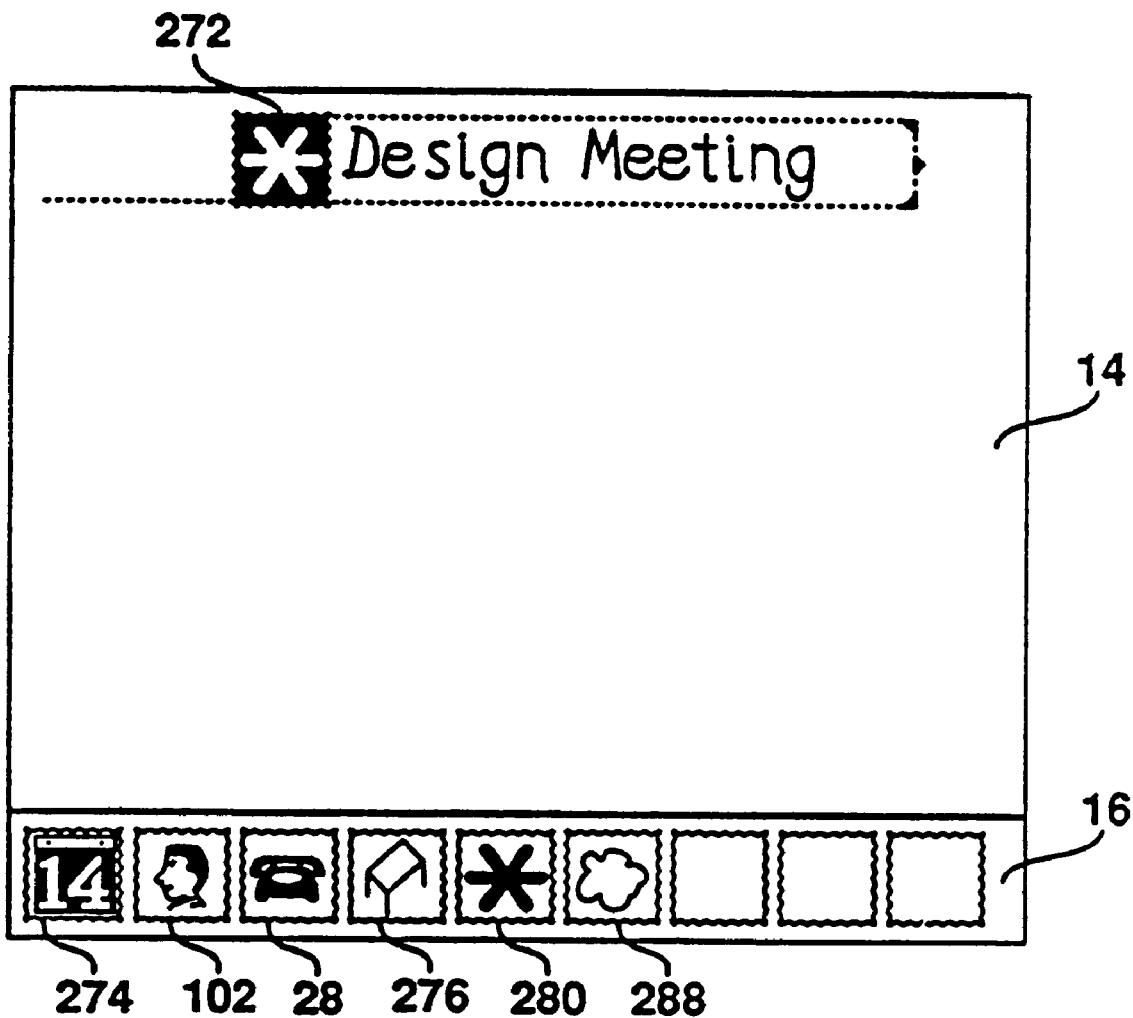
FIG. 15b further illustrates the operation of the meeting element of FIG. 15a and a technique for compounding a series of user interface elements together to perform more complex functions than could normally be carried out by a single user interface element.
Figures 15C, 15D:
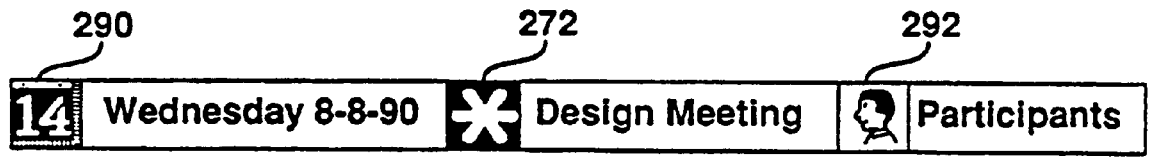

The operation of another type of element, the compound element, is demonstrated by the meeting element base 280 and its instance 272 of FIG. 15a. To use the meeting element, the user would first mark the page of display screen 14 with instance 282 and enclose any desired data, such as the words "Design Meeting". After releasing instance 272, the set of element bases in well 16 of FIG. 15a would be replaced by a new set of element bases, illustrated in FIG. 15b, which are each somehow related to instance 272. For example, since instance 272 relates to a meeting, the new set of element bases all relate to a meeting as well. These element bases include calendar element 274, participants element 102, phone element 32, conference room element 276, another meeting element 280, and thought element 288. Each of these new elements, such as calendar instance 290 and participants instance 292 of FIG. 15c, can then be selected from the well 16 and placed on either side of the instance 272 to create a compound element, of which instance 272 forms the primary instance. Each of the instances compounded to the primary instance can then have their attributes entered as desired, such as the names of various participants selected from the dialog box 294 of FIG. 15d for participants element instance 292.

When the user has entered the attributes for the compounded instances, all of the instances but the primary instances are hidden from view until the next time the primary instance is selected, thereby allowing the user to perform more operations and store more information within the area of the display normally occupied by a single instance. In addition, when the performance of the function of a primary instance is triggered, the other instances compounded to the primary instance perform their functions as well in a hierarchical order.

Figure 15E:
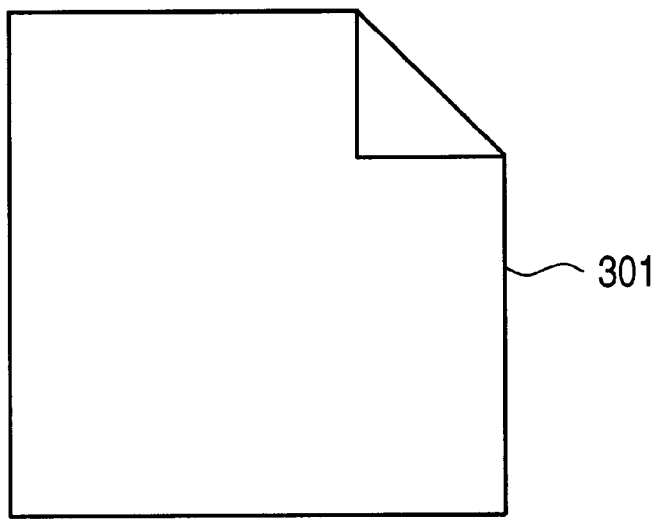
FIG. 15e illustrates an icon displayed on the display of a computer system.

As is well known, many objects stored in a computer system may be represented by an iconic image on the display screen. For example, referring to FIG. 15e, icon 301 may represent some type of text document. In some cases, it may desirable to know whether an object, such as text document has one or more user interface elements applied to some or all of the data therein. Therefore, in a currently preferred embodiment of the present invention, the iconic image may be updated to indicate that a user interface element has been associated with at least some of the data which the icon represents.

Figure 15F:
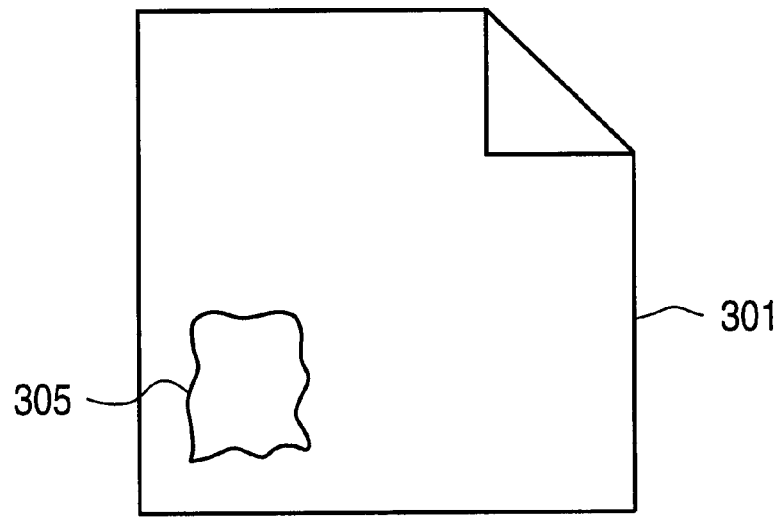
FIG. 15f illustrates an icon updated to indicate the presence of a user interface element of the present invention associated with the data represented by the icon.

Referring now to FIG. 15f, indicator 305 is shown. Indicator 305 may be, for example, a shrunk down bitmap of an element applied to some portion of the object represented by icon 301. Alternatively, an indicator may be devised for each element which may be different from the element's appearance but which, nevertheless, identifies the element. For example, phone element 32 of FIG. 2 may have an indicator 305 which simply comprises a "T" within the outline shown for indicator 305. It will be appreciated that it may be desirable to update iconic images with an indicator such as indicator 305 for only some and not all of the user interface elements of the present invention. Therefore, only preselected elements may cause an indicator to be placed on the icon 301, or, alternatively, each element may have as one of its attributes the ability to select whether or not an indicator is placed on the icon. In cases where several different types of elements are applied to an object, there may be insufficient space on the icon to display all of the indicators. In such a case, the appearance of one or more of the indicators which are displayed, or the appearance of the icon, may be altered to indicate the presence of additional elements by, for example, reverse tone, alteration of the border of the indicator 305 or icon 301, etc. In this regard, since the size of the icon 301 is typically very small, it may simply be desirable to have a generic indicator 305 which signifies that any one or more of the elements which cause the iconic image to be updated, have been applied to the object represented by icon 301. Again, the generic indicator or icon may have means to indicate that more than one type of element or more than one of a single type of element have been applied to the object. As a further alternative, instead of using an indicator such as indicator 305, the appearance of the icon 301 may be changed in other ways, such as reverse tone, different border, etc., to indicate the presence of an element associated with the data represented by the icon.

Several additional types of elements, and methods of displaying and selecting elements, will now be described. Additionally, the use of the elements and methods will be discussed in reference to specific computerized systems. It will be appreciated that the methods and elements described below are not restricted to the specific computerized systems in connection with which they are described, but are applicable to any type of computerized system. Additionally, it will be appreciated that any of the embodiments described above may also be used in the specific computerized systems described below.

Figure 16A:
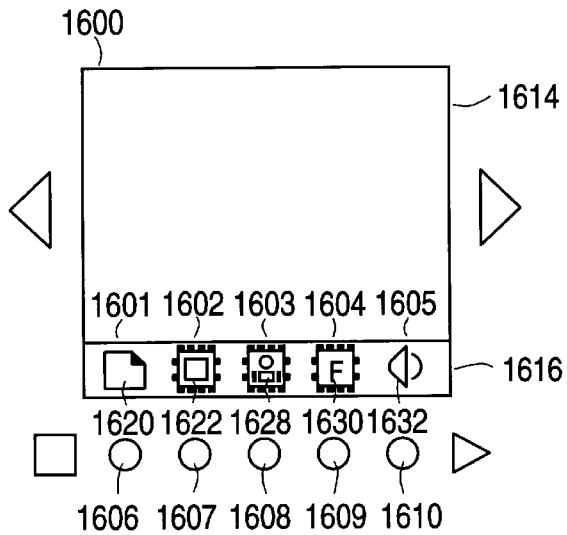
FIGS. 16a, 16b and 16c illustrate the use of elements in a computerized system comprising a camera.

FIG. 16a illustrates computerized system 1600 which comprises a digital camera. Display screen 1614 displays a live picture which may be recorded or captured when computer system 1600 is instructed to do so by the user. Herein, the phrase "taking a picture" will be used to refer to the process of capturing or recording the image and storing the same, in digital format in the memory of system 1600, or the memory of a computer system coupled to system 1600. The display screen 1614 comprises portion 1616 which is similar to the element well described previously. Section 1616 has, in a currently preferred embodiment, regions 1601, 1602, 1603, 1604, and 1605 for displaying up to five different user interface elements. It will be appreciated that a greater or lesser number of such regions may be provided. The user interface elements are arranged in stacks, with a single user interface element at the top of the stack displayed in one of the regions 1601, 1602, 1603, 1604, and 1605. Each stack may comprise any number of elements.

In one embodiment, each stack comprises elements that are related and that typically are used alternatively. For example, element 1620, which is at the top of the stack of elements displayed in region 1601, is used to mark pictures which are of a standard type, as opposed to, for example, panoramic, wide angle, etc. Elements for these types of pictures are in the same stack as element 1620, and may be accessed by toggling through the stack, as will be described more fully below. Element 1622 is a general purpose element which is denoted as shown by a square (other symbols and/or letters may also be used), the meaning of which may be assigned by the user. Element 1628 is currently at the top of the stack in region 1603, and may be used, for example, to mark pictures which include people. Element 1630 in region 1604 is a fax stamp, used to mark pictures that are later to be faxed. Finally, element 1632 in region 1605 is a sound annotation stamp, used to record a sound annotation to be associated with the picture. When a user applies the sound annotation stamp 1632, the user may record any type of audio data, using, for example, the methods described in conjunction with FIG. 11.

It will be appreciated that in some embodiments, user input to system 1600 is limited because display screen 1614 may not be touch sensitive, and, due to its small size, system 1600 may not have a cursor or cursor control device. Therefore, in a currently preferred embodiment, switches are used to apply, remove, filter, and manipulate the user interface elements of the present invention on system 1600. As used herein, a switch encompasses any physical means for generating a signal including toggle type switches, multiposition switches, any type of press button, etc. As shown in FIG. 16a, below each of regions 1601, 1602, 1603, 1604, and 1605 are buttons 1606, 1607, 1608, 1609, and 1610. Each time one of buttons 1606, 1607, 1608, 1609, and 1610 are depressed, it causes a signal to be sent to computerized system 1600. The meaning attributed to the signal sent from each of the buttons 1606, 1607, 1608, 1609, and 1610, may depend on whether other buttons are pressed simultaneously with or immediately before or after a given button is pressed, the mode the system is in, etc. As mentioned above, each of regions 1601, 1602, 1603, 1604, and 1605 may display one of a stack of user interface elements.

When the computerized system 1600 is in the mode shown in FIG. 16*a*, it is ready to take a picture. In this mode, pressing one or more of buttons 1606, 1607, 1608, 1609, and 1610, will cause the user interface element stack in the corresponding one or more regions 1601, 1602, 1603, 1604, and 1605, respectively, to toggle through all the available selections in the particular stack. For example, referring to FIG. 16*b*, when button 1607 is depressed and released, a new interface element 1634 is moved to the top of the stack and displayed in region 1602.

Figure 16B:
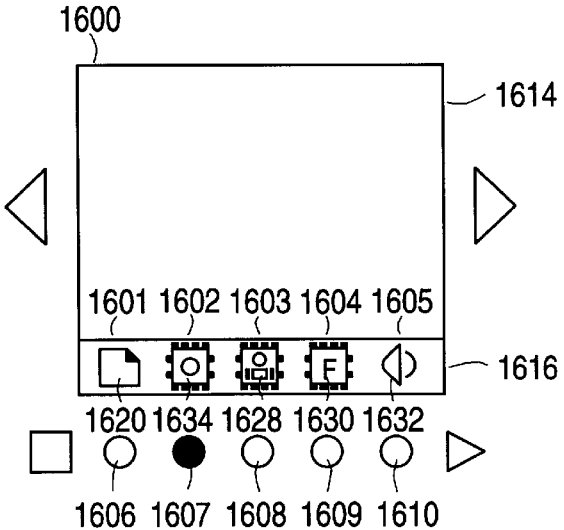
Figure 16C:
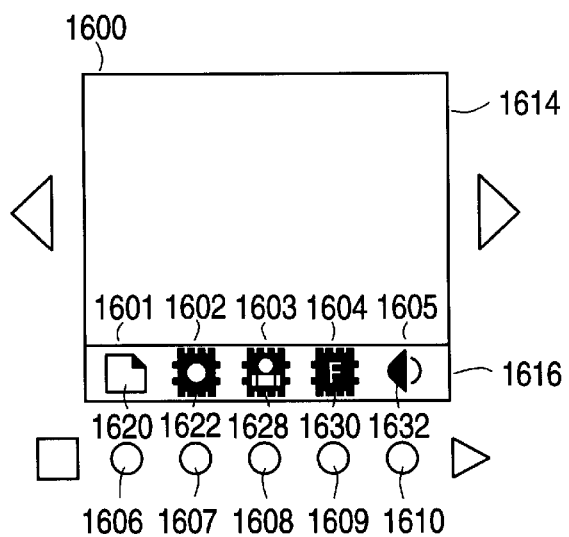

As a further feature of the present invention, all of the elements displayed in the regions 1601, 1602, 1603, 1604, and 1605 are automatically applied to any picture taken while they are displayed. For example, if a picture is taken after the user had set the stacks as shown in FIG. 16*b*, then an instance of each of the elements 1620,1634,1628, 1630, and 1632 is applied to the picture. Once the picture is taken, the elements are momentarily shown in reverse tone, as shown in FIG. 16*c*, to indicate that instances of the displayed elements have been associated with the picture just taken. As mentioned previously, the user interface element of the present invention need not have any visual appearance. Thus, it will be appreciated that if desired, the user interface elements which are displayed in the user interface well 1616 need not be visually present on the image data itself displayed in the region 1614. Of course, once an element has been applied to a picture, it is thereafter associated with the picture to which it was applied.

As described herein, the element serves as a proxy for the marked data in a preferred embodiment. Typically this is accomplished by creating a separate data structure which serves as an index or look-up table comprising identifying information to identify the element to the system, and comprising information to identify the location in memory of the marked data. Additionally, the data structure comprises information to identify the location in memory where user entered attributes for each instance of the element have been stored. In a preferred embodiment, the information identifying the element to the system may be used to determine the system attributes of the element. Of course, if desired, any of this information may be stored along with the marked data. For example, the index or look-up structure may identify all the data marked with a given instance of an element, and the user attributes may be entered along with the data so marked. Finally, if desired, an index or look-up table need not be supplied, and the identifying information for the element may be stored in the same data structure as the marked data. Then, when a user desires to search for instances of an element, the data structure may be searched for the information identifying the element being searched for. As a further alternative, a separate data structure may be created comprising information identifying the element. Each time an instance is applied to data, the marked data can then be replicated and stored in the separate data structure along with the instance. Numerous other methods of identifying the element to the system, and of associating each instance with data marked with the instance, and system and user attributes of the element may be envisioned by those skilled in the art.

As described above, any element displayed in any one of the regions 1601, 1602, 1603, 1604, and 1605 is applied to the next picture taken. Therefore, each stack of elements in each of the regions 1601, 1602, 1603, 1604, and 1605 comprises a blank setting. Thus, for example, if a particular stack of elements comprised five different elements, as the user touched one of the buttons 1606, 1607, 1608, 1609, and 1610, the corresponding one of display regions 1601, 1602, 1603, 1604, and 1605 displays the five different elements in sequence, and then upon the sixth press displays nothing, indicating that no element from that stack will be used to mark the next picture.

In the present invention, some elements may automatically be updated as pictures are taken. For example, referring to FIG. 17*a*, numbering element 1720 and date/time element 1722 are shown. When the next picture is taken, all of the elements shown in regions 1601, 1602, 1603, 1604, and 1605 will be associated with that picture, as described above. As one of the attributes of element 1720, the numeral 1 will be associated with the picture. Then, if element 1720 remains displayed in region 1602, the next picture will have the numeral 2 associated therewith, and so on. In this way, subsets of pictures can be identified by number within a data structure containing a large number of pictures. The element 1720 can be reset to 1 or any other number at any time. Element 1722, in region 1604, when applied to the next image captured, has, as some of its attributes, the date and time the picture is taken. Thus, the user can use element 1722 to mark each image with the exact date and time the picture was taken. As with element 1720, the attributes of element 1722 are automatically updated so that they are current for the next picture to be taken.

Figures 17A, 17B:
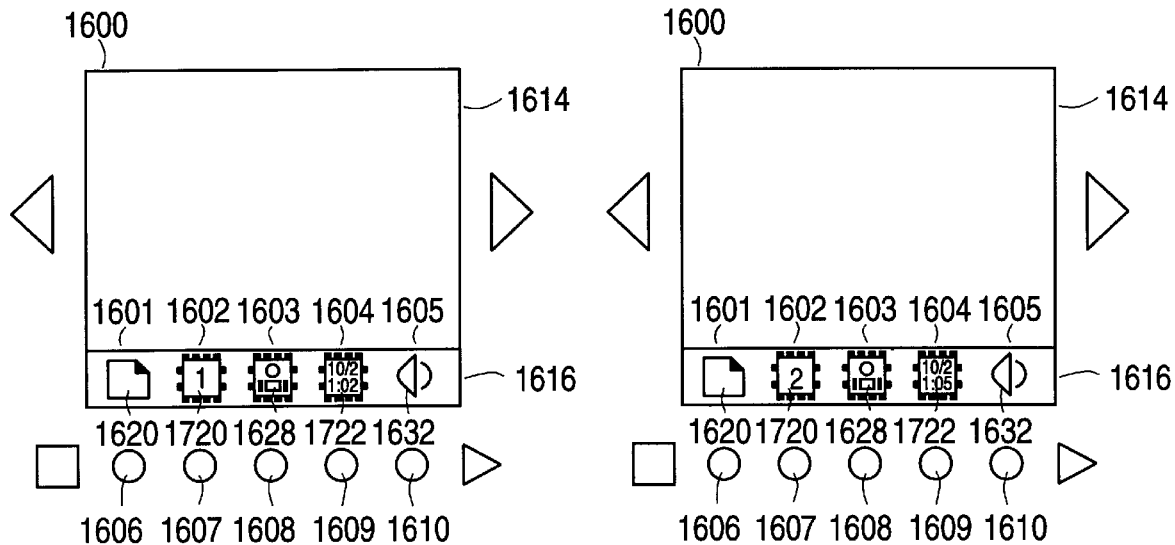
FIGS. 17a–17b illustrate elements having data which may be automatically updated.

Referring now to FIG. 17*b*, as described above, element 1720 will mark the next picture with the number 2, and element 1722 again is ready to mark the next picture taken with the then current date and time. As shown in the preferred embodiments of FIG. 17*a* and 17*b*, the display of the elements 1720 and 1722 in well 1616 shows the current value of the picture number, and date and time, respectively. Alternatively, the elements in the element wall 1616 need not reflect the current state, but rather could have generic symbols such as the word "number" or the symbol "#" for element 1720, and for example, for element 1722 the words "date/time". Thus, if desired, these elements may operate as described above, associating the correct picture number and date and time with each image captured even though the display of the elements themselves in element well 1616 does not display the current value.

As described above, each of the regions 1601, 1602, 1603,1604, and 1605 comprises a stack of user interface elements. The user may select which stack of elements is to be displayed in each of the regions. Referring briefly to FIG. 16*a*, assume the user wishes to replace the stack currently in region 1602. As shown in FIGS. 16*a* and 16*b*, the stack currently in region 1602 comprises element 1622 having a square therein, element 1634 having a circle therein, and may comprise additional elements as well, if the user does not need to utilize any of the stamps in the stack having geometric shapes, the user can display a different stack in the region 1602.

Figure 18A:
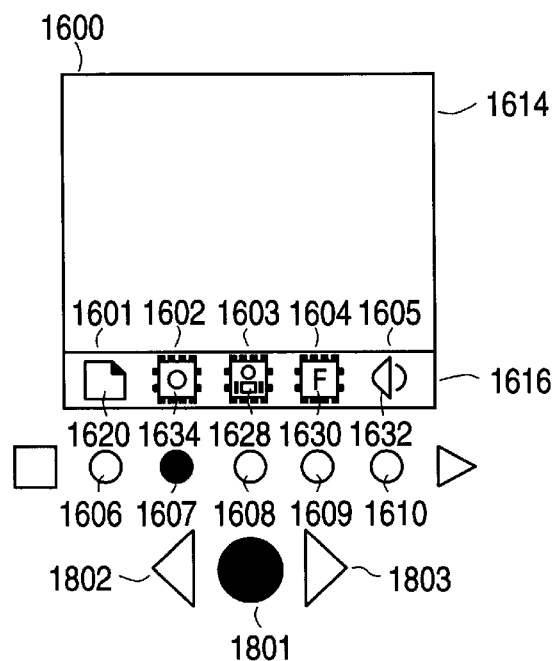
FIGS. 18a, 18b, 18c, 18d and 18e illustrate stacks of elements, methods of selecting a stack of elements and methods of selecting an element within a stack.
Figure 18B:
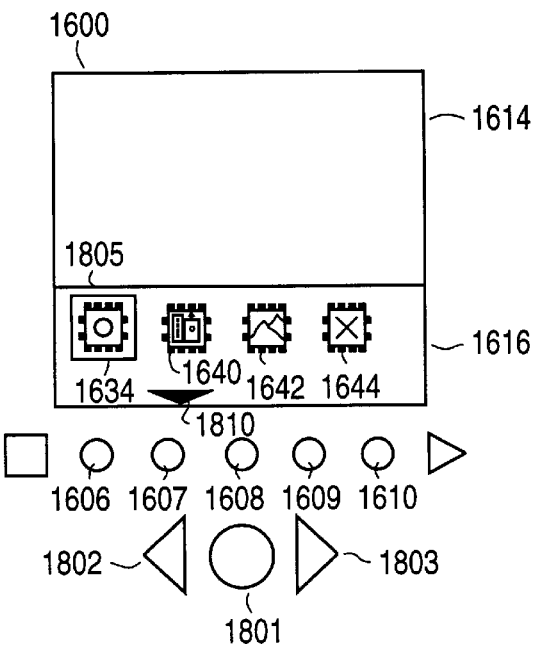

Referring now to FIG. 18*a*, the user may select a region such as region 1602 for the purpose of changing the stack of elements in that region by pressing toggle button 1607 as well as execute button 1801 simultaneously. Then, as shown in FIG. 18*b*, the elements which were displayed in the regions 1601, 1603, 1604 and 1605 are no longer displayed. Element 1634, which had been in region 1602 is displayed, along with additional elements 1640, 1642, and 1644. As before, each of these elements represents a stack of such elements, with the displayed element being on the top of the stack. Indicator 1810 appears, pointing to toggle button 1607, to indicate to the user that the stack of elements that is eventually selected, will be displayed in the region 1602 corresponding to toggle button 1607, when the selection process is complete and the system 1600 is returned to the ready mode shown in, for example, FIG. 16*a*. Selection rectangle 1805 appears around element 1634 to indicate that this is the currently selected stack to be displayed in the region 1602.

Figure 18C:
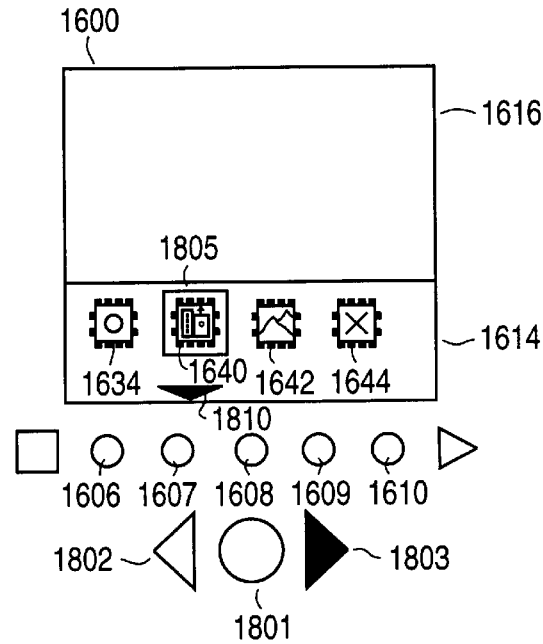
Figure 18D:
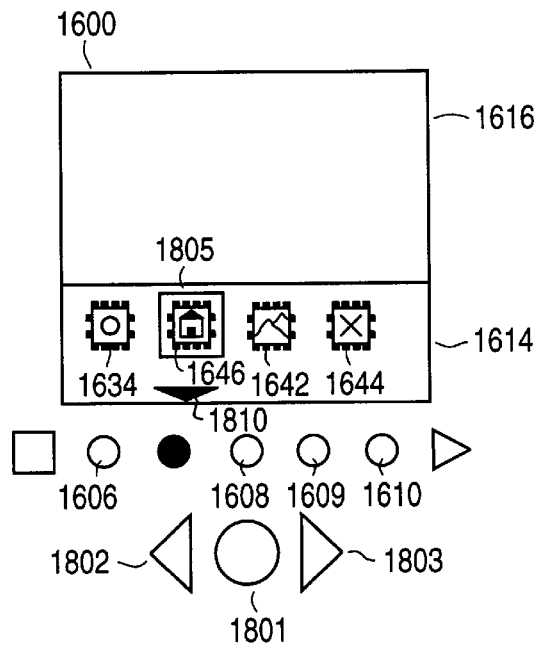
Figure 18E:
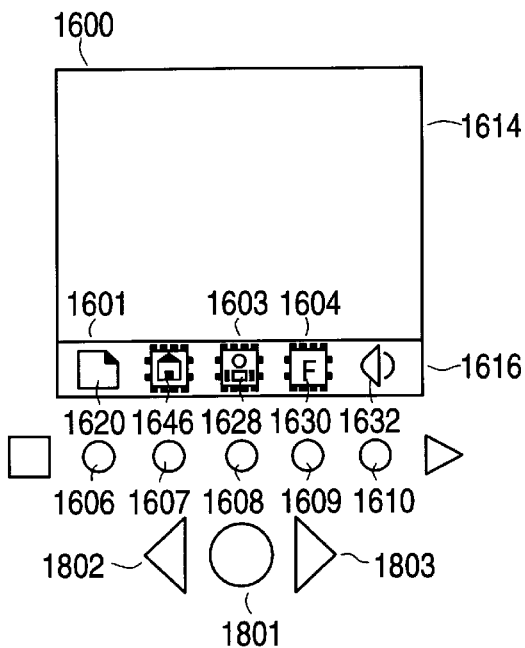

As shown in FIG. 18*c*, the user may then select the stack of elements having element 1640 on top by depressing right arrow key 1803. Similarly, if desired, the user can select any of the stacks by pressing right arrow key 1803 or left arrow key 1802, as appropriate until selection rectangle 1805 surrounds the desired stack. The user may view all of the elements in a stack by pressing toggle button 1607, while selection rectangle 1805 surrounds the stack of interest. For example, to see what other elements are present in the stack having element 1640 on top as shown in FIG. 18*c*, the user may press button 1607, as shown in FIG. 18*d* to reveal the next element in the stack 1646, which is also some type of building element. The user may similarly see all other elements in the stack by continuing to press button 1607. Again, the user can move selection rectangle 1805 to any other stack, and press toggle button 1607 to see all elements in that other stack. When the user has determined that the stack having the elements 1640 and 1646, as well as any other related elements, is to be displayed in region 1602, the user again simultaneously presses toggle button 1607 and execute button 1801 to return computerized system 1600 to a state ready to take pictures, with the stacks of elements as shown in FIG. 18*e*. As can be seen from FIG. 18*e*, each of the stacks of elements in regions 1601, 1603, 1604, and 1605 are the same as those shown previously, while the region 1602 now displays the stack with element 1646 currently on top.

Stacks in other regions may also be changed using the above described procedure. For example, referring to FIG. 18*b*, if the user wanted, in addition to the stack of elements having elements 1640 and 1646 (which as described above has been placed in display region 1602), one or more of the other stacks not currently selected, the user may use the above described procedure to replace one or more of the current stacks of elements in one or more of the regions 1601, 1603, 1604, and 1605 with the desired new stack(s). As described above, the user need only press the appropriate one of the toggle buttons 1606, 1607, 1608, 1609, and 1610 simultaneously with the execute button 1801 to select the region into which the user wishes to place a new stack. The stack having elements 1622 and 1634, which was removed from region 1602, will now be available to place in any region desired. It will further be appreciated that although three additional stacks of elements were shown to be available (in addition to the five stacks originally shown), a greater number of stacks may be present. Additionally, it will be appreciated that there may be more different stacks of elements than may be displayed at any one time in the region 1616. In such a case, any method may be used to cycle through the available stacks of elements. For example, in an embodiment having additional stacks, as user presses one of the arrow keys 1802 or 1803, selection rectangle 1805 moves until it is at the left or right-hand side, respectively, and a further press of the arrow key causes the stacks to scroll across regions 1616 to reveal more stacks to the right or left. It will be appreciated that the stacks of elements may be presupplied by the system 1600 and/or the software used on system 1600. As described earlier, in one embodiment each stack comprises a number of elements that are related such that only one of the elements in the stack is needed to mark a picture or other document, in typical usage. Alternatively, the user may define his/her own stacks. That is, in one embodiment, the user may select from all available elements to define which elements are in each of the stacks.

Figure 19:
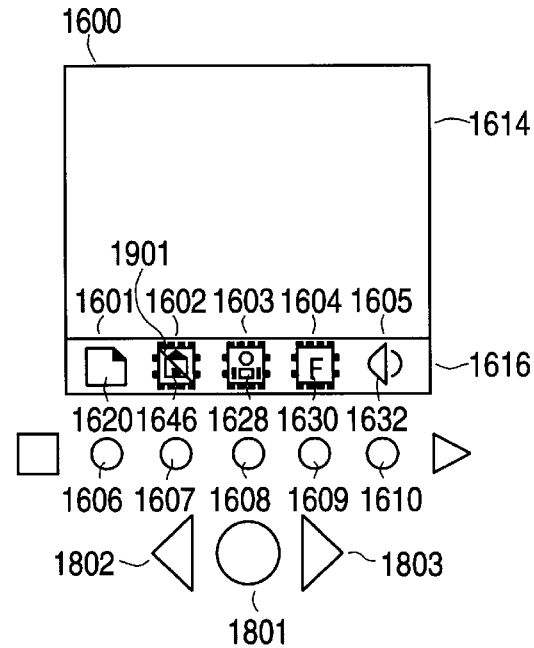
FIG. 19 illustrates an element having an audio annotation.

As mentioned earlier, an element may have a visual way of identifying the element to the user (i.e., the appearance displayed in the region 1616). In the present invention, an element also may have an aural identification in the place of or in addition to the visual identification. The aural identification is referred to as a "voice title" herein. It will be appreciated, however, that the voice title may be any type of aural data and is not limited to a human voice. The voice title may be particularly useful where the user may desire more information regarding the element than the visual appearance conveys. To add a voice title to one of the elements, the stacks are accessed as described in relation to FIGS. 18*a*–18*e* and the selection rectangle is moved, as described previously, until it surrounds the stack having the element to which the voice title is to be added. If the element to which a voice title is to be added is in a currently displayed stack, the user accesses the element stacks by pressing the toggle button corresponding to the displayed stack together with execute button 1801. If the element is not in a currently displayed stack, the user may press any one of the toggle buttons together with the execute button 1806. Once the stacks are accessed and the selection rectangle is around the top element of the stack of interest, the user may then toggle through the elements in the stack to bring the element which he/she wishes to add a voice title by pressing the appropriate one of toggles buttons 1606, 1607, 1608, 1609, and 1610. Then, with the selection rectangle around the appropriate element, the user presses the record button (not shown) to record any sound by, for example, speaking into the microphone (not shown), while the record button is depressed. In a preferred embodiment, selection rectangle 1805 blinks while the record button is depressed to indicate recording. Referring to FIG. 19, after a voice title has been recorded, the appearance of element 1646 is updated by the addition of voice annotation marking 1901 to indicate that the element 1646 now has a voice title. Note that the voice annotation described above is different from the sound annotation element 1605, or the sound annotation elements described previously. The sound annotation elements such as element 1605 have, as one user attribute, a sound recording to be associated only with the data to which a particular instance of the sound annotation element has been applied. In contrast, in the embodiment described above, the voice title may be used on any user interface element, and alters the base element such that all instances created from the base element having the voice annotation, have the same voice annotation.

Figure 20:
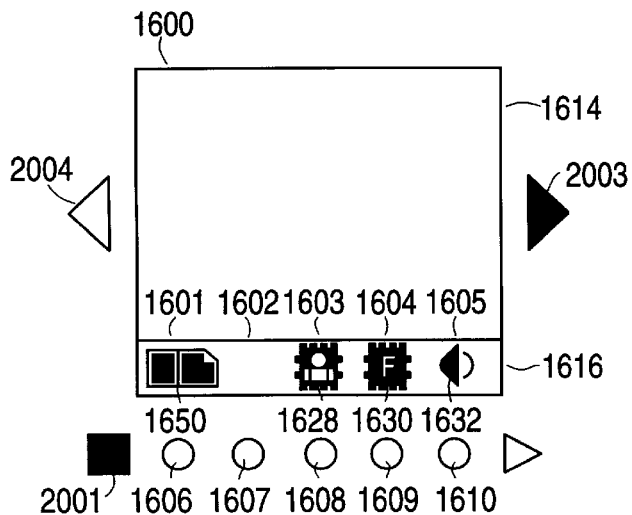
FIG. 20 illustrates an element filtering method.

In the present invention, the user can filter through the pictures that have been taken to select those pictures having one or more elements associated therewith. Referring to FIG. 20, system 1600 is put in filter mode by depressing filter button 2001. In one embodiment, once system 1600 is put in filter mode, all elements are displayed in reverse tone, as shown. Then, the user may use one or more of the buttons 1606, 1607, 1608, 1609, and 1610 to select elements to be used in filtering the photos taken. The user may toggle through the various stacks of elements, to select those elements with which the user wishes to filter the data. If the element of interest is not in a currently displayed stack, the user may select a different stack, using the procedure described earlier. As shown in FIG. 20, the user has selected to filter through the pictures taken to find pictures having panoramic element 1650, people element 1628, fax element 1630, and sound annotation element 1632. Next, by pressing right arrow key 2003, system 1600 displays the first image in the memory which was marked with all of the element 1650, 1628, 1630, and 1632. Once a picture which has been marked with all four of these elements has been found, it will be displayed in region 1614. By again pressing right arrow 2003, subsequent photographs having all of the above four elements will be found and displayed in region 1614. To go back to a previous picture having the elements selected for filtering, the user may press left arrow key 2004.

As shown in FIG. 20, any region can be left blank, such as region 1602, by pressing the corresponding one of toggle buttons 1606, 1607, 1608, 1609, and 1610 until nothing appears in the display region. In the above described embodiment, the user may filter the pictures taken to find pictures having from 1–5 different elements. It will be appreciated that if desired, provision can be made to allow for filtering using additional elements, by for example, providing additional regions in the element well 1616. Additionally, provision can be made to allow for filtering using more elements than can be displayed at one time. For example, the user may toggle through any of the stacks of elements, including non-selected stacks in the stack drawer, with system 1600 in filter mode. Then the user may press the appropriate one of toggle buttons 1606, 1607, 1608, 1609, and 1610 simultaneously with another button, such as execute button 1801, while the element of interest is on the top of the stack. That element will then be reverse toned to indicate that the system is set to filter using the selected element. In this way, the user may select as many elements as desired for filtering, including more than one per stack. However, in such an embodiment, not all elements which are selected for filter in this embodiment will necessarily be displayed at one time.

As described above, the provision of a physical switch such as toggle buttons 1606, 1607, 1608, 1609, and 1610 for selecting the user interface elements, and other buttons such as execute button 1801, arrow keys 2003 and 2004, and filter button 2001, for filtering, selecting, and otherwise manipulating the elements and/or parameters or functions associated therewith, is particularly useful in systems, such as computerized system 1600, which does not have an input control device such as a mouse, trackball, touch sensitive screen, etc. typically found on personal computers. Furthermore, use of physical buttons similar to those described above in conjunction with system 1600 may be conveniently employed in other systems as well.

Figure 21:
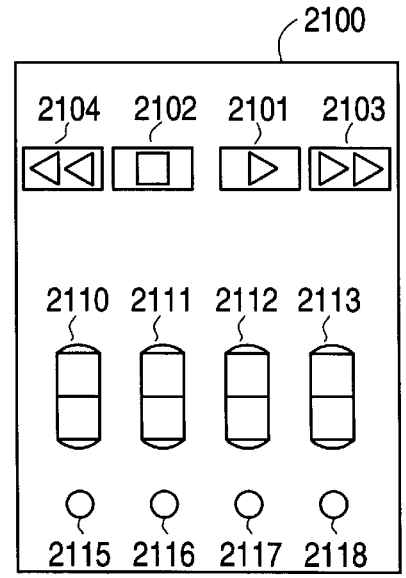
FIG. 21 illustrates a mechanical device for applying elements to data and for filtering data by elements.

Referring to FIG. 21, a further device upon which physical switches may be used, is shown. Illustrated is remote control device 2100, which may be, for example, a remote control device which controls any type of computerized system. For example, in one embodiment remote control device 2100 is used to control operation of a computer system having the capability of playing, recording, and storing audio data. The audio data may include messages from a voice mail system, individual voice notes, any other audio data, or may comprise textual messages such as electronic mail messages which are converted to audio data by a voice synthesizer. As shown, remote control device 2100 comprises play button 2101, stop button 2102, fast forward 2103, and rewind button 2104. Additionally, if desired, remote control device 2100 may also comprise a microphone and a record button. Also shown are buttons 2110, 2111, 2112, and 2113. Each of these buttons may be used to apply a user interface element to any of the audio documents referred to above.

To apply a user interface element to an audio document, the user simply presses the top half of the appropriate button while listening to the document. The user may press none, one, or more of the buttons 2110, 2111, 2112, and 2113. Any of the buttons 2110, 2111, 2112, and 2113 may be used for any of the user interface elements described earlier, which mark the data and which may additionally carry out a function immediately or at some future time. For example, one of the buttons 2110, 2111, 2112, and 2113 may mark a document with the to-be-printed element described earlier. As another example, a discard element may be applied to an embodiment which causes the marked document to be discarded, either immediately or at some time in the future (e.g., in seven days). As before, the system stores identifying information for the element which serves as a proxy for the marked data. The user interface element which is applied by the buttons 2110, 2111, 2112, and 2113, may be defined on the computerized system to which the remote control is attached. In this way, the user may assign an element to each of the buttons, selecting from among all available elements. Alternatively, the element applied by any of the buttons may be pre-defined by the system.

If the user desires to filter through the audio documents stored in the computer system associated with remote control device 2100, the user simply pushes the lower half of one or more of buttons 2110, 2111, 2112, and 2113, as desired. Specifically, if the user wishes to filter, for example, for audio documents that have been marked with the user interface elements associated with buttons 211 0 and 2112 the user simply presses the lower half of buttons 2110 and 2112. Once the lower half of any of the buttons 2110, 2111, 2112, and 2113 has been pressed, the system is in filter mode. As shown, four LED's 2115, 2116, 2117, and 2118 are disposed below the buttons 2110, 2111, 2112, and 2113, respectively, to indicate that the system is in filter mode. In the example described just above, where the system is set to filter for audio documents marked with the user interface elements associated with buttons 2110 and 2112, LED's 2115 and 2117 will be on, while LED's 2116 and 2118 will be off. While the system is in filter mode, the user can search for audio documents having the selected elements by pressing fast forward button 2103 to get to the next audio document in memory which has been associated with the user interface elements corresponding to the lit LED's, or by pressing rewind button 2104 to get to the closest previous audio document having the selected elements.

It will be appreciated that any number of methods and combinations of switches may be used to carry out the functions and procedures described herein. For example, instead of using filter button 2001 to put system 1600 of FIGS. 16–20 in filter mode, the system may comprise a two position switch to place the system in a first mode, ready to take pictures, and a second mode to review previously taken pictures and to filter by use of elements. As another example, two sets of switches, one for setting the elements to be applied, and another for selecting the elements to be used to filter through the data, may be used. Numerous other combinations of switches, and methods using the switches will be apparent to one of skill in the art upon reading the present disclosure.

Figure 22:
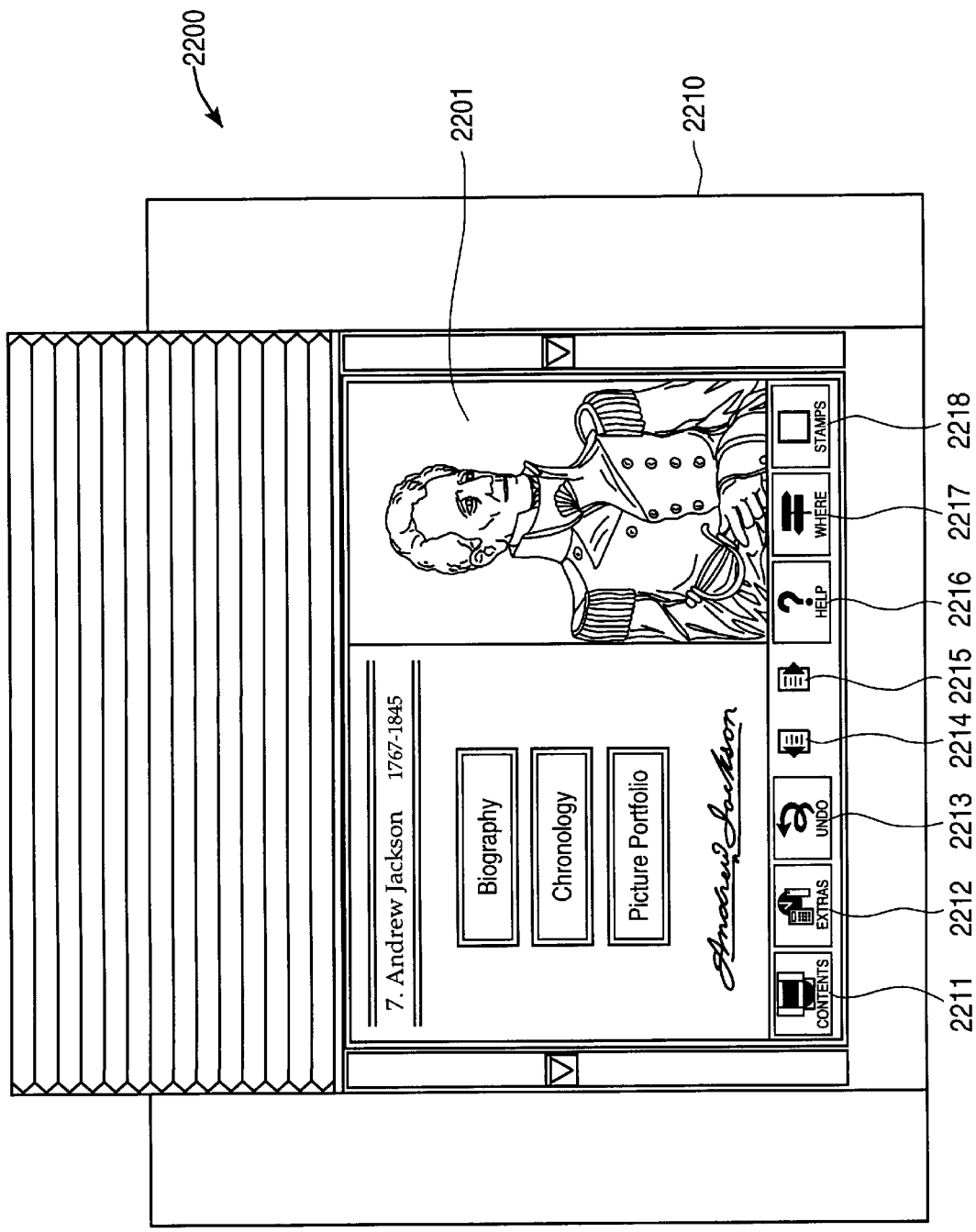
FIG. 22 illustrates a further computerized system employing the user interface elements of the present invention.

Another type of system which may benefit from the user interface elements of the present invention is information system 2200 shown in FIG. 22. In a currently preferred embodiment, system 2200 is a multi-media player comprising a compact disc drive capable of reading CD-ROM's and audio CD's. System 2200 is a computerized system comprising a processor and memory. Information system 2200 further comprises a PCMCIA card slot in a currently preferred embodiment. Additionally, in one embodiment, the system 2200 comprises a liquid crystal display (LCD), a touch sensitive screen, a built in speaker and a microphone. The system may be coupled to another computer system as an SCSI CD-ROM drive. Further, the system comprises a serial port which may be used to connect peripheral devices such as keyboards, modems, etc. In general, the information system 2200 provides a user with storage for a large amount of data, and means to navigate within, annotate, update, and manage this large amount of data. As shown, the system comprises display screen 2201, and control strip 2210, both of which are provided with touch sensitive control. The control strip 2210 comprises a plurality of "soft keys", such as the eight soft keys 2211, 2212, 2213, 2214, 2215, 2216, 2217, and 2218, which are dedicated regions of the touch sensitive display having predetermined functions associated therewith.

Since the system 2200 is designed to be portable, in one embodiment, the system 2200 does not include a mouse, trackball, or similar input device. Therefore, when system 2200 is not coupled to a peripheral device or to another computerized system, input to the system 2200 is limited to use of control strip 2110, and other operations that may be performed on a touch sensitive screen. In this regard, several additional user interface elements, as will be described in detail below, may be particularly useful in the information system 2200. While the additional user interface elements are described in relation to system 2200, it will be appreciated that the user interface elements described below may be used on any computerized system such as those described earlier. In general, it will be appreciated that while some user interface elements are particularly well suited for a specific system, any of the user interface elements described herein may be used in conjunction with any applicable computerized system.

Figure 23:
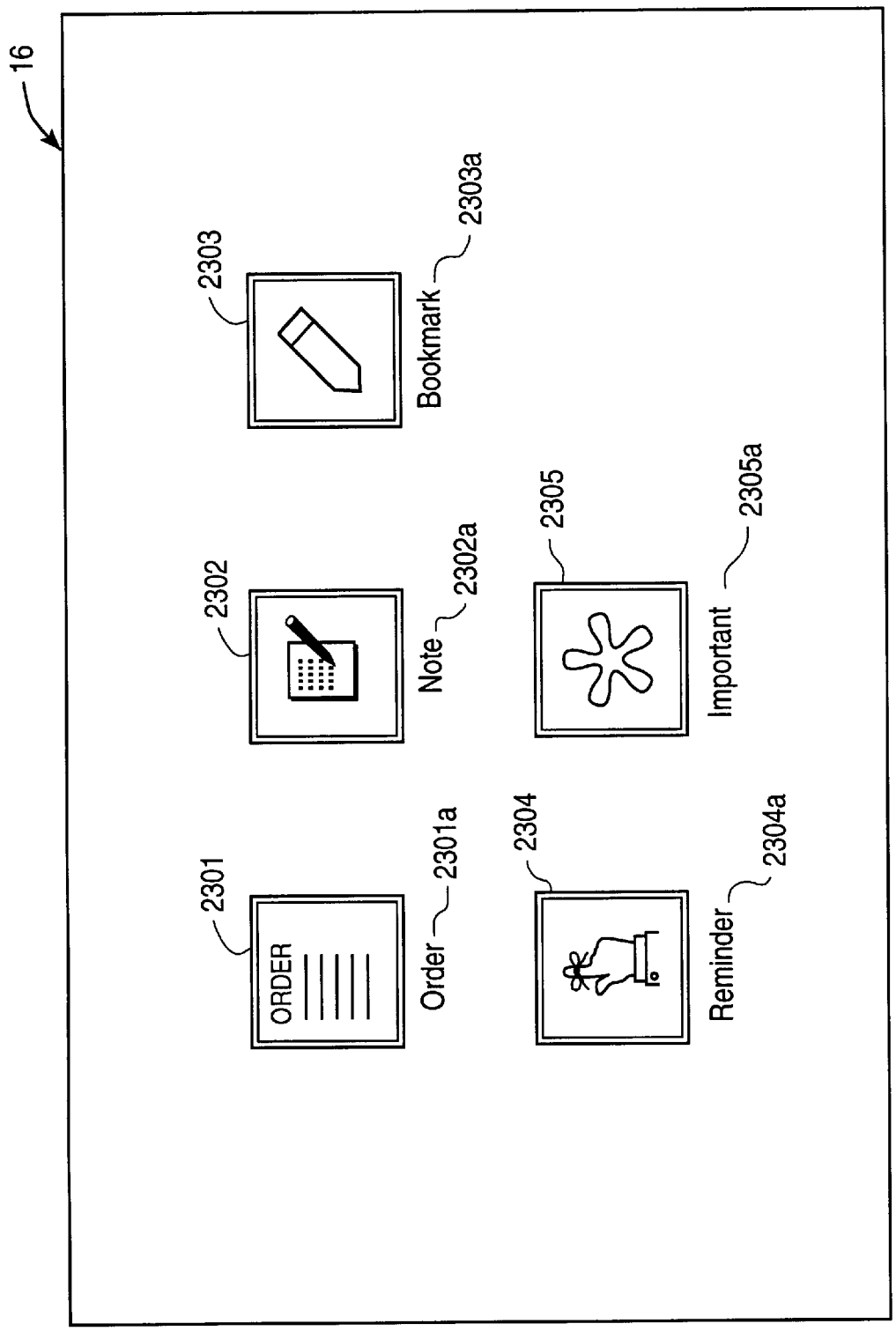
FIG. 23 illustrates further user interface elements of the present invention.

When key 2218 of FIG. 22 is pressed, a "drawer" is opened up, of the type described in co-pending patent application Ser. No. 08/090,470, filed Jul. 12, 1993, entitled "Desk Drawer User Interface," which application is assigned to the assignee of the present invention. Referring now to FIG. 23, the drawer may contain element well 16, having several user interface elements. In one embodiment, the desk drawer may also comprise a filtering box to allow for searching as described previously. Alternatively, well 16, and any filtering box may be brought up with one or more pull down or pop-up menus, for example. FIG. 23 shows user interface elements 2301, 2302, 2303, 2304, and 2305. As shown, each of the user interface elements 2301, 2302, 2303, 2304, and 2305 comprises a visual appearance such as the word "order" and several lines shown for order element 2301, a notepad and pencil for note element 2302, a marker for bookmark element 2303, a finger with a string tied around it for reminder element 2304, and an asterisk for important element 2305. Additionally, each of the elements comprises a hollow frame surrounding the fanciful visual representation. Use of a square or rectangular frame surrounding the other portions of the visual representation allows for quick and easy differentiation between the user interface elements and other visual items such as buttons, fields, and artwork, that might appear on the display 2201. Also as shown in FIG. 23, when in the element well 16, the user interface elements have associated therewith labels shown as 2301a–2305a to describe the user interface element. In a currently preferred embodiment, these labels are used only for the element bases which reside in the well 16, but not for the instances which reside on the document, for example, or in a filtering box.

Figure 24:
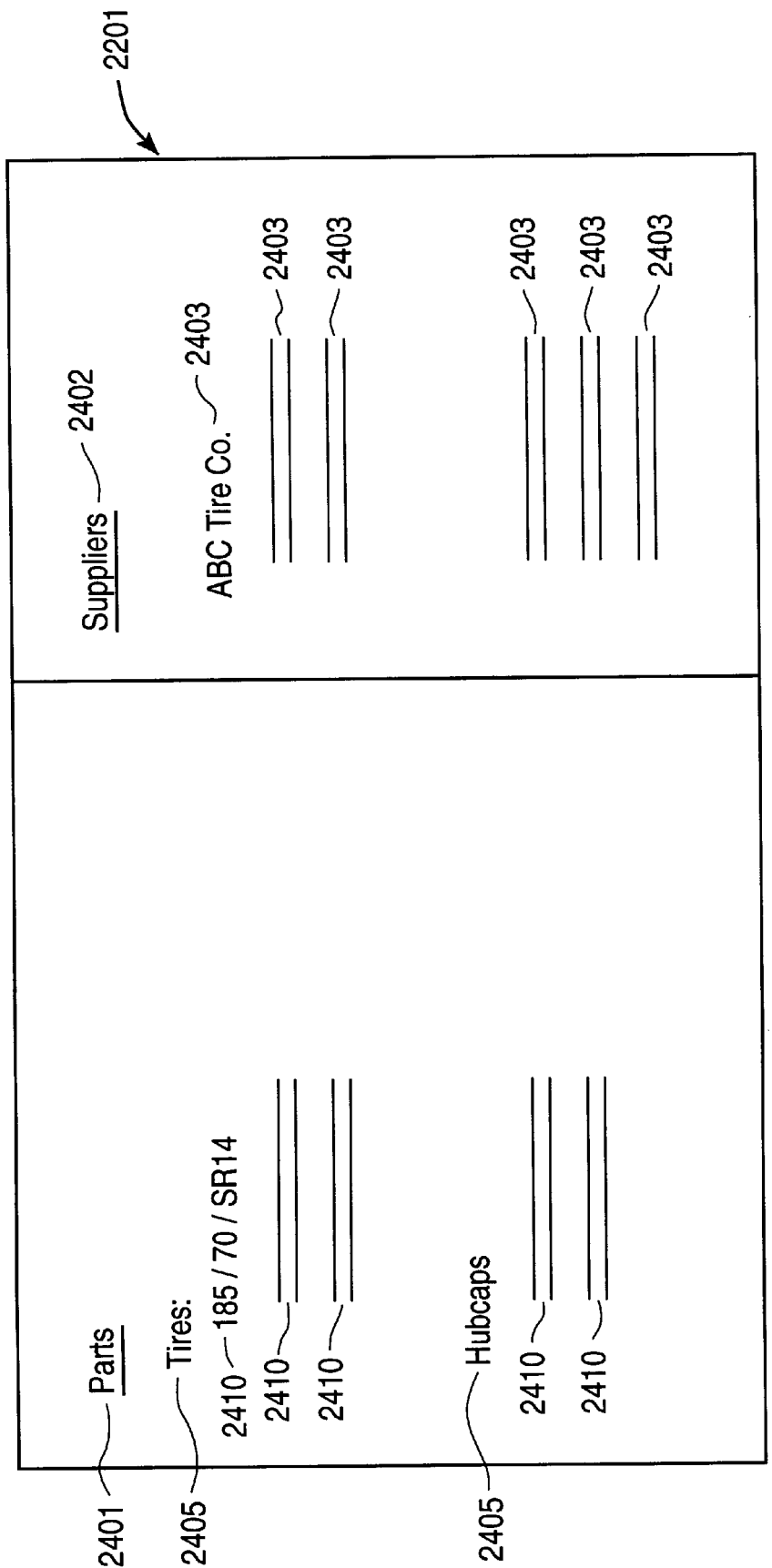
FIG. 24 illustrates the display of data that may be contained in the system of FIG. 22.

The user interface elements of the present invention may be context sensitive. That is, the functionality and/or appearance of the element may vary depending upon the context in which it is used. In one case, the context may refer to the particular document or data to which the stamp is applied. For example, as mentioned previously numerous different types of data may be stored within the memory of information system 2200, and system 2200 may be used for numerous types of applications. As one example, system 2200 may be used in the operation of a business such as a store, for example, an auto parts store, to store relevant information, and to assist in the performance of necessary tasks. For example, referring briefly to FIG. 24, system 2200 may have a database comprising a catalog of parts ordered by the store, a portion of which is shown on display 2201. For example, portion 2401 may comprise a listing of parts, and comprise 2402 may comprise a listing of suppliers. Further, the parts list may be broken into major categories 2405 such as tires and hubcaps. Each major category 2405 may have many individual listings 2410, such as the specific tire size 185/70/SR14 shown as the first listing 2410. The suppliers list 2402 may have individual suppliers 2403. The suppliers 2403 may pertain to the whole category shown to the immediate left, or only to an individual item 2410 to the immediate left.

The context sensitivity of the present invention will now be described in more detail with regard to order element 2301, and note element 2302, of FIG. 23. It will be appreciated by one of skill in the art, that numerous other examples of context sensitivity using the principles described herein, depending upon the user's requirements, may be employed. With regard to order element 2301, the functionality of the element may vary depending upon where it is placed. For example, referring now to FIG. 24, if an order element 2301 is placed on a specific item 2410, such as the tire size shown, an order form allowing for user entry pops up. The order form may be partially filled in, with the tire size, for example. Further, the pop-up order form may provide a selection of manufacturers which provide that size, or may allow for user entry of the manufacturer, as well as the quantity. If the order element 2301 is placed on the more generic region 2405 labeled "Tires", the order form may then either provide a choice of sizes or allow for user input of the sizes as well as the quantities to be ordered. Similarly, when the order stamp is placed on a different type item 2405 such as hubcaps, the pre-provided information, as well as the format, will change as appropriate for the item upon which the element is placed. In essence, a customized order form is brought up depending upon where the element is placed. The customization may, as in the above example, be based upon some general characteristic of the data with which the element is associated (e.g., format of order form differs depending upon whether element is associated with category of items versus a specific item) and/or the customization may be based upon the underlying content of the data with which the element is associated (e.g., system may pre-supply some information relevant to the item with which the element has been associated).

Other types of functionality of the order element 2301 may depend upon the context in which the element is used. As described in relation to earlier elements, the element may have some functionality that may be performed immediately, or at some later time, or upon a further command. For example, any completed order element 2301 may cause an order to be placed electronically, or may cause orders to be printed out, either immediately or when a further command is performed by the user. Alternatively, orders may be placed automatically at a specified time. This functionality may depend upon the context of the order stamp. For example, order stamps placed on categories may be executed monthly, while order elements placed on individual items may executed at the end of each day.

In a similar manner, note element 2302 of FIG. 23, for example, may be context sensitive. For example, when an instance of note element 2302 is placed on screen 2201, the format of the dialog box which pops up may depend upon the area upon which the note is placed. For example, referring again to FIG. 24, when a note element 2302 is placed on a category of parts 2405 such as tires, the note element may be structured to allow a list of one or more types of tires in one column, adjacent to a second column designed to allow for entry of the manufacturers of each size. In this way, an extensive note listing each size, and each manufacturer which supplies that size may be compiled. When the note element 2302 is placed on an individual item 2410, the note may be formatted to include a heading listing the tire size, and may provide for a list of manufacturers to be compiled for that size. Thus, the note placed on the category provides a format allowing the user to compile a complete listing of all manufacturers of all parts in that category, while a note placed on a specific item provides a format allowing the user to compile a concise listing of suppliers of the item upon which the element is placed. Similarly, a note element placed on the heading labeled "Suppliers" in region 2402 may provide a dialog box especially adapted for listing all suppliers, or for example, may provide a dialog box for listing suppliers along with all items the supplier supplies. When a note element 2302 is placed on individual supplier 2403, the dialog box may provide a format adapted to listing persons to contact and phone numbers at that supplier, and/or parts supplied by the supplier.

It will be appreciated that numerous different types of user interface elements of the present invention, in numerous different applications may be made context sensitive as described above. In general, the context sensitive elements may provide a different visual format, may provide different functionality, may include data in some contexts and not in others, or may provide different data in different contexts, or any combination of these, from one context to the next.

Figure 25:
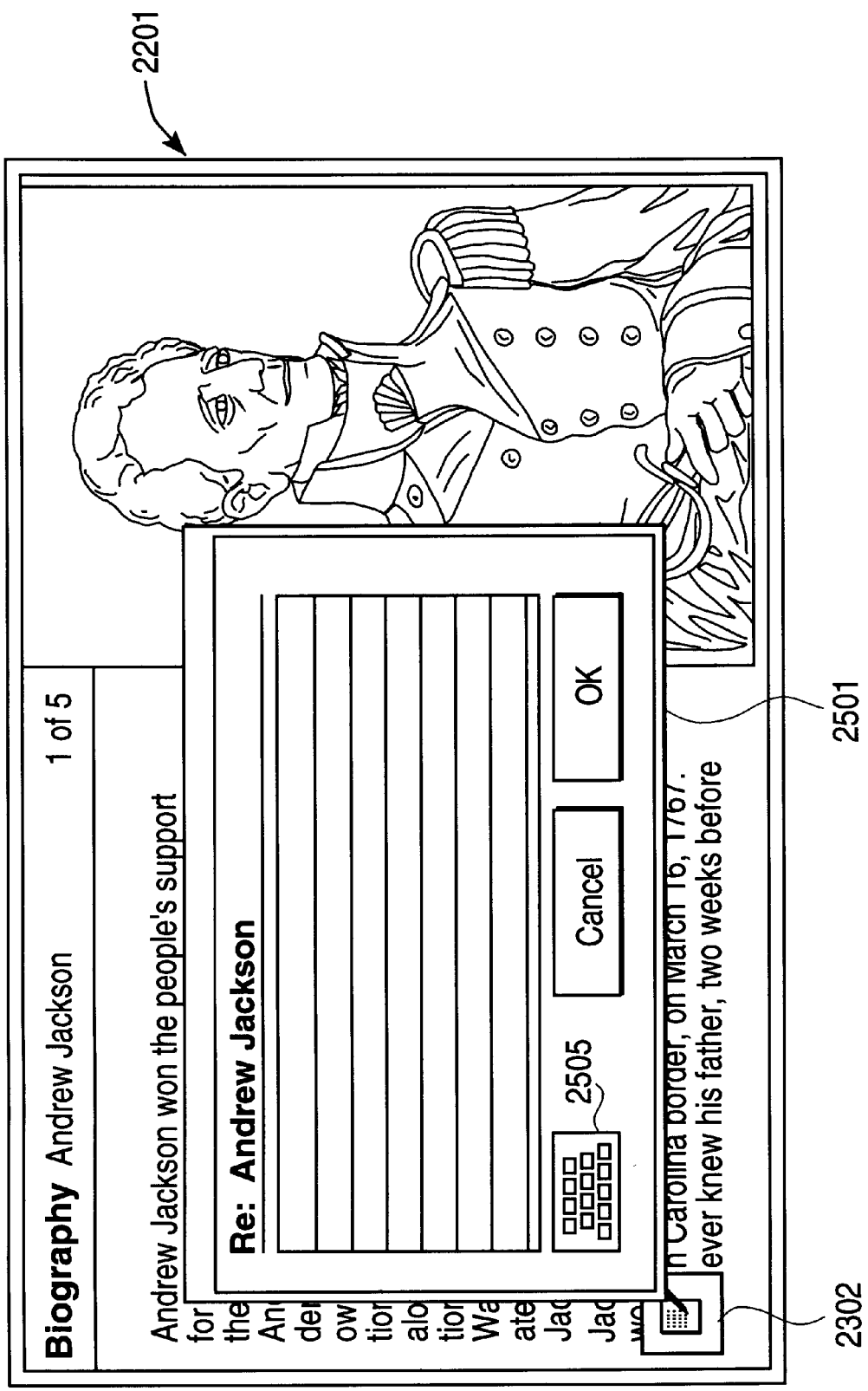
FIG. 25 illustrates the operation of an element for entering data to be associated with the data to which the element is applied.
Figure 26:
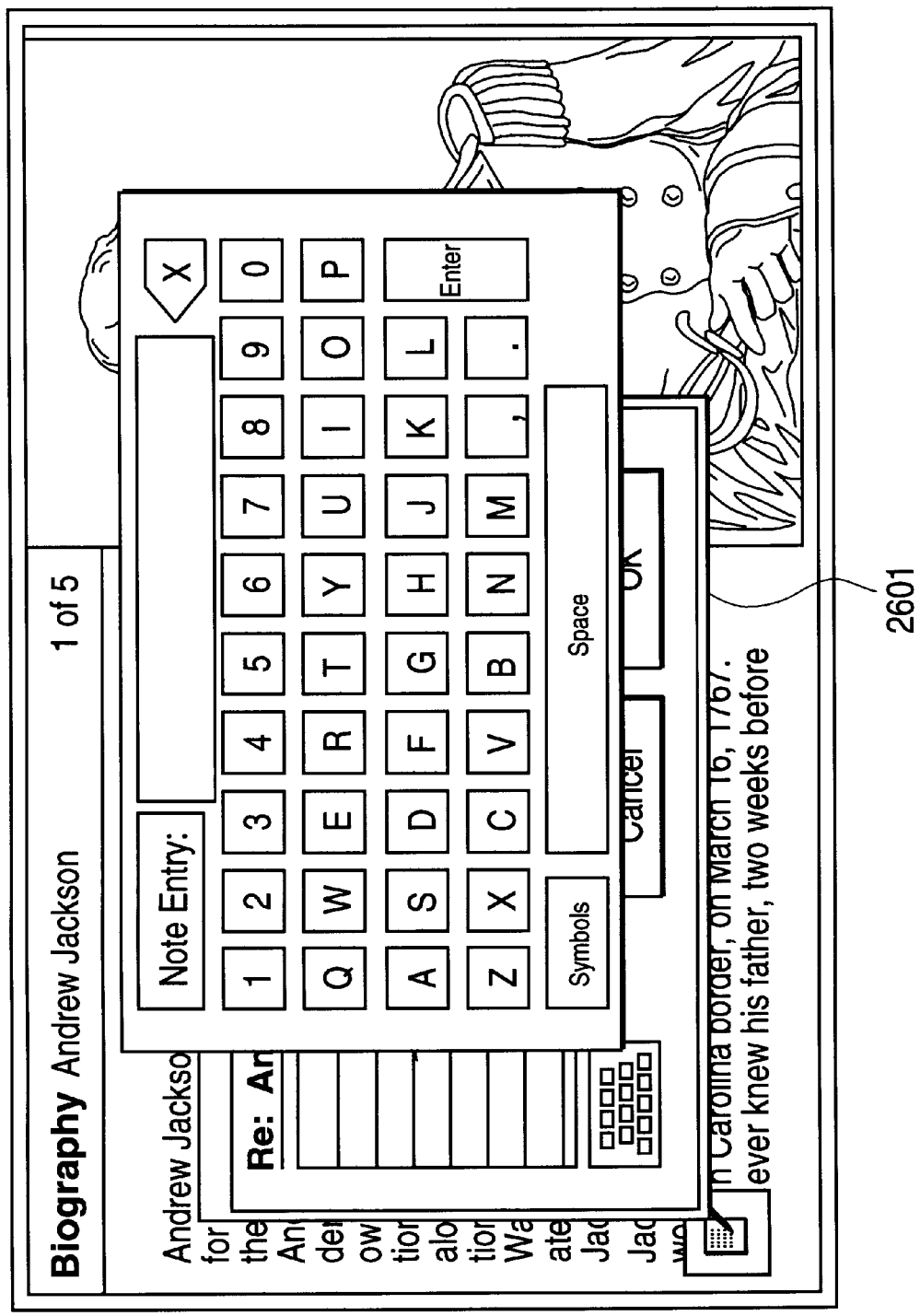
FIG. 26 illustrates a keypad for the entry of data.

FIG. 25 illustrates pop-up dialog box 2501, which appears after an instance of note element 2302 has been applied to a portion of data displayed on display screen 2201. In this case, as shown, the document comprises a biography of Andrew Jackson. For example, information system 2200 may be reading data off of a CD-ROM having an encyclopedia. In this context, since the user is likely to want to place notes regarding the text, the dialog box comprises a simple lined area for the user to enter text. As shown, in this context user element 2302 provides a "Re:" line, which is filled in when the note element is applied based upon the subject matter of the document being viewed. As described earlier, in a preferred embodiment system 2200 is a small portable unit which does not have a keypad. Therefore, the user may press keypad button 2505 to cause keypad 2601 to pop up as shown in FIG. 26. The user may use keypad 2601 to enter whatever text the user desires to be placed in the note associated with element 2302 at the position shown.

Figure 27:
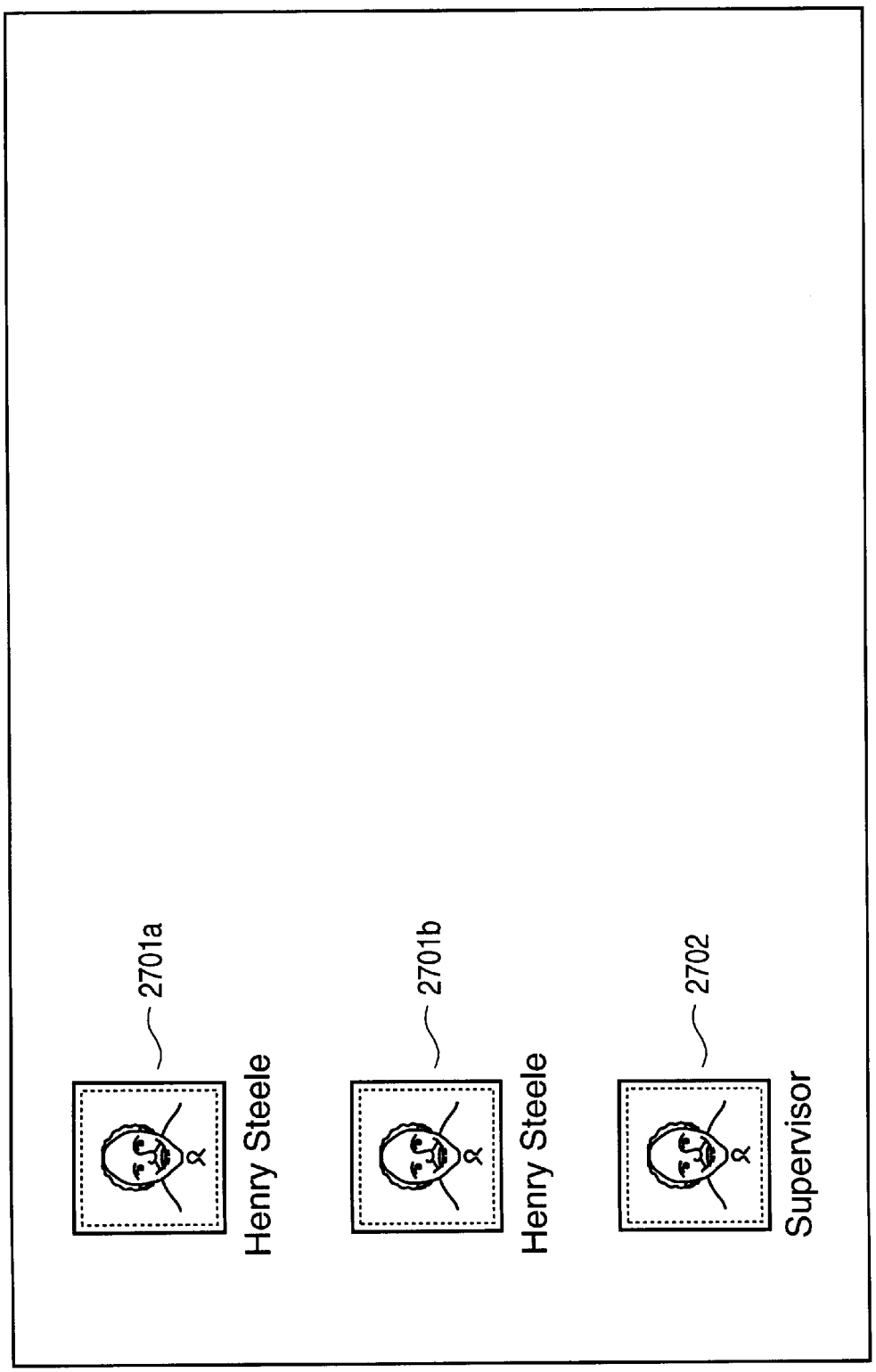
FIG. 27 illustrates different types of elements having different functionality, and a distinct visual appearance to indicate the functionality.

In many applications, it may be desirable to restrict the actions a user or class or users may perform. For example, it may be desirable to allow a certain user or class of users to perform certain functions that another user or class of users is not allowed to perform. Therefore, in a further embodiment of the present invention, the functionality of and ability to manipulate the user interface element, including application of the element, movement of the element from one place to another, removal of the element, or any modification of the element may depend upon, for example, the user's identity. The visual appearance of an element may be modified to indicate, for example, the operations the user is allowed to perform. Referring to FIG. 27, user elements 2701a, 2701b, and 2702 are illustrated. It will be appreciated that other visual appearances may be used and that the visual appearances shown in FIG. 27 are merely exemplary. As can be seen, the three elements have different visual appearances which may depend upon the element's functionality, and the identity of the user. The identity of the user may be established when the user logs on to system 2200, and enters some type of password or security code to verify the user's identification. Alternatively, the system may present the user with a keypad such as keypad 2601 of FIG. 26 upon the user's request or upon an attempt to perform any operation with an element that depends upon the user's identity.

Referring still to FIG. 27, element 2701 may represent a sign-off or identifying element, that allows one or more users to place, move, remove, or modify the element and prevents other users from performing some or all of these functions. For example, element 2701 may be used to indicate that the owner (e.g., Henry Steele) has approved of data marked by the element, has placed the element, etc. In the case where the user is a person other than Henry Steele, then, the user cannot, for example, apply, move, or modify the element 2701, but can only search for it. To indicate that the user can only search for this element, and not perform the other operations, it appears with a thick solid outer border and dotted inner border as shown by element 2701a. On the other hand, in the case where the user is authorized to perform all operations, e.g., the user is, in fact, Henry Steele, then the user may apply, move, modify, and search for the element 2701 while other users can only search for the element. In this case, the appearance will be as shown by element 2701b, wherein the inner border comprises a thin solid straight line, and the outer border comprises a string of diamond shaped elements. Finally, many of the user interface elements can be applied, moved, modified, and searched for by any user. In this case, the element has an appearance different from that shown by elements 2701a and 2701b. For example, the element may appear as shown by element 2702 which comprises a solid thin-line inner border and a solid thin-line outer border.

An element such as element 2702, which any user can perform any function would typically not be used as a sign-off or identifying element, but rather may be used for some other purpose. For example, returning to the example where system 2200 is used in the operation of a store, including placement of orders for supplies, certain orders may be marked with element 2702 to indicate that the order needs to be reviewed by a person or class of persons indicated by the element (e.g., a supervisor). As another example, the store's complete financial data including accounts payable, received, etc. may be kept in system 2200. Items that need to be reviewed by accountants, etc. can be marked with an element that indicates the item is to be reviewed by the person, or class of persons represented by the element. In this way, for example, after each business day, or each month, etc., an accounts payable manager may simply filter through the data, as described above, and find all information relating to accounts payable. Similarly, other managers may search for information pertaining to their area of responsibility. Note that in the above examples, if the user is authorized to perform all operations for element 2701*b*, then elements 2701*b* and 2702 function the same with respect to that user. However, it is useful that the two types of elements have different appearances to indicate to the user that actions such as placement of element 2701*b* can be attributed to the authorized user, while such actions on element 2702 cannot necessarily be attributed to any one user.

It will be appreciated that the identifying elements 2701*a* and/or 2701*b* may be used in many other situations. As described previously, information system 2200 may be used for numerous purposes in a variety of business and applications. For example, information system 2200 may be used to provide a checklist containing a list of tasks to be performed, and providing means for indicating with a user interface element that a task has been performed. Such a checklist may be used during performance of maintenance checks of aircraft, for example. In one embodiment, an individual authorized to check off the item may place an element such as that described in conjunction with element 2701*b* upon each item that he/she is authorized to complete. The presence of that user's elements 2701*b* alongside an item indicates that that item has been checked off as being completed. Additionally, certain maintenance items could require the user interface element of both the technician and the supervisor. If desired, any user interface element used as a check off may provide means for the user to enter data regarding the task, such as time of the check, notes, or other relevant information.

Although in the embodiment described above a user may only search for element 2701*a*, while another user may perform all actions with element 2701*b*, it will be appreciated that the actions which a particular user is allowed to perform need not be grouped as described above. For example, a user may not be able to apply or move an element such as element 2701*a*, but may be allowed to modify it in addition to searching for it. It will also be appreciated that the differing functionality described above may be used on any type of user interface element, and is not restricted to the identifying element 2701 described above. For example, in the case of order element 2301, it may be desired to allow for only certain individuals to place or remove an order stamp. Additionally, it will be appreciated that in a similar manner to that described above for the application, movement, and removal of elements, the ability to perform functions of an element may be restricted by user. For example, anyone may be able to associate an order element 2301 with a portion of a catalog, but only certain users may be allowed to fill in the information, and/or perform some act that triggers the actual ordering of an item immediately or upon some later event. For example, a clerk may associate an order element 2301 alongside certain items, and may additionally, for example, fill in an amount to be ordered. Then, a supervisor may log on and enter information or execute a command that causes the order to actually be placed, either immediately or at a later time or upon the occurrence of some further event, such as a command to place all orders. Alternatively, if desired at some point a filtering operation may be done to find all items having an order stamp, and the order may be placed at that time.

Figure 28A:
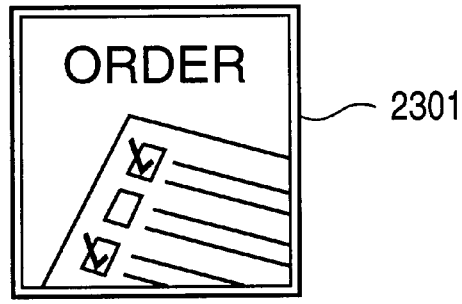
FIGS. 28a, 28b and 28c illustrates a first user interface element applied to a second user interface element.
Figure 28B:
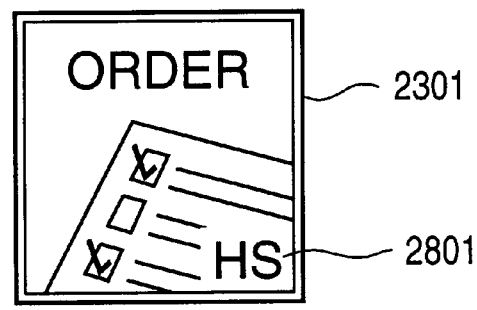
Figure 28C:
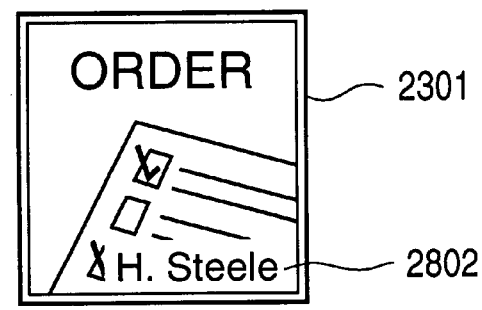

In the present invention, one user interface element may be applied directly to another user interface element. In this case, the appearance of the first user interface element to which the second user interface element was applied, may change. For example, a user may place an identifying element 2701*b* on an order element 2301, at which point the order element may be updated to indicate that the order element has had a further element applied to it. Referring to FIG. 28*a*, order element 2301 is shown prior to application of a second element. If a user named Henry Steele were then to apply his identifying element 2701*b* to order element 2301, then, as shown in FIG. 28*b*, order element 2301 may be updated by the presence of the initials 2801 of the authorized user of identifying element 2701*b*, or, as shown in FIG. 28*c*, by the first initial and last name 2802 of the authorized user of identifying element 2701*b*. Alternatively, both elements may appear, overlapped, for example, to indicate one had been applied to the other. As a further alternative, the second element may simply appear in a portion of the display associated with the first user interface element. For example, an identifying element 2701*b* may be applied to a note element 2302, to identify the individual who placed the note and/or OK'd the note. When the note element 2302 is later selected by another user, thereby causing a dialog box having the note to appear, the identifying element 2701 may then appear within some portion of the dialog box. Of course, if desired, the presence of a second element applied to a first element may be indicated both by a change in the appearance of the first element, as well as by displaying the second element when the first element is selected.

When an element having restrictions, such as identifying element 2701*b* is applied to a general element which does not have restrictions, the general element may then have the same restrictions as the identifying element. For example, when an identifying element 2701 is applied to an order element 2301, the order element may then be restricted in the same manner as the identifying element. That is, only the authorized user for the identifying element 2701*b* may then move, remove, or modify the order element 2301. If it is desired to see which orders have been approved, a user may then search for items having the order element 2301 associated with the appropriate identifying element 2701*b*. Note that applying an element such as an identifying element 2701*b* directly to another element provides security against unauthorized users from altering or modifying data in unauthorized ways. That is, because the association of the restricted element with the unrestricted element, and any subsequent modification of either element, can only be performed by the authorized user, it can be determined that the authorized individual has approved of the normally unrestricted element since it is now associated with that users identifying element 2701*b*. In contrast, in an embodiment where a restricted element is simply associated with the same data as an unrestricted element (e.g., clerk associates an order element 2301 with an item, and supervisor later associates an identifying element 2701*b* with the same item, but not directly with the order element 2301), an unauthorized user could subsequently modify the unrestricted order element 2301. Similarly, in the earlier described example where system 2200 is used to record maintenance on an aircraft, application of an identifying element to an element listing the maintenance performed provides assurance that the authorized sign off person has seen the specific listed maintenance upon which that user's element appears. It will be obvious to one of skill in the art that numerous similar applications may be envisioned. Further, the functionality to be given an element or a combination of elements may depend upon the application.

In the present invention, various types of data or software may be supplied with user interface elements pre-applied to appropriate portions. For example, an encyclopedia may mark portions of data with one or more types of elements. Thus, for example, a biography giving basic information about an individual may be marked with an element having, for example, the appearance of several persons, to indicate that information on contemporaries of the individual in related fields of endeavor may be obtained by selecting the element. Dates within the biography may contain elements having, e.g., the appearance of a calendar which, upon selection, provide information of related events occurring around the time of the date in the main text. Similarly, numerous other types of pre-supplied elements may be envisioned. Note that in addition to providing a convenient link between two portions of data, the user interface element, by its appearance, conveys to the user the type of information which will be provided upon selecting the element. Further, the pre-supplied elements may contain functionality in addition to information. For example, the supplier of a catalog may pre-supply order elements. Further, the order elements may be context sensitive with the specific functionality, and/or information provided depending upon the portion of the document with which the element is associated.

Figure 29D:
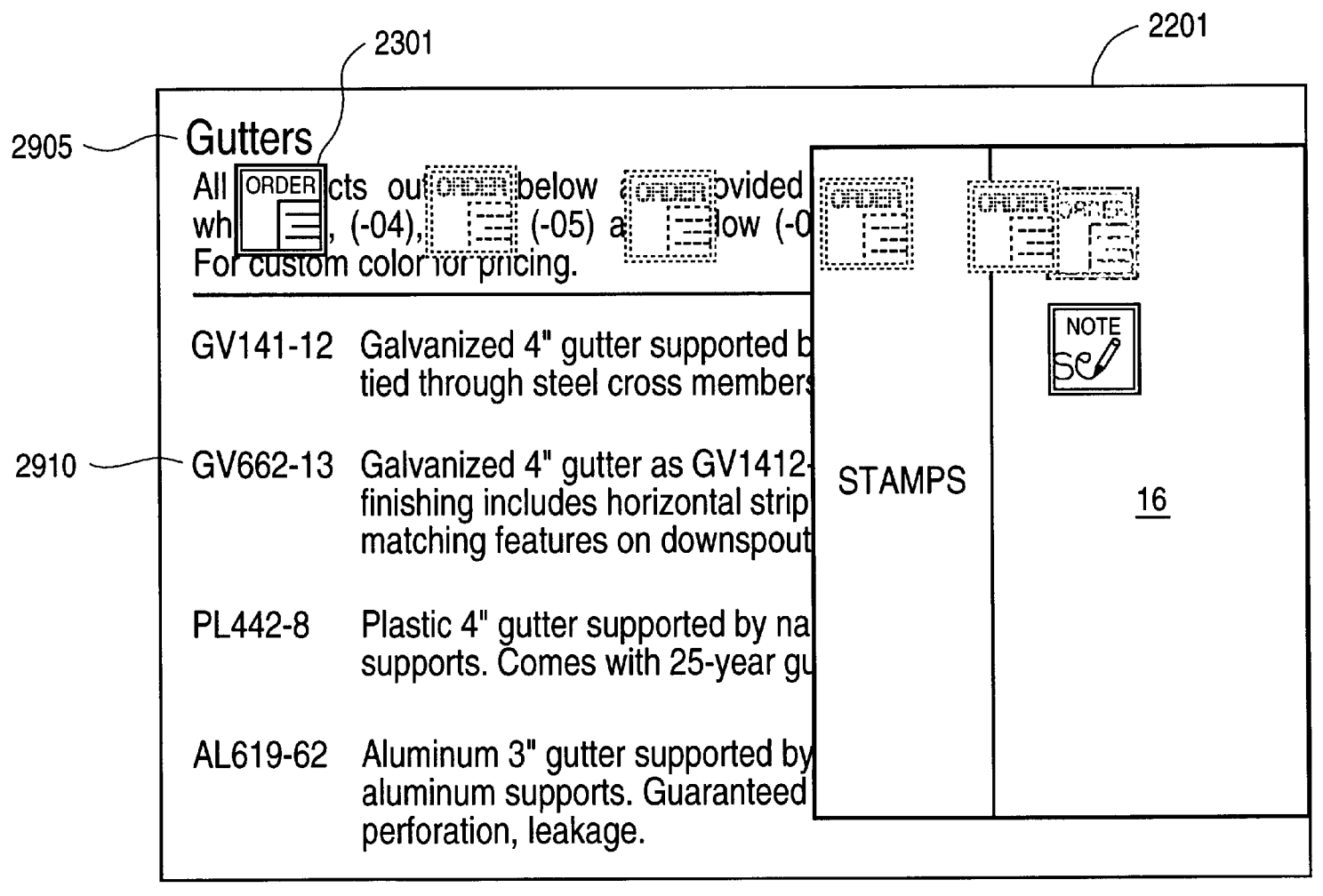
Figure 29E:
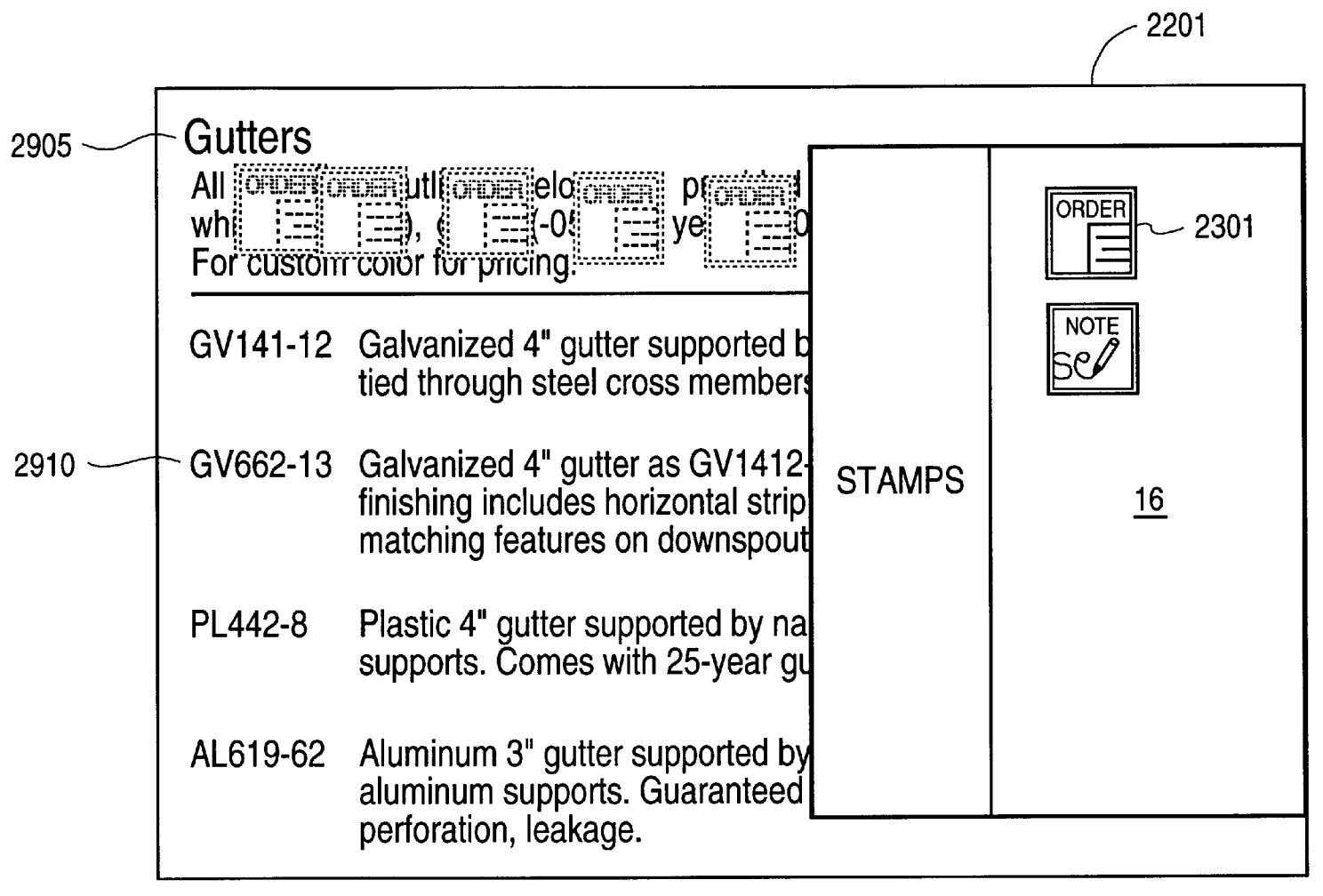

A related type of element in the present invention is a "snap-in" element. These types of elements may only be placed on certain documents and/or certain areas of documents. Referring now to FIG. 29a, this type of element is illustrated in conjunction with information system 2200. As shown, a portion of a catalog containing a category 2905 of items such as gutters, along with a plurality of specific types of gutters 2910 is displayed on screen 2201. Also as shown, element well 16 is displayed on a portion of display 2201. FIG. 29b illustrates the placement of an instance of order element 2301 on a specific item 2910. The movement of an instance from well 16 to the item 2901 is illustrated by the use of a plurality of shaded elements. After placement of an order element 2301 on the specific item 2910, the display appears as shown in FIG. 29c with an order element 2301 associated with the item 2910. As described in conjunction with the previous embodiments, the base element 2301 remains in well 16. Referring now to FIG. 29d, placement of an order element 2301 on the generic category 2905 is shown. In some embodiments, it may be desired to allow an order element 2301 to be associated with some types of data, such as individual items 2910, and not with other types of data such as the category 2905. In this case, after the user has placed the order element 2301 in a region such as region 2905 where it is not allowed, then, as shown in FIG. 29e system 2200 causes order element 2301 to appear to move back into the well 16.

Figure 30A:
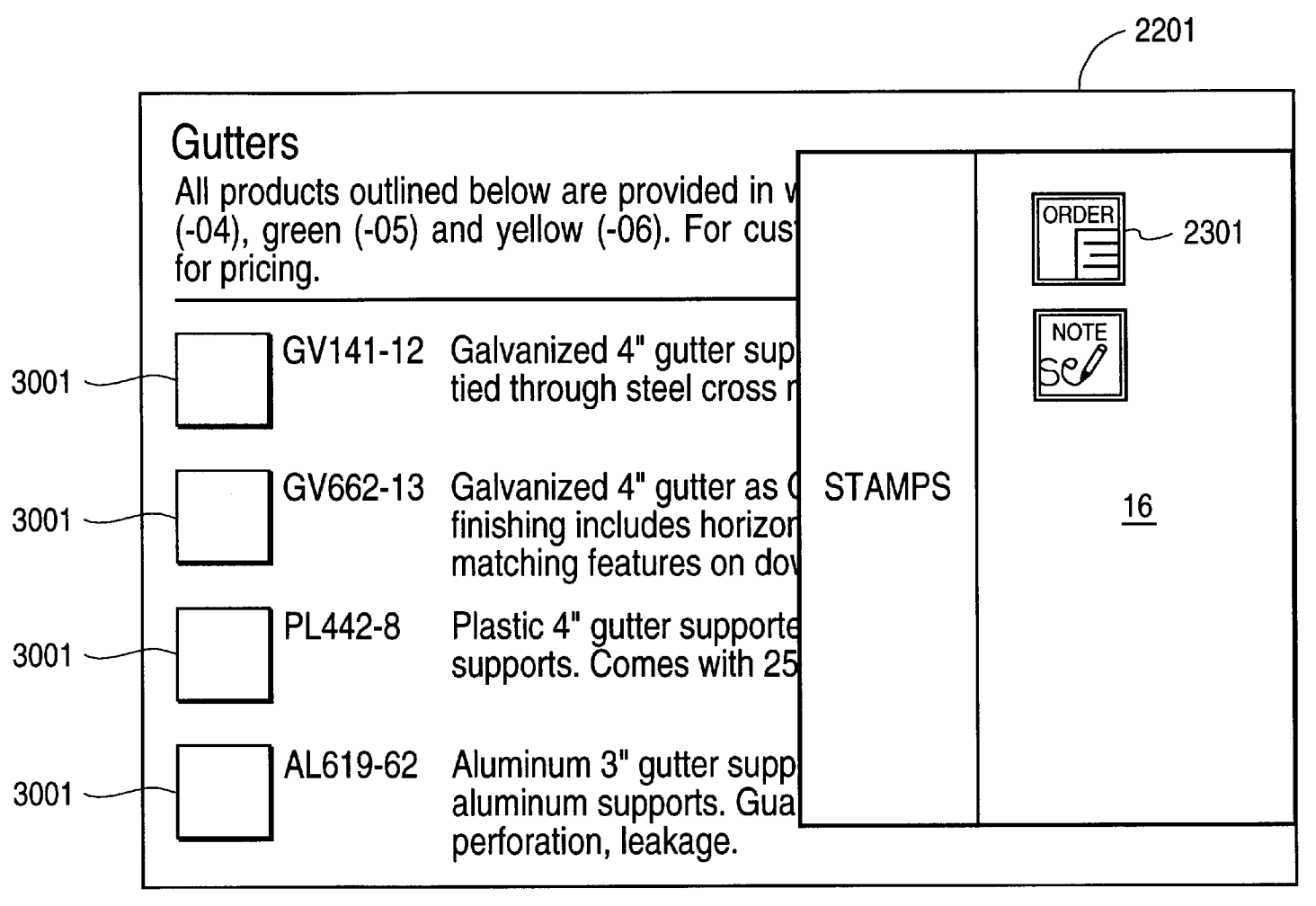
Figure 30B:
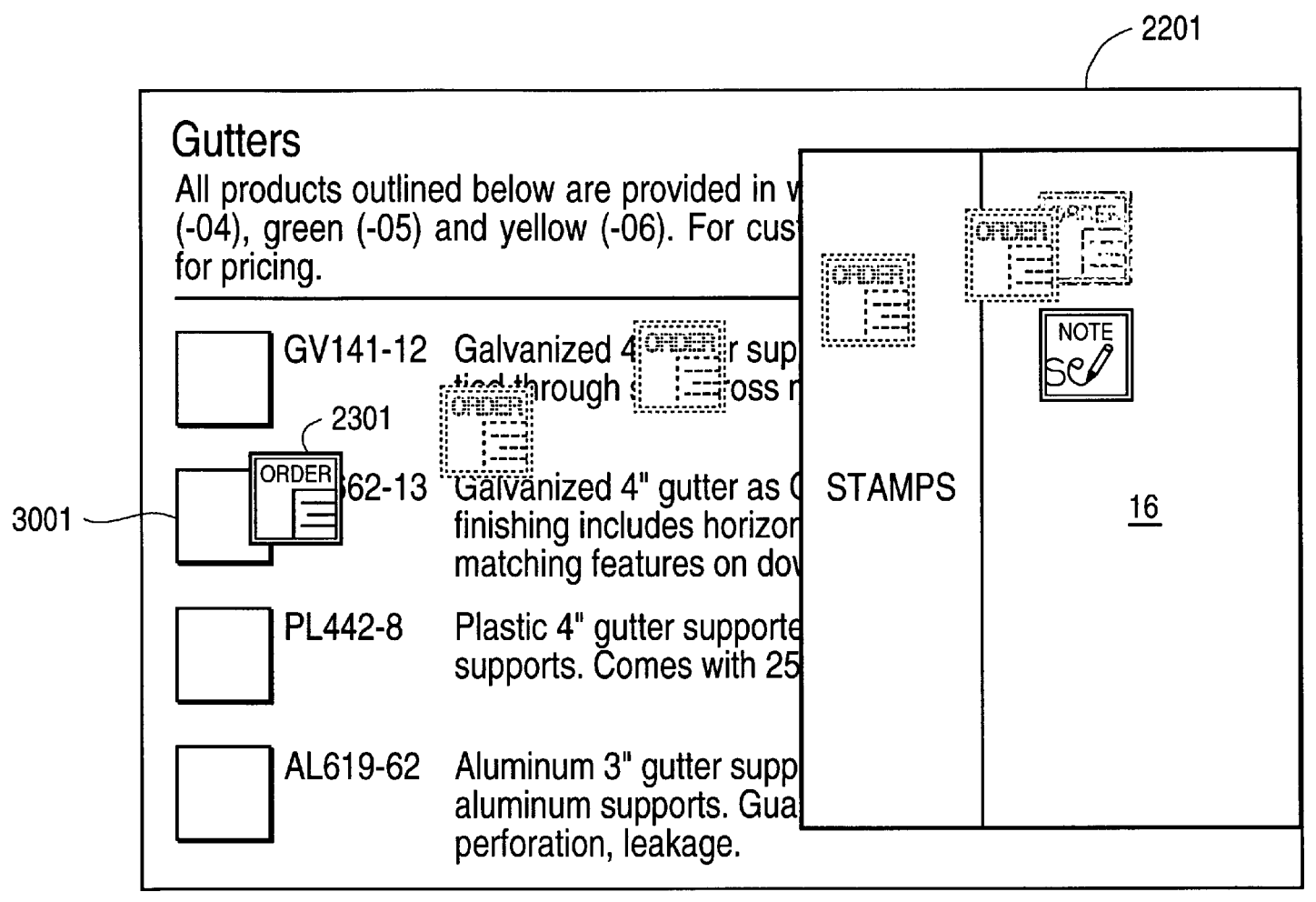
Figure 30D:
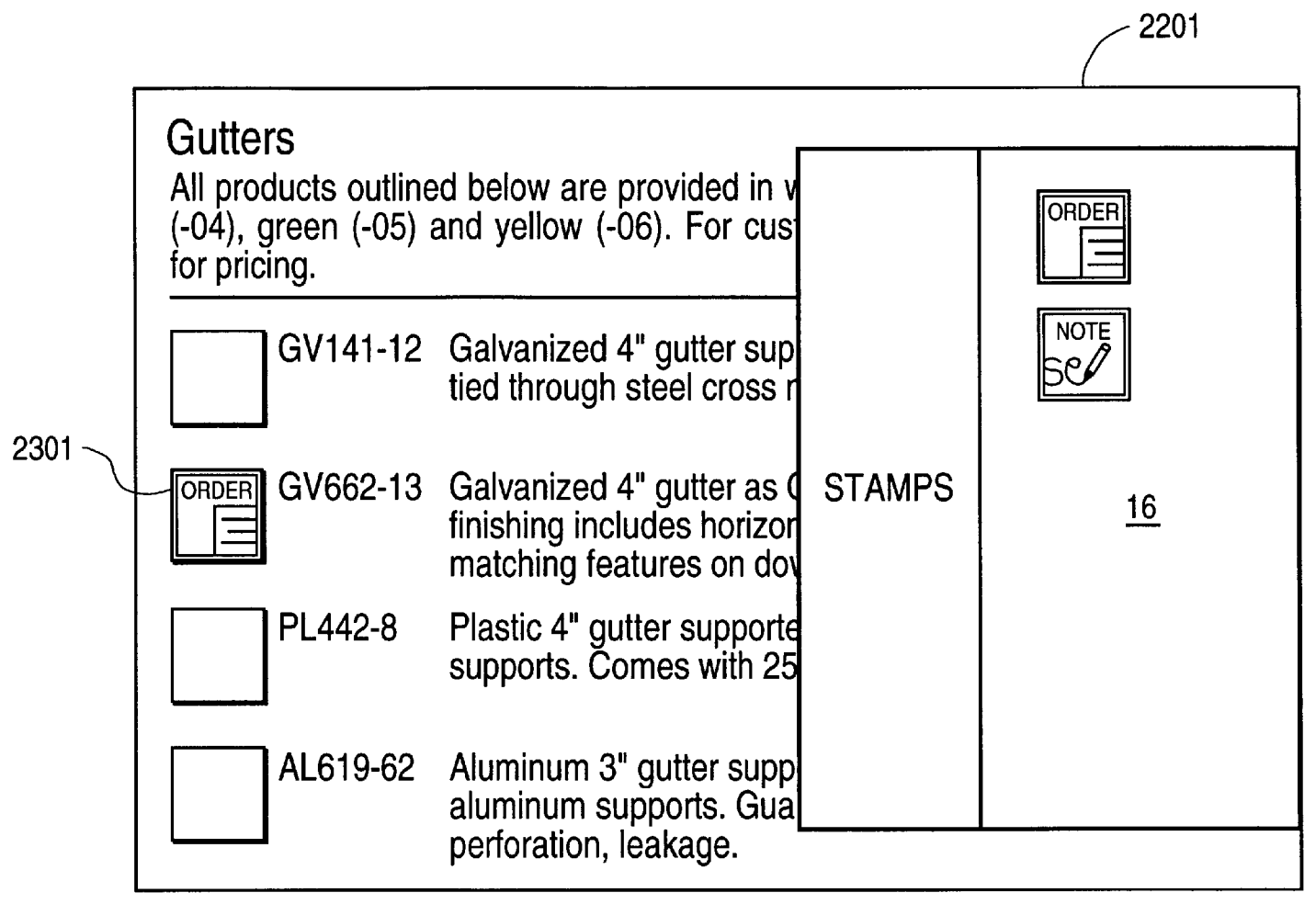

In a similar manner, placement of user interface elements may be restricted to certain areas of the display. Referring to FIG. 30a, the system 2201 is shown with the plurality of receiving bins 3001 in which elements, such as order element 2301 may be placed. As shown by FIG. 30b, a user may place an element 2301 on or near a portion of one of the receiving bins 3001. Next, as shown in FIG. 30c, the system 2200 moves the order element 2301 into its proper place, as shown in FIG. 30d. In a preferred embodiment, any element placed within a predetermined distance of a receiving bin 3001 will move into place within that receiving bin as shown. Any element placed equally distant from two receiving bins, or placed outside of a predetermined distance, will move back into the well, similar to the manner described in conjunction with FIGS. 29d and 29e. It will be appreciated that the receiving bins 3001 may have an appearance as shown in FIGS. 30a–30d. Alternatively, the receiving bins 3001 may have no appearance on the display, but may comprise predefined regions into which closely placed elements will be moved by the system.

The embodiment shown in FIGS. 29a–29e and 30a–30d provides for a neat appearance of the user interface elements and provides an easy way for a user to navigate through data since the user can expect elements to be only in predefined spaces. Additionally, these embodiments help ensure that a novice user will not place elements in regions where they do not belong and/or ensure that the user does not take actions which should not be taken. That is, the user's actions in applying elements is directed, to some extent, by the operation of the computerized system.

Although the present invention has been described with reference to FIGS. 1–27 and with emphasis on particular embodiments, it should be understood that the figures are for illustration only and should not be taken as limitations upon the invention. It is contemplated that many changes and modifications may be made by one of ordinary skill in the art to the elements, process and arrangement of steps of the process of the invention without departing from the spirit and scope of the invention as disclosed above.

What is claimed is:

1. A user interface system for use in a computerized system having a processor, a memory, and an input/output system in communication with said processor and said memory for operating said user interface system, comprising:

a plurality of types of user interface elements including means for associating data with one of said user interface elements and means for identifying said user interface elements to said computerized system;

means for storing said identifying means for said user interface elements in said memory;

means for finding said data associated with said one of said plurality of types of user interface elements in said memory by searching for said identifying means in said memory, wherein said input/output system comprises a first switch, wherein said means for associating data is operative to associate said data with one of said plurality of user interface elements in response to a first signal generated by said first switch, wherein said display device has means for displaying one or more of said types of said user interface elements, wherein a first set comprising more than one of said types of user interface elements is associated with an area on said display device, wherein said input/output system comprises means for selecting one of said more than one type of said user interface elements to be displayed in said area, said one of said types of said user interface elements displayed in said area being operative to be associated with said data.

2. The user interface system as described in claim 1 wherein said data resides in a data structure represented by an icon, wherein said system comprises means to update an appearance of said icon to indicate that said data has had one of said plurality of user interface elements associated therewith.

3. The user interface system as described in claim 1 wherein said computerized system is operative to find said data associated with said one of said plurality of said user interface elements in response to a second signal generated by one of said first or a second switch.

4. The user interface system as described in claim 3 wherein said input/output system comprises a remote control device, said remote control device comprising said first and said second switch.

5. The user interface system as described in claim 1 wherein said computerized system comprises means for recording audio data associated with said user interface element, wherein a plurality of instances of said user interface element may each be associated with a plurality of portions of data, said audio data associated with each of said instances.

6. The user interface system as described in claim 1 wherein said computerized system comprises a camera, said camera having means for capturing an image, wherein said one of said types of said user interface elements displayed in said area is associated with said image when said image is captured.

7. The user interface system as described in claim 1 wherein said type of said more than one of said plurality of user interface elements included in said first set is user selectable.

8. A user interface system for use in a computerized system having a processor, a memory, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory;

wherein said input/output system comprises a first switch, wherein said means for associating data is operative to associate said data with said user interface element in response to a first signal generated by said first switch;

wherein said computerized system comprises a camera, said camera having means for capturing an image, wherein said computerized system further comprises a display, said display having an area for displaying said user interface element, and wherein said user interface element displayed in said area is associated with said image when said image is captured.

9. The user interface system as described in claim 8 wherein said user interface element comprises a parameter, wherein said user interface system further comprises means for updating said parameter when said image is captured.

10. The user interface system as described in claim 9 wherein said parameter comprises time of day.

11. The user interface system as described in claim 9 wherein said parameter comprises a date.

12. The user interface system as described in claim 9 wherein said parameter comprises a number.

13. A user interface system for use in a computerized system having a processor, a memory, and an input/output system in communication with said processor and said memory for operating said user interface system, comprising:

a plurality of types of user interface elements including means for associating data with said user interface elements and means for identifying said user interface elements to said computerized system;

means for storing said identifying means for said user interface elements in said memory;

means for finding said data associated with one of said plurality of types of user interface elements in said memory by searching for said identifying means in said memory, wherein said input/output system comprises a plurality of first switches, wherein said means for associating data is operative to associate said data with one of said plurality of types of user interface elements in response to a first signal generated by one of said first switches, and wherein a different one of said types of said user interface elements is associated with each of said first switches.

14. The user interface system as described in claim 13 wherein said input/output system comprises a remote control device, said remote control device comprising said plurality of first switches.

15. The user interface system as described in claim 13 wherein said computerized system is operative to find data associated with one or more of said plurality of types of user interface elements in response to one or more second signals generated by one or more of said first switches or one or more second switches corresponding to said one or more of said plurality of types of said user interface elements.

16. The user interface system as described in claim 15 wherein said input/output system comprises a remote control device, said remote control device comprising said plurality of first switches and said one or more second switches.

17. The user interface system as described in claim 16 wherein said remote control device comprises a plurality of buttons, said buttons having a first portion and a second portion, wherein said first portion operates said first switch, and said second portion operates said second switch, each of said buttons associated with one of said plurality of user interface elements.

18. A user interface system for use in a computerized system having a processor, a memory, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory;

wherein said input/output system comprises a first switch, wherein said means for associating data is operative to associate said data with said user interface element in response to a first signal generated by said first switch, and wherein said input/output system comprises a remote control device, said remote control device comprising said first switch.

19. A user interface system for use in a computerized system having a processor, a memory, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory, wherein said input/output system comprises a first switch, wherein said means for associating data is operative to associate said data with said user interface element in response to a first signal generated by said first switch, and wherein said computerized system allows said user interface element to be associated with one or more first types of data, and does not allow said user interface element to be associated with one or more second types of data.

20. A user interface system for use in a computerized system having a processor, a memory, a display device, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory, wherein said input/output system comprises a first switch, wherein said means for associating data is operative to associate said data with said user interface element in response to a first signal generated by said first switch; and means for encircling data displayed on said display device, wherein said means for associating data with said user interface element is operative to associate said encircled data with said user interface element.

21. A user interface system for use in a computerized system having a processor, a memory, a display device, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory; and means for programming said user interface element to control performance of one or more operations by said computerized system, wherein said one or more operations are customized for said data associated with said user interface element based upon the content of said data associated with said user interface element, means for encircling data displayed on said display device, wherein said means for associating data with said user interface element is operative to associate said encircled data with said user interface element.

22. A user interface system for use in a computerized system having a processor, a memory, a display device, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory, wherein said computerized system allows said user interface element to be associated with one or more first types of data, and does not allow said user interface element to be associated with one or more second types of data;

means for encircling data displayed on said display device, wherein said means for associating data with said user interface element is operative to associate said encircled data with said user interface element.

23. A user interface system for use in a computerized system having a processor, a memory, a display device, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory, wherein said means to associate data with said user interface element is operative to associate said user interface element with said data for a first user, and is not operative to associate said data with said user interface element for a second users;

means for encircling data displayed on said display device, wherein said means for associating data with said user interface element is operative to associate said encircled data with said user interface element.

24. A user interface system for use in a computerized system having a processor, a memory, and an input/output system in communication with said processor and said memory for operating said user interface system, comprising:

a user interface element including means for associating data with said user interface element and means for identifying said user interface element to said computerized system;

means for storing said identifying means for said user interface element in said memory;

means for finding said data associated with said user interface element in said memory by searching for said identifying means in said memory; and means for programming said user interface element to control performance of one or more operations by said computerized system, wherein said computerized system is operative to allow a first user to perform one or more of said one or more operations, and wherein said computerized system is not operative to perform said one or more of said one or more operations for a second user.

25. The user interface system as described in claim 24 wherein said system further comprises a display device, and further comprises means for encircling data displayed on said display device, wherein said means for associating data with said user interface element is operative to associate said encircled data with said user interface element.

26. A method of marking and finding data in a computerized system having a processor, a memory, a display device, and an input/output system in communication with said processor and said memory for operating said user interface system, comprising:

provoking a plurality of user interface elements, said plurality of user interface elements having identifying information to identify said user interface elements to said computerized system;

providing a first switch, said first switch generating a first signal, wherein said computerized system is operative to associate data with one of said plurality of user interface elements in response to said first signal generated by said first switch;

associating one of said plurality of user interface elements with said data, said user interface element identifying a location in memory of said associated data; and, finding said data associated with said one of said user interface elements in said memory by searching for said identifying information in said memory;

associating a first set comprising more than one types of user interface elements with an area on said display device; and selecting one of said more than one type of user interface elements to be displayed in said area, wherein said one of said user interface elements displayed in said area is operative to be associated with said data.

27. The method as described in claim 26 wherein said computerized system further comprises a camera, wherein said method further comprises capturing an image, wherein said one of said user interface elements displayed in said area is associated with said captured image.

28. The method as described in claim 26 wherein said type of said more than one of said plurality of user interface elements included in said first set is user selectable.

29. The method as described in claim 26 wherein said data resides in a data structure represented by an icon, wherein said method further comprises the step of updating an appearance of said icon to indicate that said data has had said user interface element associated therewith.

30. A method of marking and finding data in a computerized system including a camera having a processor, a memory, a display, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory;

displaying said user interface element in an area of said display; and, capturing an image, wherein said user interface element displayed in said area is associated with said captured image.

31. The method as described in claim 30 wherein said user interface element comprises a parameter and wherein said method further comprises updating said parameter when said image is captured.

32. The method as described in claim 31 wherein said parameter comprises time of day.

33. The method as described in claim 31 wherein said parameter comprises a date.

34. The method as described in claim 31 wherein said parameter comprises a number.

35. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said computerized system comprises means for recording audio data associated with said user interface element, wherein a plurality of instances of said user interface element may each be associated with a plurality of portions of data, said audio data associated with each of said instances.

36. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said input/output system further comprises a remote control device, said remote control device comprising said first switch.

37. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said computerized system allows the user interface element to be associated with one or more first types of data, and does not allow said user interface element to be associated with one or more second types of data in said step of associating data with said user interface element.

38. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data, finding said data associated with said user interface element in said memory by searching for said identifying information in said memory; and operating one of said first or a second switch to generate a second signal, said second signal causing said computerized system to be operative to find said data associated with said user interface element.

39. The method as described in claim 38 wherein said input/output system comprises a remote control device, said remote control device comprising said first and said second switch.

40. The method as described in claim 38 wherein said method further comprises providing a plurality of types of said user interface elements and providing a plurality of first switches, and wherein a different one of said types of said user interface elements is associated with each of said first switches.

41. The method as described in claim 40 wherein said input/output system comprises a remote control device, said remote control device comprising said plurality of first switches.

42. The method as described in claim 40 further comprising operating one or more of said first switches or one more second switches to generate one or more second signals corresponding to one or more of said plurality of types of said user interface elements to be found in said finding step.

43. The method as described in claim 42 wherein said input/output system comprises a remote control device, said remote control device comprising said plurality of first switches and said one or more second switches.

44. The method as described in claim 43 wherein said remote control device comprises a plurality of buttons, said buttons having a first portion and a second portion, wherein said first portion operates said first switch, and said second portion operates said second switch, each of said buttons associated with one of said plurality of user interface elements.

45. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

providing a first switch, said first switch generating a first signal, wherein said computerized system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said computerized system further comprises a display device, wherein said step of associating data with said user interface element comprises encircling a display of said data on said display device.

46. A method for marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory; and, programming said user interface element to control performance of one or more operations by said computerized system, wherein said one or more operations are customized for said data associated with said user interface element based upon the content of said data associated with said user interface element, wherein said data resides in a data structure represented by an icon, wherein said method further comprises the step of updating an appearance of said icon to indicate that said data has had said user interface element associated therewith.

47. A method for marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory; and, programming said user interface element to control performance of one or more operations by said computerized system, wherein said one or more operations are customized for said data associated with said user interface element based upon the content of said data associated with said user interface element, wherein said computerized system further comprises a display device, wherein said step of associating data with said user interface element comprises encircling a display of said data on said display device.

48. A method for marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory; and wherein said computerized system allows said user interface element to be associated with one or more first types of data, and does not allow said user interface element to be associated with one or more second types of data in said step of associating said user interface element with said data, wherein said data resides in a data structure represented by an icon, wherein said method further comprises the step of updating an appearance of said icon to indicate that said data has had said user interface element associated therewith.

49. A method for marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory; and wherein said computerized system allows said user interface element to be associated with one or more first types of data, and does not allow said user interface element to be associated with one or more second types of data in said step of associating said user interface element with said data, wherein said computerized system further comprises a display device, wherein said step of associating data with said user interface element comprises encircling a display of said data on said display device.

50. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory;

wherein said computerized system is operative to perform said step of associating said user interface element with said data for a first user, and is not operative to perform said step of associating said data with said user interface element for a second user.

51. The method as described in claim 50 wherein said data resides in a data structure represented by an icon, wherein said method further comprises the step of updating an appearance of said icon to indicate that said data has had said user interface element associated therewith.

52. The method as described in claim 50 wherein said computerized system further comprises a display device, wherein said step of associating data with said user interface element comprises encircling a display of said data on said display device.

53. A method of marking and finding data in a computerized system having a processor, a memory, and an input/output system in communication with said processor and said memory for operating said user interface system, comprising:

providing a user interface element, said user interface element having identifying information to identify said user interface element to said computerized system;

associating data with said user interface element, said user interface element further identifying a location in memory of said associated data;

storing said identifying information for said user interface element in said memory;

finding said data associated with said user interface element in said memory by searching for said identifying information in said memory;

programming said user interface element to control performance of one or more operations by said computerized system, wherein said computerized system is operative to allow a first user to perform one or more of said one or more operations, and wherein said computerized system is not operative to perform said one or more of said one or more operations for a second user.

54. The method as described in claim 53 wherein said data resides in a data structure represented by an icon, wherein said method further comprises the step of updating an appearance of said icon to indicate that said data has had said user interface element associated therewith.

55. The method as described in claim 53 wherein said computerized system further comprises a display device, wherein said step of associating data with said user interface element comprises encircling a display of said data on said display device.

56. A computer readable medium in a digital processing system, said medium containing executable computer program instructions which when executed in said digital processing system cause said system to perform the steps comprising:

provinding a plurality of types of user interface elements, said user interface elements having identifying information to identify said user interface elements to said digital processing system, the digital processing system having a processor, a memory, a display, and an input/output system in communication with said processor and said memory for operating said user interface system;

generating a first signal, wherein said digital processing system is operative to associate data with one of said plurality of types of user interface elements in response to said first signal generated by said first switch;

associating said one of said plurality of types of user interface elements with said data, said user interface element identifying a location in memory of said associated data; and, finding said data associated with said one of said plurality of types user interface elements in said memory by searching for said identifying information in said memory;

associating a first set comprising more than one of said types of user interface elements with an area on said display device; and selecting one of said more than one type of user interface elements to be displayed in said area, wherein said one of said user interface elements displayed in said area is operative to be associated with said data.

57. The method as described in claim 56 wherein said digital processing system further comprises a camera, wherein said method further comprises capturing an image, wherein said one of said user interface elements displayed in said area is associated with said captured image.

58. The method as described in claim 56 wherein said type of said more than one of said plurality of user interface elements included in said first set is user selectable.

59. The method as described in claim 56 wherein said digital processing system allows the user interface element to be associated with one or more first types of data, and does not allow said user interface element to be associated with one or more second types of data in said step of associating data with said user interface element.

60. A computer readable medium in a digital processing system, said medium containing executable computer program instructions which when executed in said digital processing system cause said system to perform the steps comprising:

providing a user interface element, said user interface element having identifying information to identify said user interface element to said digital processing system comprising a camera, the digital processing system having a processor, a memory, a display, and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data;

finding said data associated with said user interface element in said memory by searching for said identifying information in said memory;

displaying said user interface element in an area of said display; and, capturing an image, wherein said user interface element displayed in said area is associated with said captured image.

61. The method as described in claim 60 wherein said user interface element comprises a parameter and wherein said method further comprises updating said parameter when said image is captured.

62. The method as described in claim 61 wherein said parameter comprises time of day.

63. The method as described in claim 61 wherein said parameter comprises a date.

64. The method as described in claim 61 wherein said parameter comprises a number.

65. A computer readable medium in a digital processing system, said medium containing executable computer program instructions which when executed in said digital processing system cause said system to perform the steps comprising:

providing a user interface element, said user interface element having identifying information to identify said user interface element to said digital processing system, the digital processing system having a processor, a memory and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data;

finding said data associated with said user interface element in said memory by searching for said identifying information in said memory; and operating one of said first or a second switch to generate a second signal, said second signal causing said digital processing system to be operative to find said data associated with said user interface element.

66. The method as described in claim 65 wherein said input/output system comprises a remote control device, said remote control device comprising said first and said second switch.

67. The method as described in claim 65 wherein said method further comprises providing a plurality of types of said user interface elements and providing a plurality of first switches, and wherein a different one of said types of said user interface elements is associated with each of said first switches.

68. The method as described in claim 67 further comprising operating one or more of said first switches or one more second switches to generate one or more second signals corresponding to one or more of said plurality of types of said user interface elements to be found in said finding step.

69. The method as described in claim 68 wherein said input/output system comprises a remote control device, said remote control device comprising said plurality of first switches and said one or more second switches.

70. The method as described in claim 69 wherein said remote control device comprises a plurality of buttons, said buttons having a first portion and a second portion, wherein said first portion operates said first switch, and said second portion operates said second switch, each of said buttons associated with one of said plurality of user interface elements.

71. The method as described in claim 67 wherein said input/output system comprises a remote control device, said remote control device comprising said plurality of first switches.

72. A computer readable medium in a digital processing system, said medium containing executable computer program instructions which when executed in said digital processing system cause said system to perform the steps comprising:

provide a user interface element, said user interface element having identifying information to identify said user interface element to said digital processing system, the digital processing system having a processor, a memory and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said input/output system further comprises a remote control device, said remote control device comprising said first switch.

73. A computer readable medium in a digital processing system, said medium containing executable computer program instructions which when executed in said digital processing system cause said system to perform the steps comprising:

providing a user interface element, said user interface element having identifying information to identify said user interface element to said digital processing system, the digital processing system having a processor, a memory and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said data resides in a data structure represented by an icon, wherein said method further comprises the step of updating an appearance of said icon to indicate that said data has had said user interface element associated therewith.

74. A computer readable medium in a digital processing system, said medium containing executable computer program instructions which when executed in said digital processing system cause said system to perform the steps comprising:

providing a user interface element, said user interface element having identifying information to identify said user interface element to said digital processing system, the digital processing system having a processor, a memory and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said digital processing system further comprises a display device, wherein said step of associating data with said user interface element comprises encircling a display of said data on said display device.

75. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory; and, programming said user interface element to control performance of one or more operations by said digital processing system, wherein said one or more operations are customized for said data associated with said user interface element based upon the content of said data associated with said user interface element, wherein said data resides in a data structure represented by an icon, wherein said method further comprises the step of updating an appearance of said icon to indicate that said data has had said user interface element associated therewith.

76. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory; and programming said user interface element to control performance of one or more operations by said digital processing system, wherein said one or more operations are customized for said data associated with said user interface element based upon the content of said data associated with said user interface element, wherein said digital processing system further comprises a display device, wherein said step of associating data with said user interface element comprises encircling a display of said data on said display device.

77. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory; and wherein said digital processing system allows said user interface element to be associated with one or more first types of data, and does not allow said user interface element to be associated with one or more second types of data in said step of associating said user interface element with said data.

78. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory; and wherein said digital processing system allows said user interface element to be associated with one or more first types of data, and does not allow said user interface element to be associated with one or more second types of data in said step of associating said user interface element with said data, wherein said data resides in a data structure represented by an icon, wherein said method further comprises the step of updating an appearance of said icon to indicate that said data has had said user interface element associated therewith.

79. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory; and wherein said digital processing system allows said user interface element to be associated with one or more first types of data, and does not allow said user interface element to be associated with one or more second types of data in said step of associating said user interface element with said data, wherein said digital processing system further comprises a display device, wherein said step of associating data with said user interface element comprises encircling a display of said data on said display device.

80. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory;

wherein said digital processing system is operative to perform said step of associating said user interface element with said data for a first user, and is not operative to perform said step of associating said data with said user interface element for a second user.

81. The method as described in claim 80 wherein said data resides in a data structure represented by an icon, wherein said method further comprises the step of updating an appearance of said icon to indicate that said data has had said user interface element associated therewith.

82. The method as described in claim 80 wherein said digital processing system further comprises a display device, wherein said step of associating data with said user interface element comprises encircling a display of said data on said display device.

83. A computer readable medium in a digital processing system, said medium containing executable computer program instructions which when executed in said digital processing system cause said system to perform the steps comprising:

providing a user interface element, said user interface element having identifying information to identify said user interface element to said digital processing system;

associating data with said user interface element, said user interface element further identifying a location in memory of said associated data;

storing said identifying information for said user interface element in said memory;

finding said data associated with said user interface element in said memory by searching for said identifying information in said memory;

programming said user interface element to control performance of one or more operations by said digital processing system, wherein said digital processing system is operative to allow a first user to perform one or more of said one or more operations, and wherein said digital processing system is not operative to perform said one or more of said one or more operations for a second user.

84. The method as described in claim 83 wherein said data resides in a data structure represented by an icon, wherein said method further comprises the step of updating an appearance of said icon to indicate that said data has had said user interface element associated therewith.

85. The method as described in claim 83 wherein said digital processing system further comprises a display device, wherein said step of associating data with said user interface element comprises encircling a display of said data on said display device.

86. A computer readable medium in a digital processing system, said medium containing executable computer program instructions which when executed in said digital processing system cause said system to perform the steps comprising:

provide a user interface element, said user interface element having identifying information to identify said user interface element to said digital processing system, the digital processing system having a processor, a memory and an input/output system in communication with said processor and said memory for operating said user interface system;

generating a first signal, wherein said digital processing system is operative to associate data with said user interface element in response to said first signal generated by said first switch;

associating said user interface element with said data, said user interface element identifying a location in memory of said associated data; and, finding said data associated with said user interface element in said memory by searching for said identifying information in said memory, wherein said digital processing system comprises means for recording audio data associated with said user interface element, wherein a plurality of instances of said user interface element may each be associated with a plurality of portions of data, said audio data associated with each of said instances.

* * * * *